United States Patent
Boivin et al.

(10) Patent No.: US 10,589,802 B2
(45) Date of Patent: Mar. 17, 2020

(54) AUTOMATICALLY ACTUATED REAR AIR DRAG REDUCING SYSTEM AND METHOD OF USE THEREOF

(71) Applicant: TRANSTEX LLC, Montreal (CA)

(72) Inventors: Mathieu Boivin, MontRoyal (CA); Sylvain Daoust, Vaudreuil-Dorion (CA); Alexandre Derny, Roxboro (CA); Alfredo Javier, LaSalle (CA)

(73) Assignee: Transtex Inc., Montreal, QC (CA)

( * ) Notice: Subject to any disclaimer, the term of this patent is extended or adjusted under 35 U.S.C. 154(b) by 0 days.

(21) Appl. No.: 16/225,601

(22) Filed: Dec. 19, 2018

(65) Prior Publication Data

US 2019/0185075 A1    Jun. 20, 2019

Related U.S. Application Data

(60) Provisional application No. 62/608,192, filed on Dec. 20, 2017.

(51) Int. Cl.
 *B62D 35/00* (2006.01)
 *G05D 3/00* (2006.01)
 *B62D 63/08* (2006.01)

(52) U.S. Cl.
 CPC ......... *B62D 35/001* (2013.01); *B62D 35/007* (2013.01); *G05D 3/00* (2013.01); *B62D 63/08* (2013.01)

(58) Field of Classification Search
 CPC ............................ B62D 35/001; B62D 35/007
 USPC ............................................ 296/180.2, 180.3
 See application file for complete search history.

(56) References Cited

U.S. PATENT DOCUMENTS

| | | |
|---|---|---|
| 3,010,754 A | 11/1961 | Shumaker |
| 4,142,755 A | 3/1979 | Keedy |
| 4,214,787 A | 7/1980 | Chain |
| 4,257,641 A | 3/1981 | Keedy |
| 4,458,936 A | 7/1984 | Mulholland |
| 4,508,380 A | 4/1985 | Sankrithi |
| 4,682,808 A | 7/1987 | Bilanin |
| 4,702,509 A | 10/1987 | Elliott, Sr. |
| 4,741,569 A | 5/1988 | Sutphen |
| 4,978,162 A | 12/1990 | Labbe |

(Continued)

FOREIGN PATENT DOCUMENTS

| | | |
|---|---|---|
| CA | 2004059 | 11/1989 |
| CA | 2281064 | 8/1999 |

(Continued)

OTHER PUBLICATIONS

WIPO PCT International_Search_Report_Written_Opinion_PCT/CA2018/000239—Mar. 4, 2019.

*Primary Examiner* — Joseph D. Pape
(74) *Attorney, Agent, or Firm* — Mathieu Audet

(57) ABSTRACT

This invention relates to an actuated aerodynamic air drag reducing apparatus for reducing the air drag of a vehicle, the actuated aerodynamic air drag reducing apparatus being adapted to move between an expanded configuration and a retracted configuration by an actuator on a basis of a signal associated to the behavior of the vehicle. The actuator being connected to a slider selectively connected to a pair of pivotable elongated members for being used between a plurality of configurations.

18 Claims, 58 Drawing Sheets

(56) References Cited

U.S. PATENT DOCUMENTS

| | | |
|---|---|---|
| 5,240,306 A | 8/1993 | Flemming |
| 5,348,366 A | 9/1994 | Baker |
| 5,375,903 A | 12/1994 | Lechner |
| 5,823,610 A | 10/1998 | Ryan |
| 6,092,861 A | 7/2000 | Whelan |
| 6,286,894 B1 | 9/2001 | Kingham |
| 6,309,010 B1 | 10/2001 | Whitten |
| 6,457,766 B1 | 10/2002 | Telnack |
| 6,467,833 B1 | 10/2002 | Travers |
| 6,485,087 B1 | 11/2002 | Roberge |
| 6,595,578 B1 | 7/2003 | Calsoyds |
| 6,779,791 B2 | 10/2004 | Reiman et al. |
| 6,799,791 B2 * | 10/2004 | Reiman ............... B62D 35/004 296/180.1 |
| 7,147,270 B1 | 12/2006 | Andrus |
| 7,243,980 B2 | 7/2007 | Vala |
| 7,618,086 B2 | 11/2009 | Breidenbach |
| 7,748,771 B2 | 7/2010 | Distel |
| 7,845,708 B2 | 12/2010 | Breidenbach |
| 7,854,468 B2 | 12/2010 | Vogel |
| 7,857,376 B2 | 12/2010 | Breidenbach |
| 7,950,720 B2 | 5/2011 | Skopic |
| 8,033,594 B2 | 10/2011 | Nusbaum |
| 8,100,461 B2 | 1/2012 | Smith |
| 8,136,868 B2 | 3/2012 | Nusbaum |
| 8,162,381 B2 | 4/2012 | Tertnes |
| 8,177,287 B2 | 5/2012 | Vogel |
| 8,235,456 B2 | 8/2012 | Nusbaum |
| 8,360,509 B2 | 1/2013 | Smith |
| 8,360,510 B2 | 1/2013 | Smith |
| 8,550,539 B1 | 10/2013 | Anderson |
| 8,579,360 B2 | 11/2013 | Litchfield |
| 8,608,228 B2 | 12/2013 | Visentin |
| 8,672,391 B1 | 3/2014 | Cobb |
| 8,696,047 B2 | 4/2014 | Nusbaum |
| 8,708,399 B2 | 4/2014 | Smith |
| 8,770,650 B1 | 7/2014 | Brosseau |
| 8,783,757 B2 | 7/2014 | Henderson |
| 8,820,817 B1 | 9/2014 | Anderson |
| 8,845,007 B2 | 9/2014 | Ryan |
| 8,851,554 B2 | 10/2014 | Wayburn |
| 8,911,000 B2 | 12/2014 | Nusbaum |
| 8,925,997 B2 | 1/2015 | Hjelm |
| 8,973,972 B2 | 3/2015 | Dieckmann |
| 8,973,974 B2 | 3/2015 | Kunkel |
| 8,985,677 B2 | 3/2015 | Wiegel |
| 9,039,069 B2 | 5/2015 | Smith |
| 9,079,623 B2 | 7/2015 | Bernhardt |
| 9,139,238 B2 | 9/2015 | Visser |
| 9,145,177 B2 | 9/2015 | Smith |
| 9,168,959 B2 | 10/2015 | Smith |
| 9,180,919 B2 | 11/2015 | Breidenbach |
| 9,199,673 B2 | 12/2015 | Baker |
| 9,296,434 B2 | 3/2016 | Anderson |
| 9,346,496 B2 | 5/2016 | Breidenbach |
| 9,440,688 B2 | 9/2016 | Smith |
| 9,457,847 B2 | 10/2016 | Smith |
| 9,487,250 B2 | 11/2016 | Morrison |
| 9,505,449 B2 | 11/2016 | Telnack |
| 9,522,706 B1 | 12/2016 | Breidenbach |
| 9,527,534 B2 | 12/2016 | Knobloch |
| 9,545,960 B2 | 1/2017 | Smith |
| 9,545,961 B2 | 1/2017 | Breidenbach |
| 9,555,841 B1 | 1/2017 | Roush |
| 9,580,117 B1 | 2/2017 | Krstovic |
| 9,616,944 B2 | 4/2017 | Baker |
| 9,616,945 B1 | 4/2017 | Henderson |
| 9,637,182 B2 | 5/2017 | Wayburn |
| 9,637,184 B1 | 5/2017 | Bennett |
| 9,650,086 B1 | 5/2017 | Pfaff |
| 9,682,734 B2 | 6/2017 | Reeder |
| 9,776,674 B2 | 10/2017 | Baker |
| 9,815,504 B2 | 11/2017 | Buffo |
| 9,815,505 B2 | 11/2017 | Wiegel |
| 9,815,507 B2 | 11/2017 | Breidenbach |
| 9,834,261 B2 | 12/2017 | Dieckmann |
| 9,834,262 B2 | 12/2017 | Baker |
| 9,845,118 B2 | 12/2017 | Dieckmann |
| 9,855,982 B2 | 1/2018 | Baker |
| 9,868,477 B2 | 1/2018 | Breidenbach |
| 9,873,466 B2 | 1/2018 | Tuerk |
| 9,873,467 B2 | 1/2018 | Wall, II |
| 9,896,138 B2 | 2/2018 | De Bock |
| 9,926,019 B1 | 3/2018 | Bennett |
| 2006/0273625 A1 | 12/2006 | Andrus |
| 2007/0046066 A1 | 3/2007 | Cosgrove |
| 2007/0176465 A1 | 8/2007 | Wood |
| 2008/0093886 A1 | 4/2008 | Nusbaum |
| 2008/0309122 A1 | 12/2008 | Smith |
| 2009/0140542 A1 | 6/2009 | Breidenbach |
| 2009/0200834 A1 | 8/2009 | Vogel |
| 2009/0212594 A1 | 8/2009 | Breidenbach |
| 2009/0236872 A1 | 9/2009 | Wood |
| 2009/0256386 A1 | 10/2009 | Wood |
| 2009/0295189 A1 | 12/2009 | Distel |
| 2010/0123333 A1 | 5/2010 | Breidenbach |
| 2011/0037291 A1 | 2/2011 | Pickering |
| 2011/0068603 A1 | 3/2011 | Domo |
| 2011/0084516 A1 | 4/2011 | Smith |
| 2011/0084517 A1 | 4/2011 | Vogel |
| 2011/0115254 A1 | 5/2011 | Skopic |
| 2011/0148140 A1 | 6/2011 | Benton |
| 2011/0175394 A1 | 7/2011 | Breidenbach |
| 2011/0221231 A1 | 9/2011 | Visser |
| 2011/0304173 A1 | 12/2011 | Breidenbach |
| 2012/0086234 A1 | 4/2012 | Visser |
| 2012/0104791 A1 | 5/2012 | Visentin |
| 2012/0104792 A1 | 5/2012 | Smith |
| 2012/0119540 A1 | 5/2012 | Breidenbach |
| 2012/0223544 A1 | 9/2012 | Benton |
| 2012/0261945 A1 | 10/2012 | Litchfield |
| 2012/0292945 A1 | 11/2012 | Nusbaum |
| 2013/0038086 A1 | 2/2013 | Breidenbach |
| 2013/0057019 A1 | 3/2013 | Breidenbach |
| 2013/0057020 A1 | 3/2013 | Burrell |
| 2013/0076063 A1 | 3/2013 | Ryan |
| 2013/0076064 A1 | 3/2013 | Smith |
| 2013/0076068 A1 | 3/2013 | Wayburn |
| 2013/0106136 A1 | 5/2013 | Smith |
| 2013/0214557 A1 | 8/2013 | Smith |
| 2013/0241232 A1 | 9/2013 | Ryan |
| 2014/0019010 A1 | 1/2014 | Smith |
| 2014/0035317 A1 | 2/2014 | Anderson |
| 2014/0077526 A1 | 3/2014 | Breidenbach |
| 2014/0110969 A1 | 4/2014 | Hjelm |
| 2014/0117713 A1 | 5/2014 | Baker |
| 2014/0132031 A1 | 5/2014 | Dieckmann |
| 2014/0217775 A1 | 8/2014 | Breidenbach |
| 2014/0292024 A1 | 10/2014 | Smith |
| 2014/0319870 A1 | 10/2014 | Breidenbach |
| 2014/0339854 A1 | 11/2014 | Tuerk |
| 2014/0346807 A1 | 11/2014 | Breidenbach |
| 2014/0367993 A1 | 12/2014 | Breidenbach |
| 2015/0008700 A1 | 1/2015 | Ryan |
| 2015/0008701 A1 | 1/2015 | Ryan |
| 2015/0035312 A1 | 2/2015 | Grandominico |
| 2015/0035313 A1 | 2/2015 | Wayburn |
| 2015/0102633 A1 | 4/2015 | Dieckmann |
| 2015/0115651 A1 | 4/2015 | Conboy |
| 2015/0166129 A1 | 6/2015 | Camosy |
| 2015/0175221 A1 | 6/2015 | Popa |
| 2015/0197292 A1 | 7/2015 | Smith |
| 2015/0274220 A1 | 10/2015 | Telnack |
| 2015/0291231 A1 | 10/2015 | Smith |
| 2016/0009322 A1 | 1/2016 | Telnack |
| 2016/0046333 A1 | 2/2016 | Baker |
| 2016/0167720 A1 | 6/2016 | Breidenbach |
| 2016/0185399 A1 | 6/2016 | Smith |
| 2016/0200377 A1 | 7/2016 | Grandominico |
| 2016/0236726 A1 | 8/2016 | Baker |
| 2016/0251040 A1 | 9/2016 | De Bock |
| 2016/0318559 A1 | 11/2016 | Baker |
| 2016/0325792 A1 | 11/2016 | Telnack |
| 2017/0021872 A1 | 1/2017 | Breidenbach |

(56) References Cited

U.S. PATENT DOCUMENTS

| | | | |
|---|---|---|---|
| 2017/0029044 A1 | 2/2017 | Senatro |
| 2017/0057564 A1 | 3/2017 | Breidenbach |
| 2017/0096179 A1 | 4/2017 | Wall, II |
| 2017/0120966 A1 | 5/2017 | Breidenbach |
| 2017/0129550 A1 | 5/2017 | Baker |
| 2017/0158256 A1 | 6/2017 | Smith |
| 2017/0158260 A1 | 6/2017 | Breidenbach |
| 2017/0259857 A1 | 9/2017 | Breidenbach |
| 2017/0267293 A1 | 9/2017 | Reeder |
| 2017/0274941 A1 | 9/2017 | Kantharaju |
| 2017/0305478 A1 | 10/2017 | Regan |
| 2017/0320527 A1 | 11/2017 | Bacon |
| 2017/0361881 A1 | 12/2017 | Baker |
| 2017/0369107 A1 | 12/2017 | Grandominico |
| 2018/0001941 A1 | 1/2018 | Polidori |
| 2018/0037276 A1 | 2/2018 | Elogab |
| 2018/0043943 A1 | 2/2018 | Polidori |
| 2018/0050742 A1 | 2/2018 | Smith |

FOREIGN PATENT DOCUMENTS

| | | |
|---|---|---|
| CA | 2583852 | 4/2007 |
| CA | 2853727 | 10/2012 |
| CA | 2830680 | 10/2013 |
| CA | 2849696 | 4/2014 |
| CA | 2891265 | 5/2015 |
| CA | 2921058 | 2/2016 |
| CA | 2928493 | 4/2016 |
| CA | 2890193 | 9/2016 |
| CA | 2723882 | 12/2017 |
| CA | 2989605 | 8/2018 |

\* cited by examiner

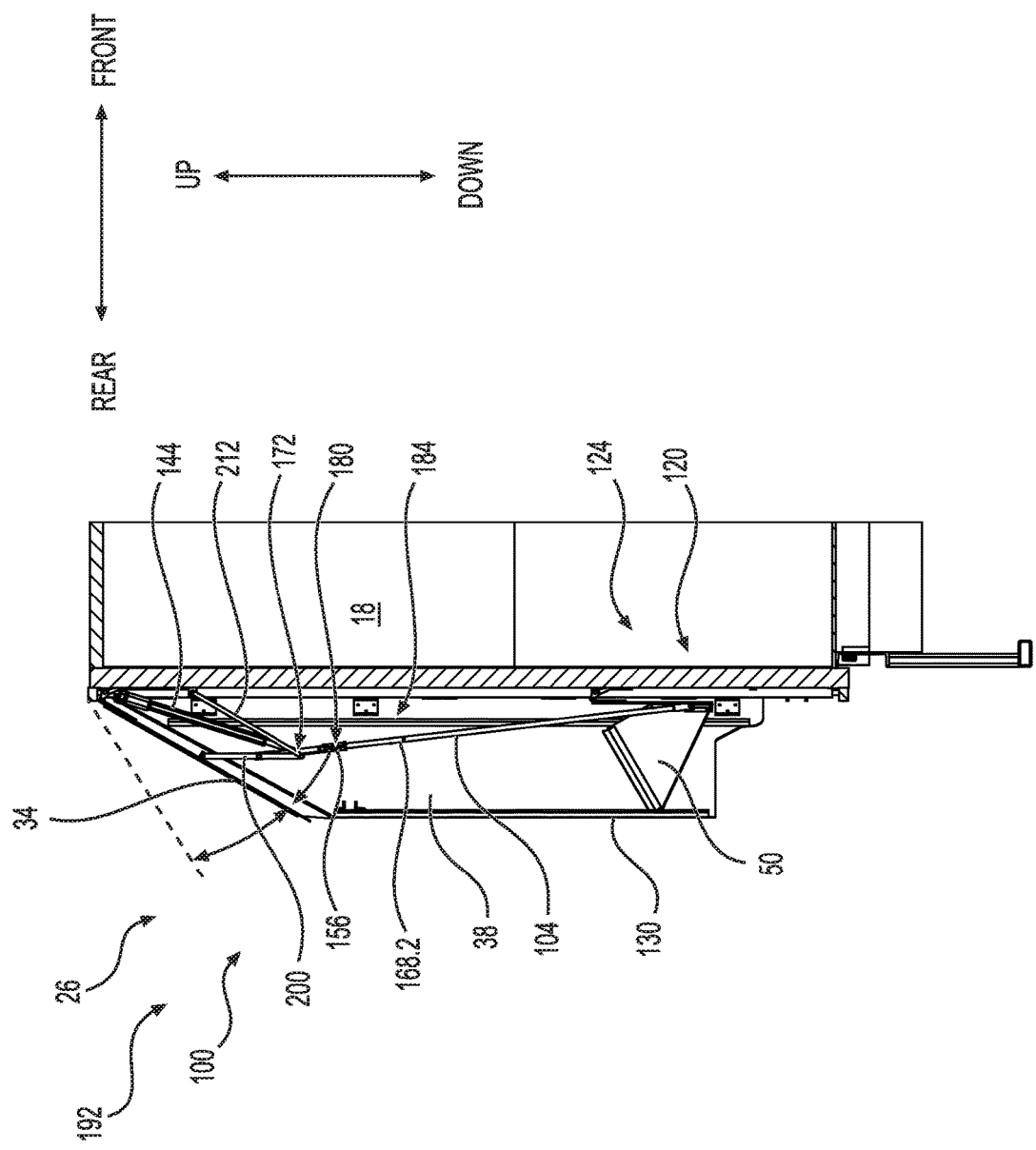

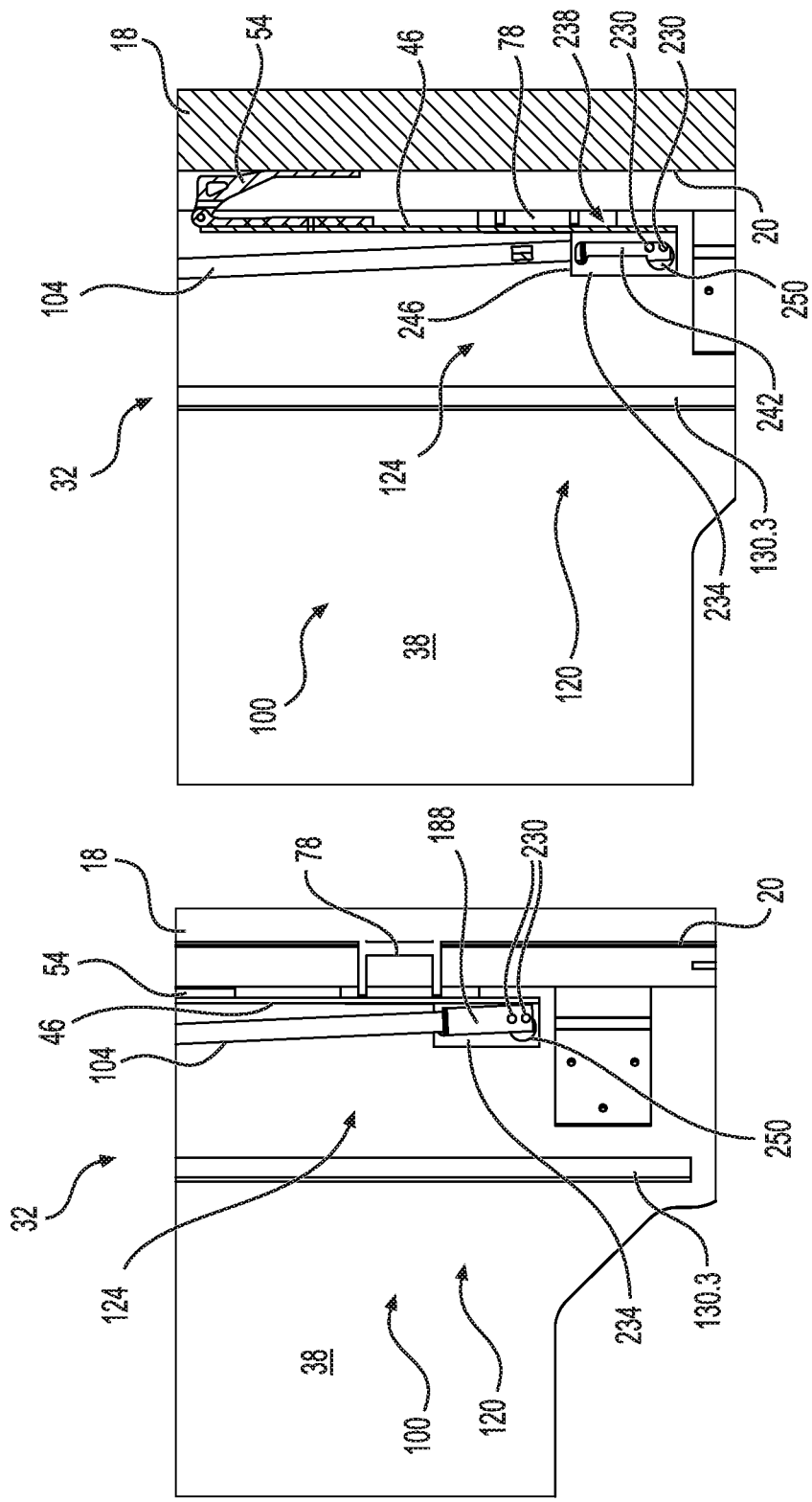

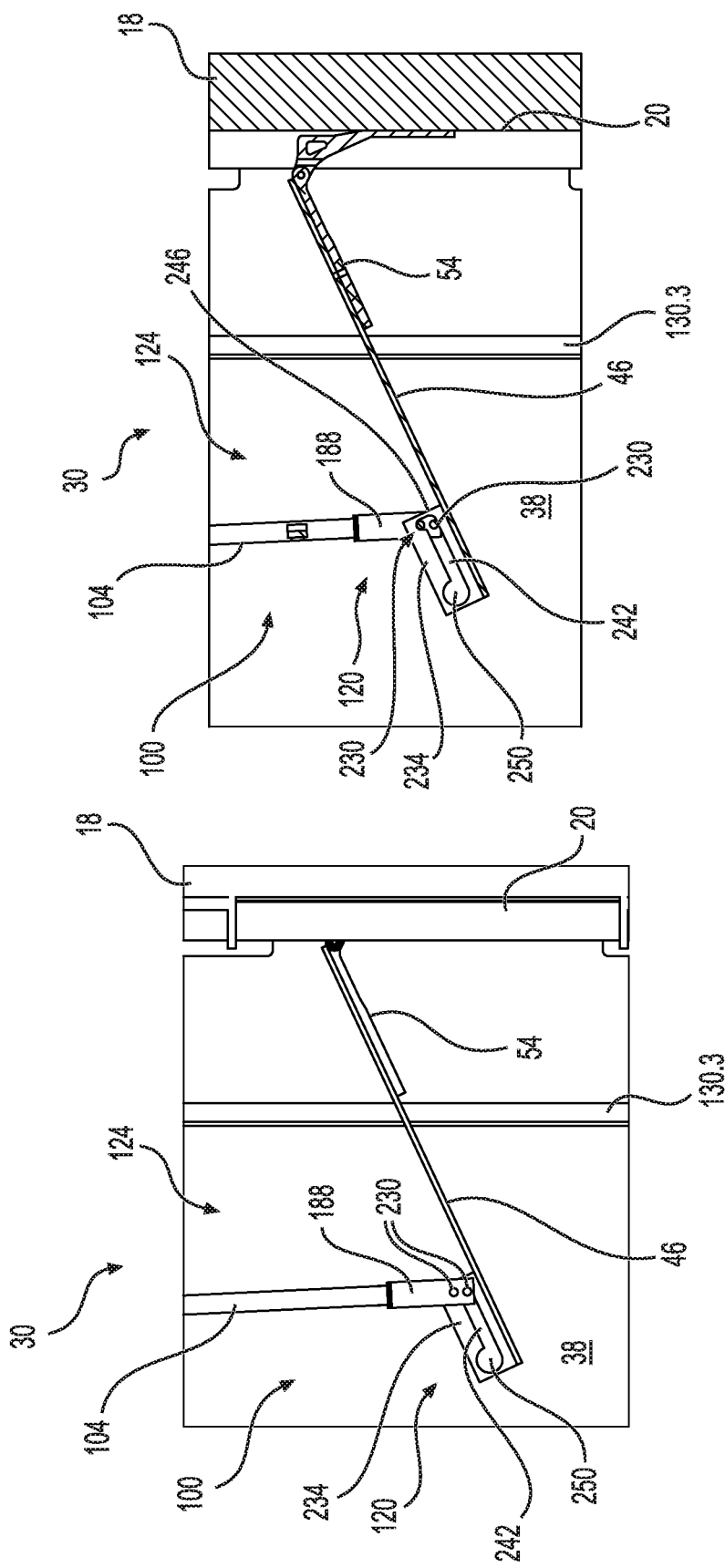

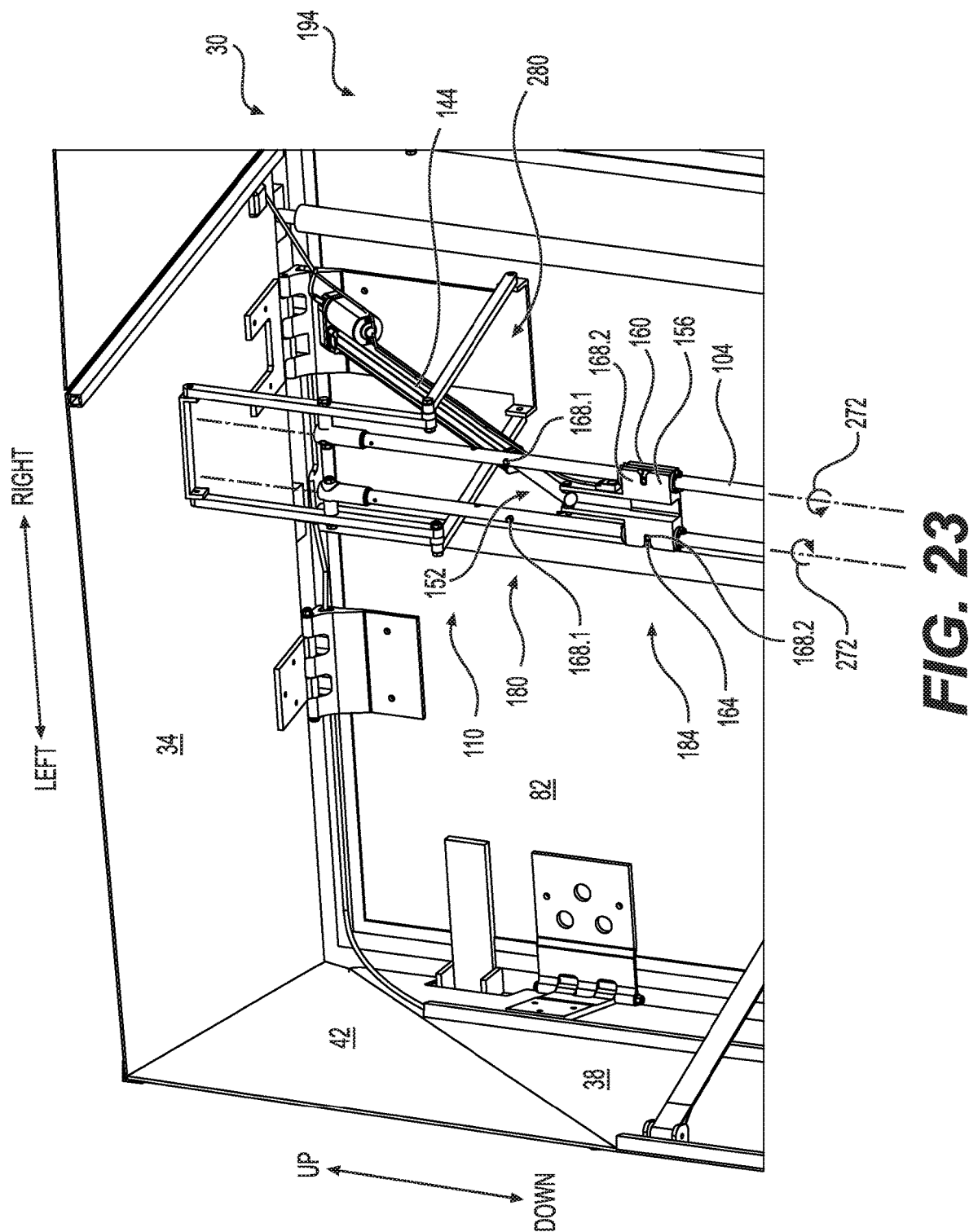

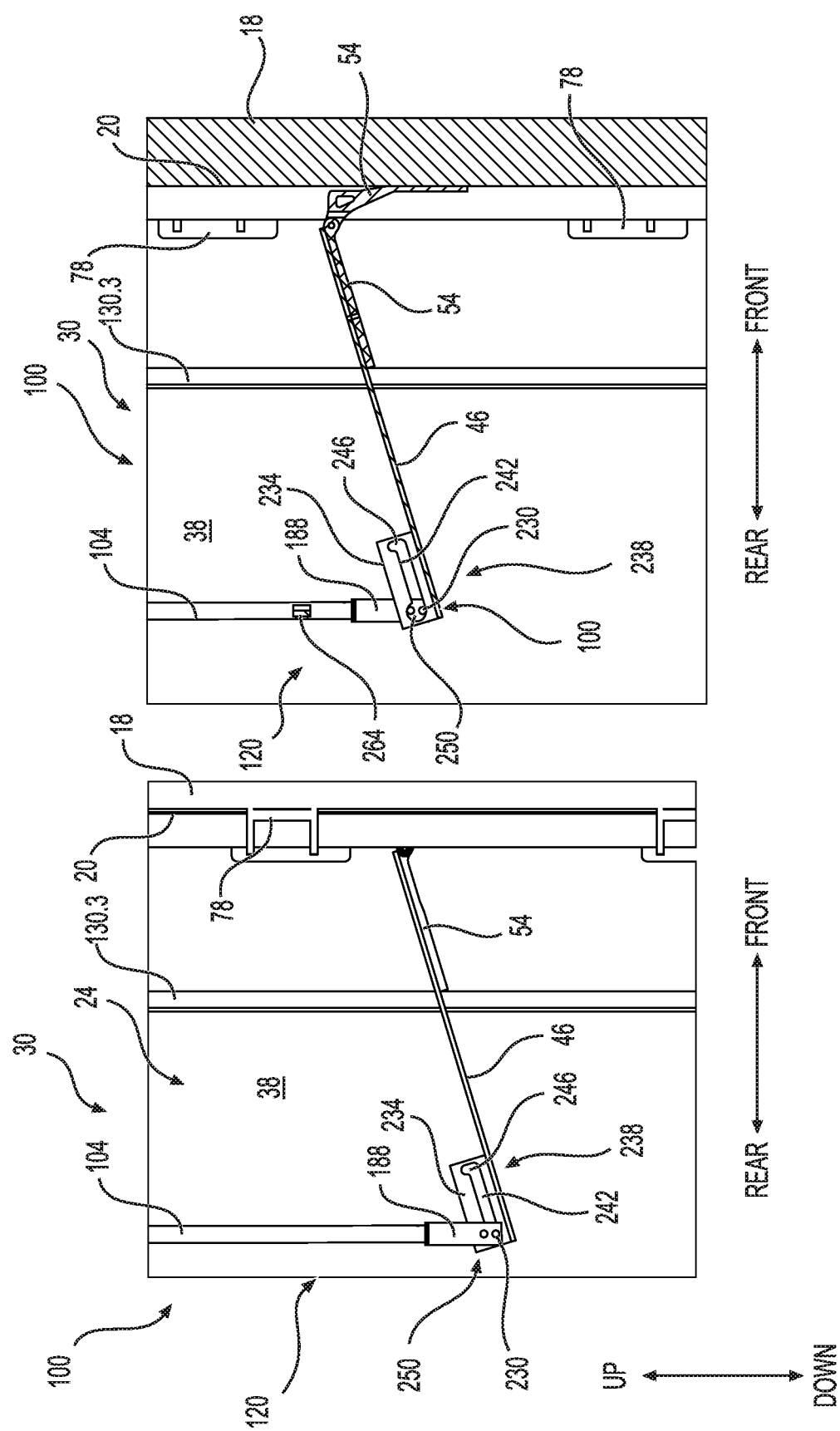

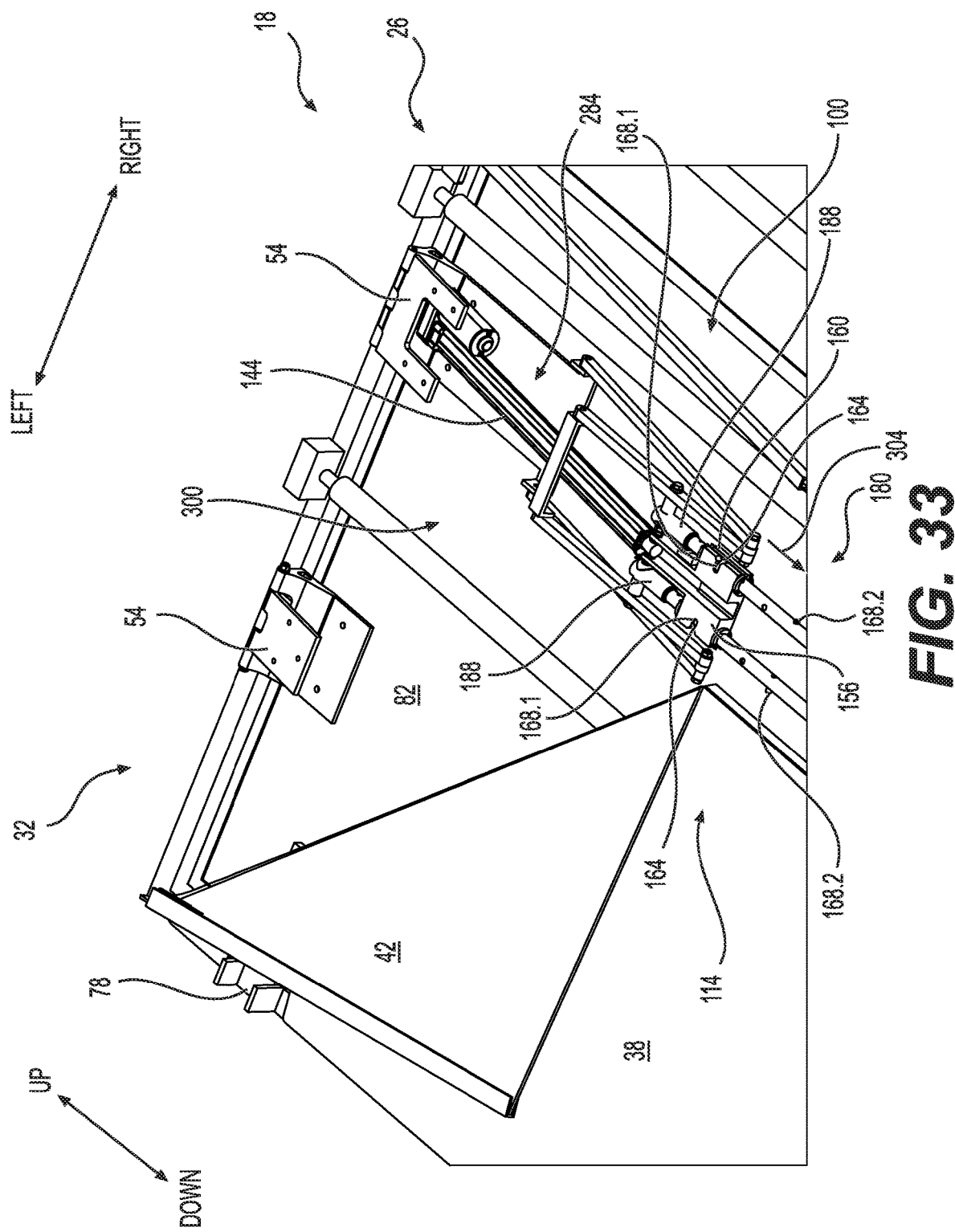

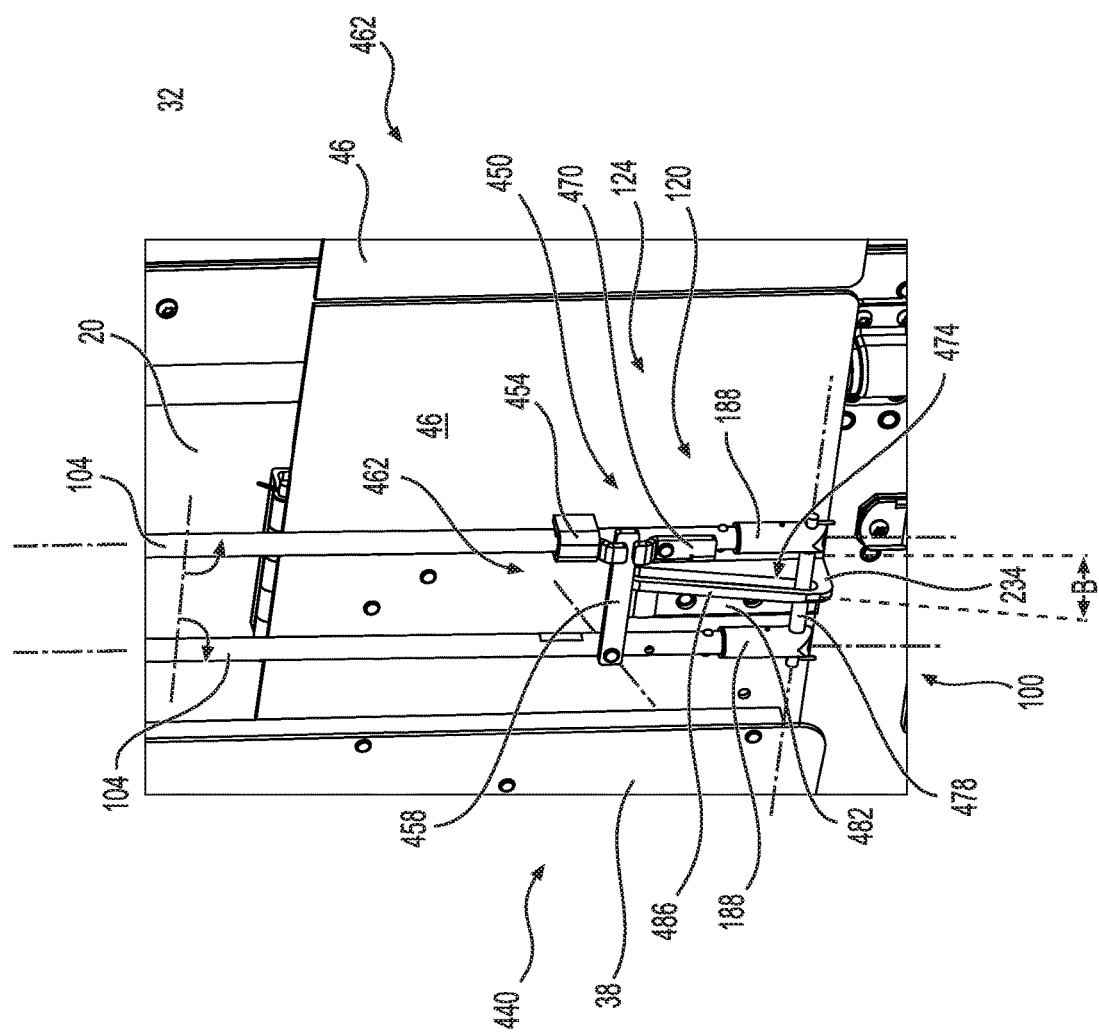

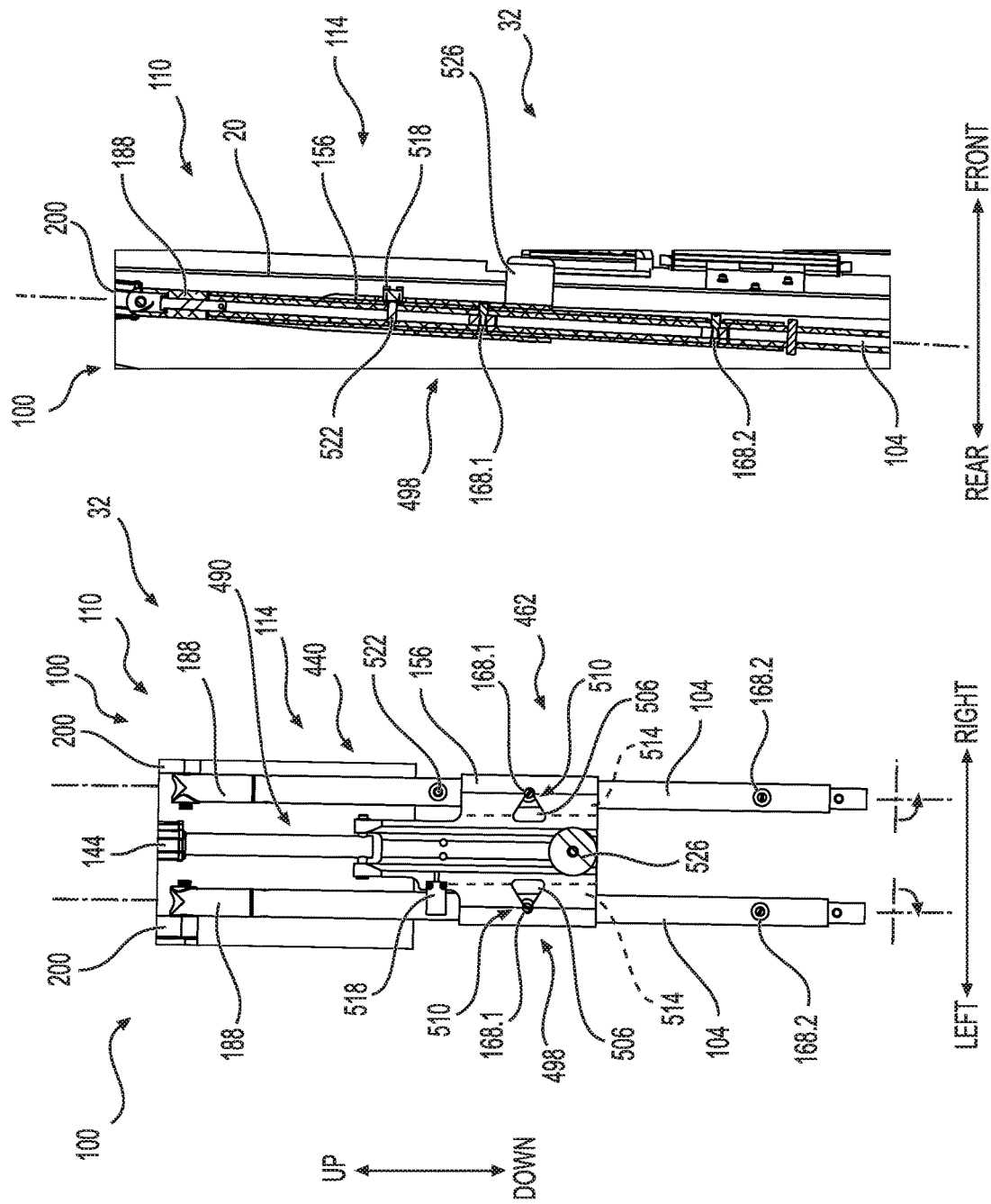

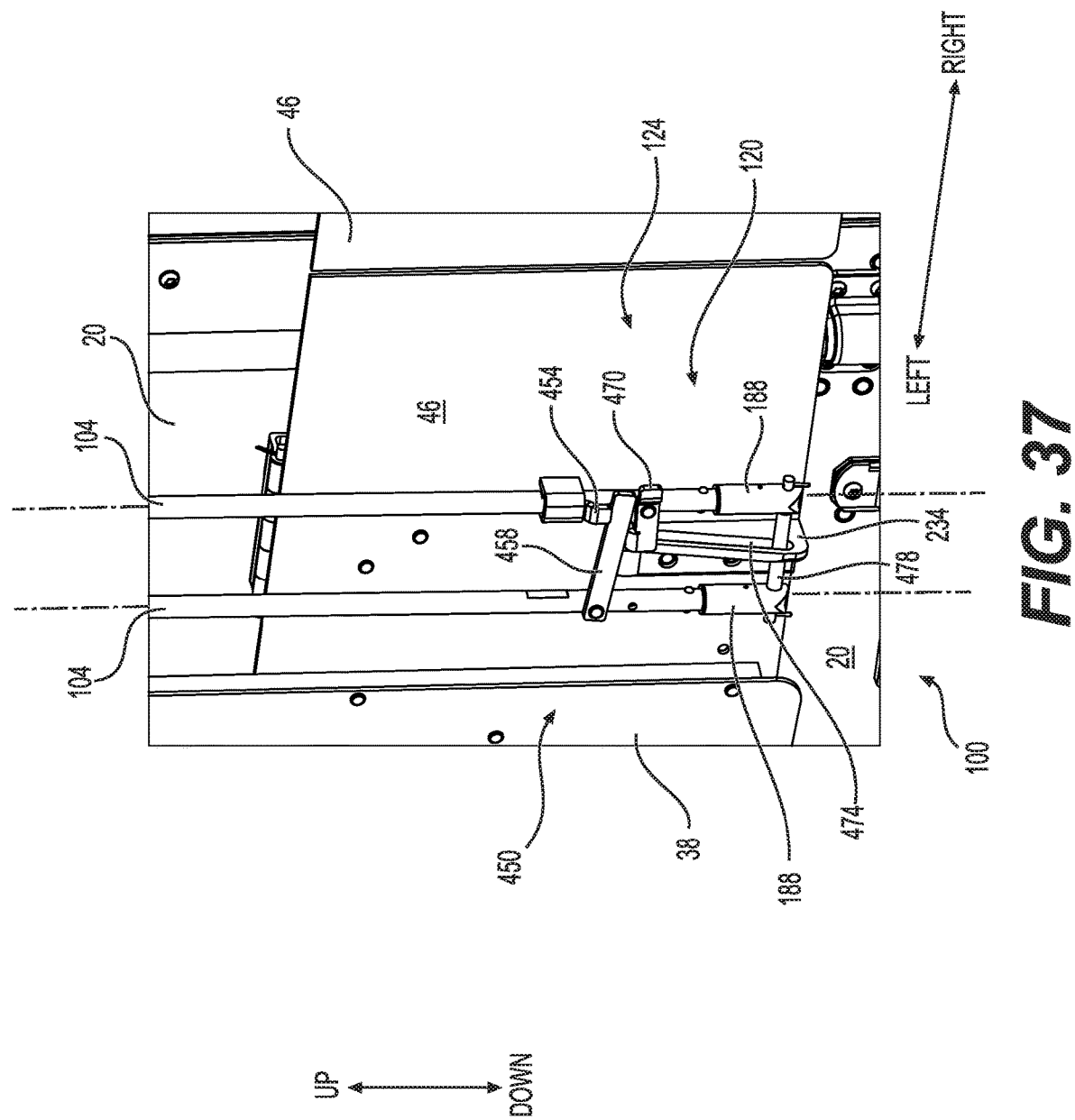

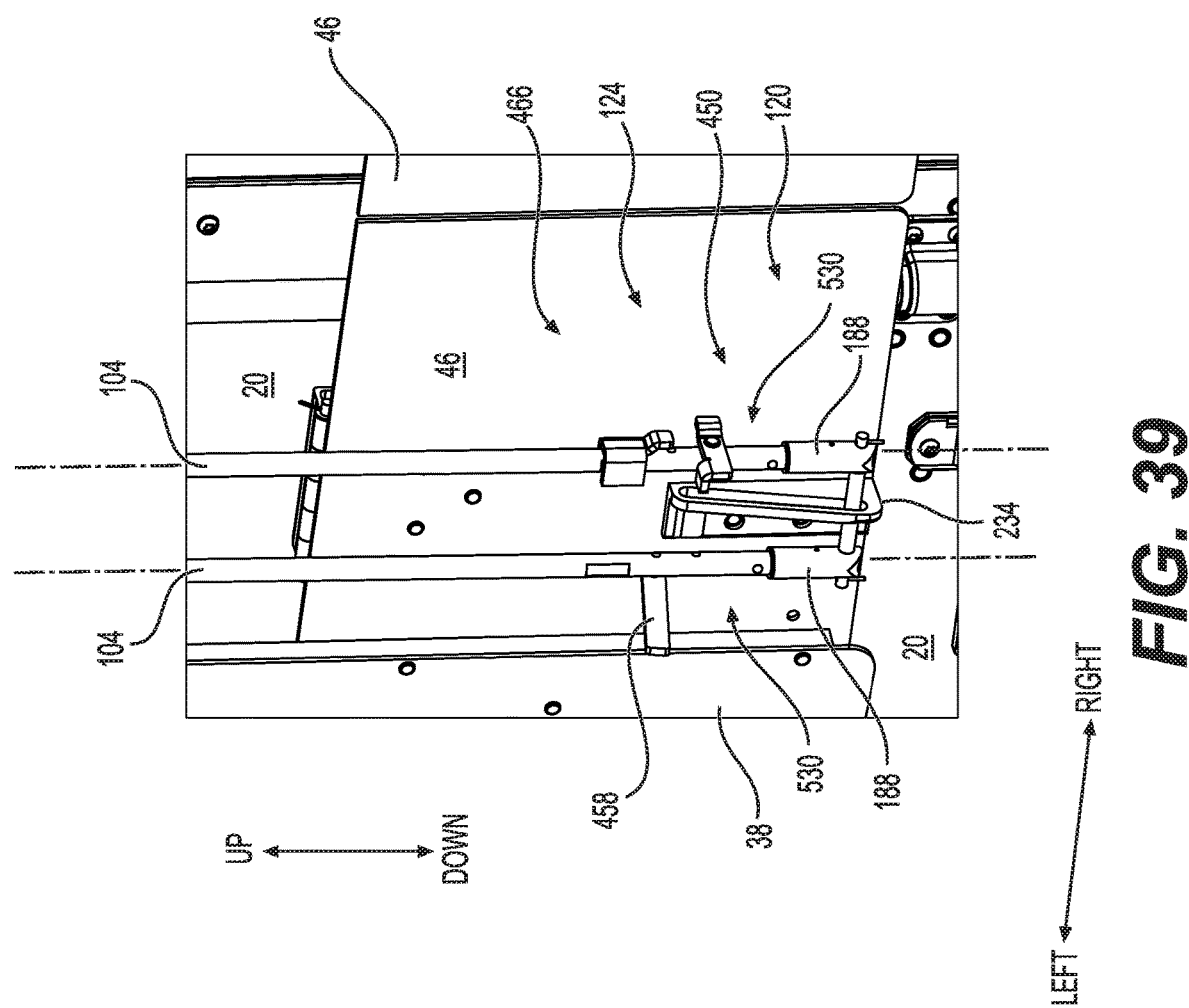

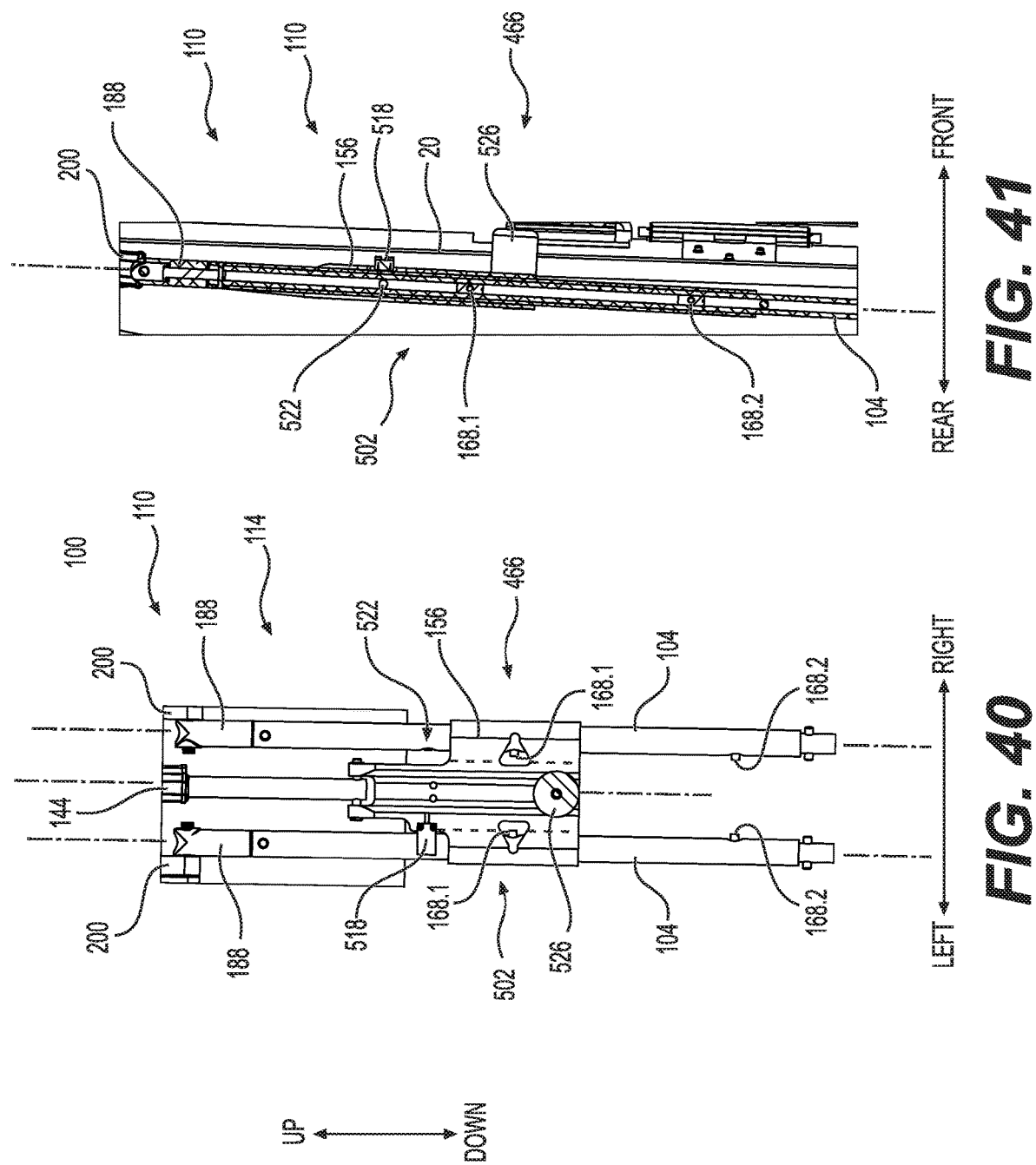

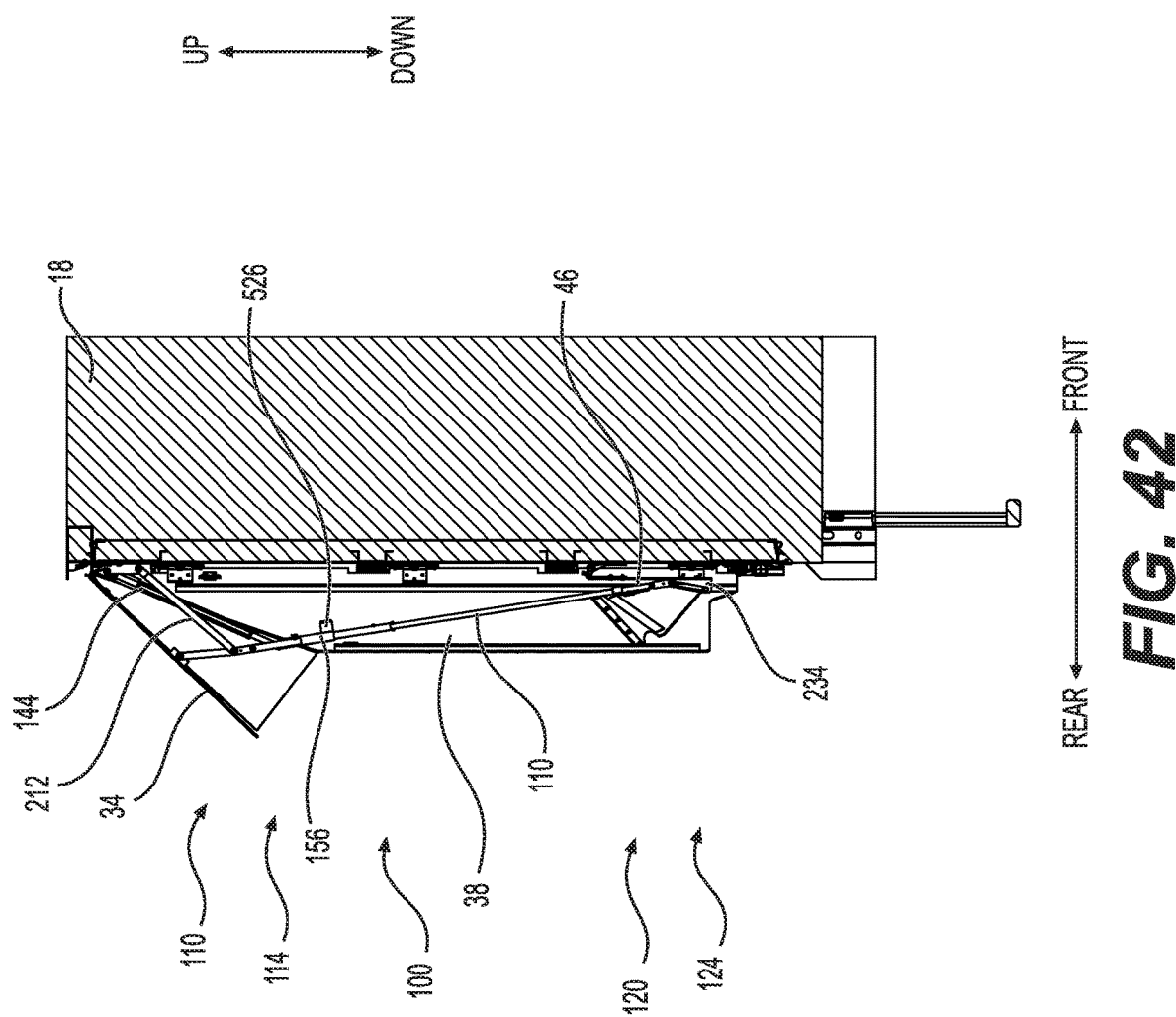

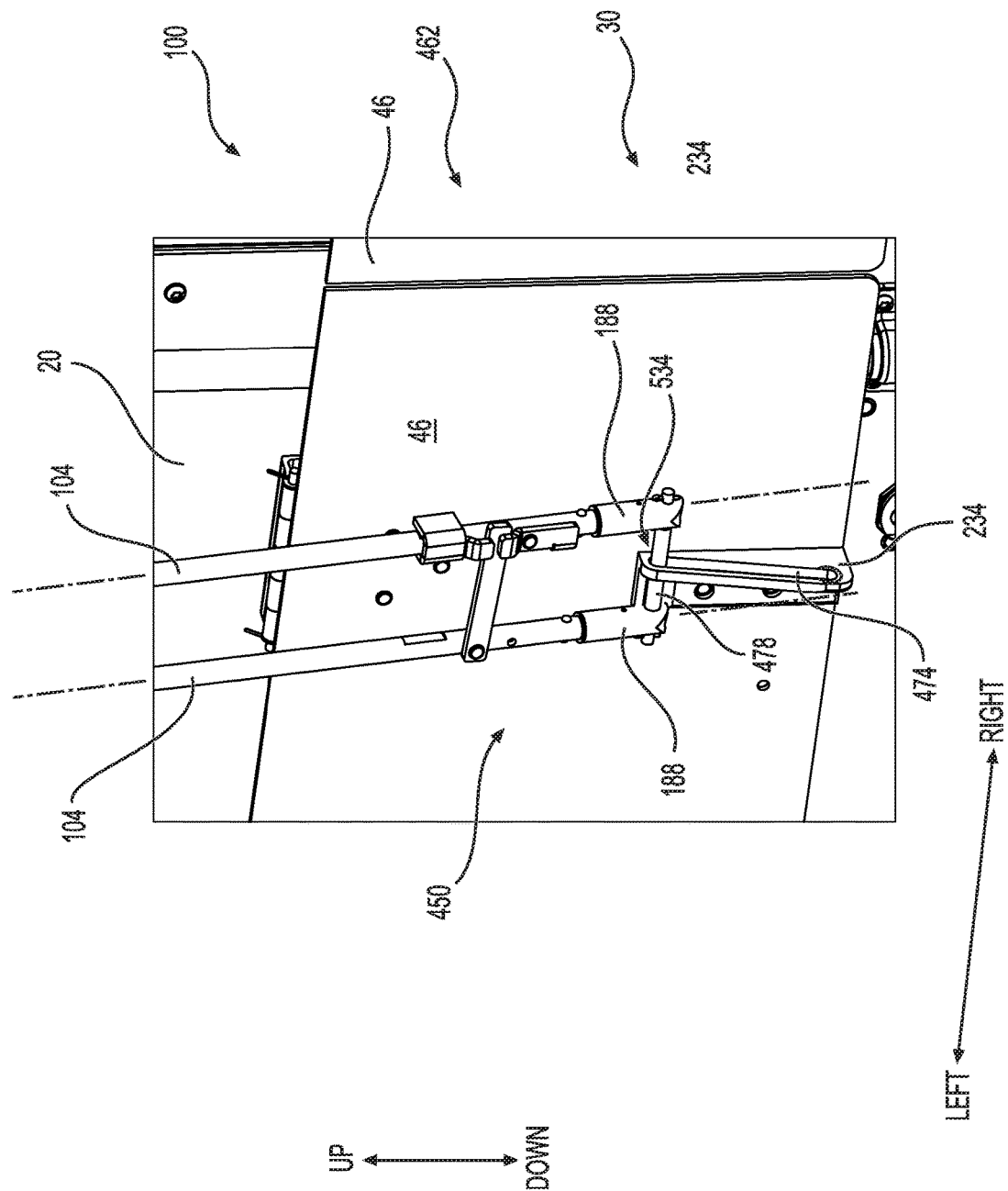

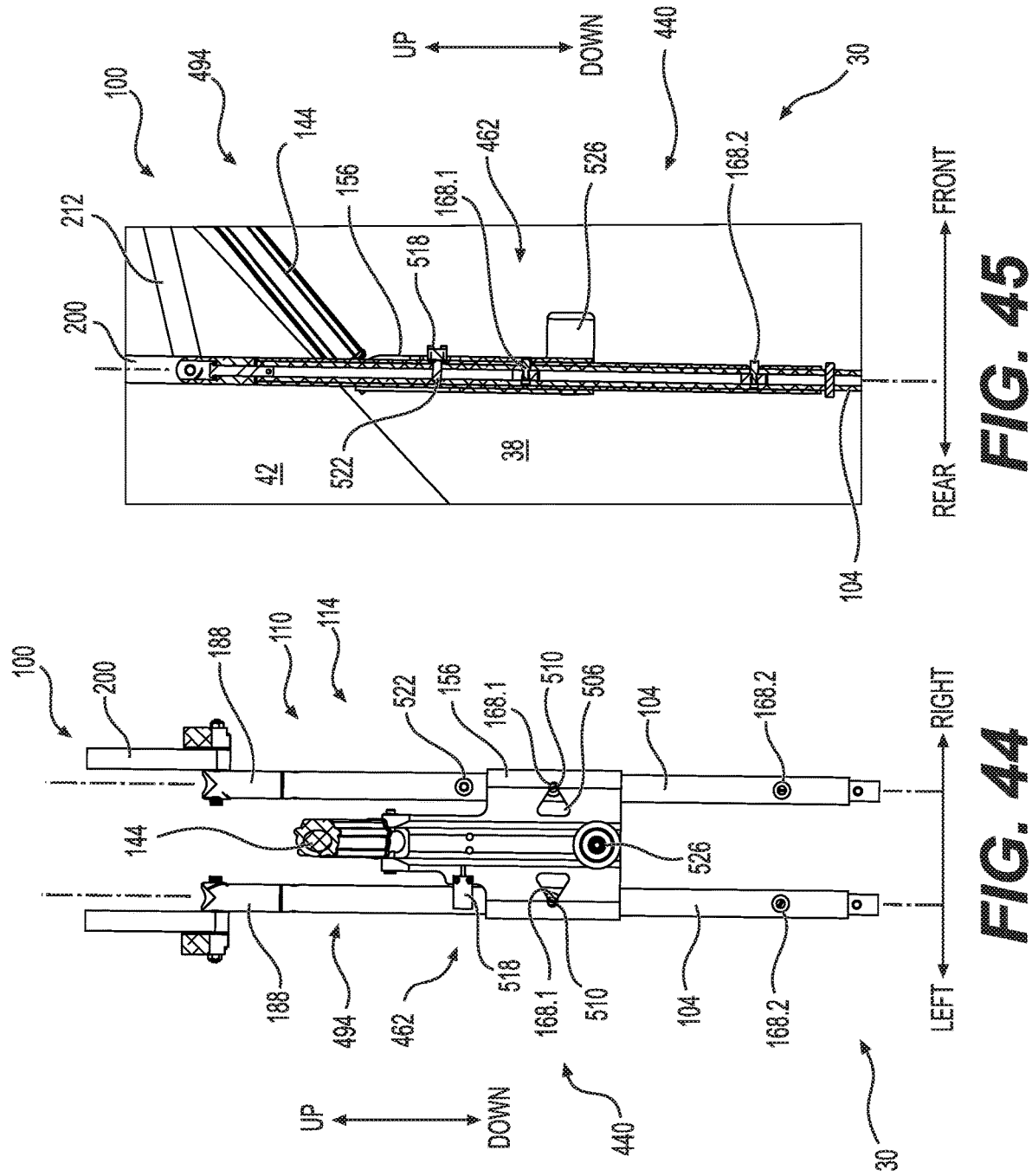

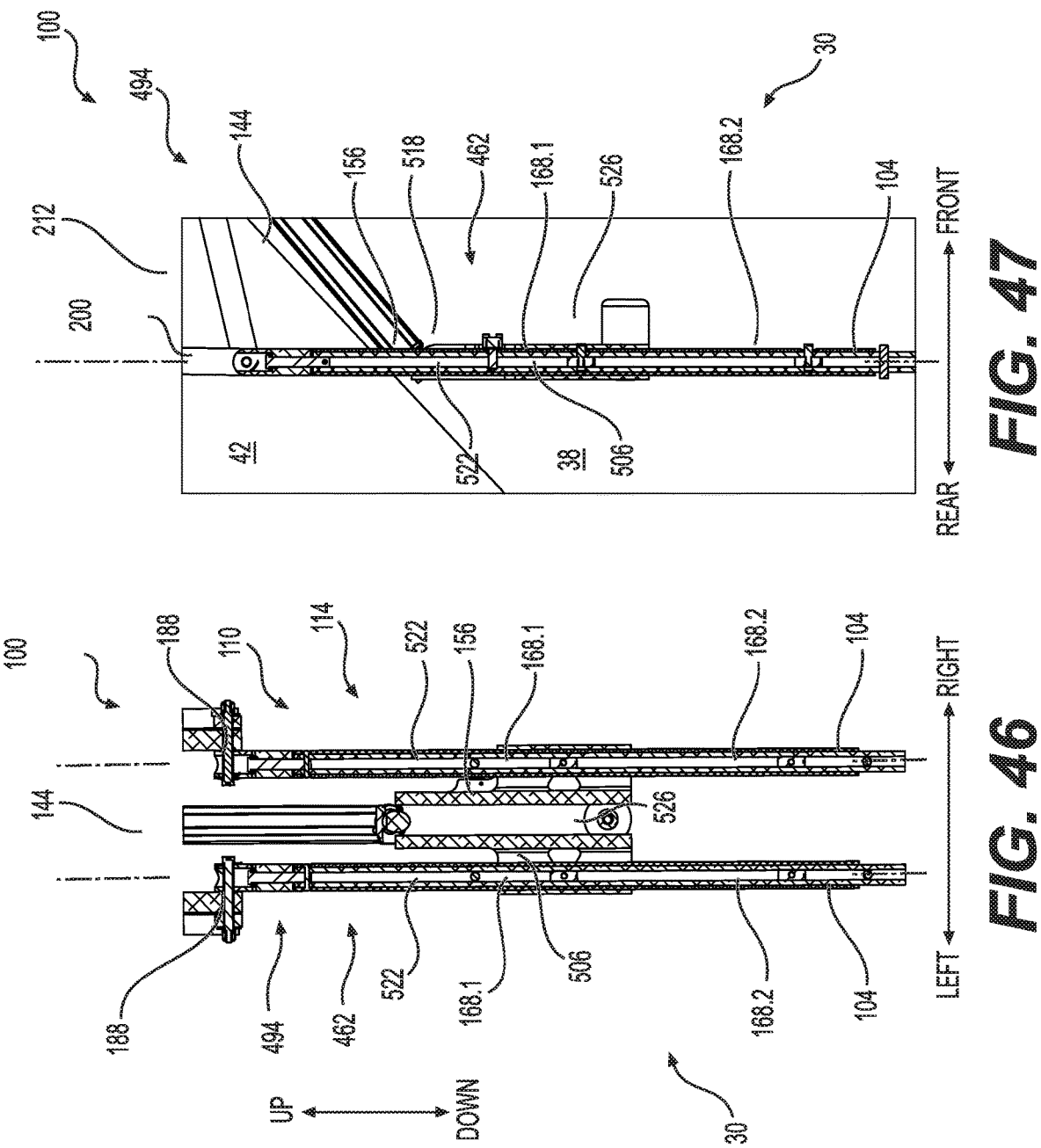

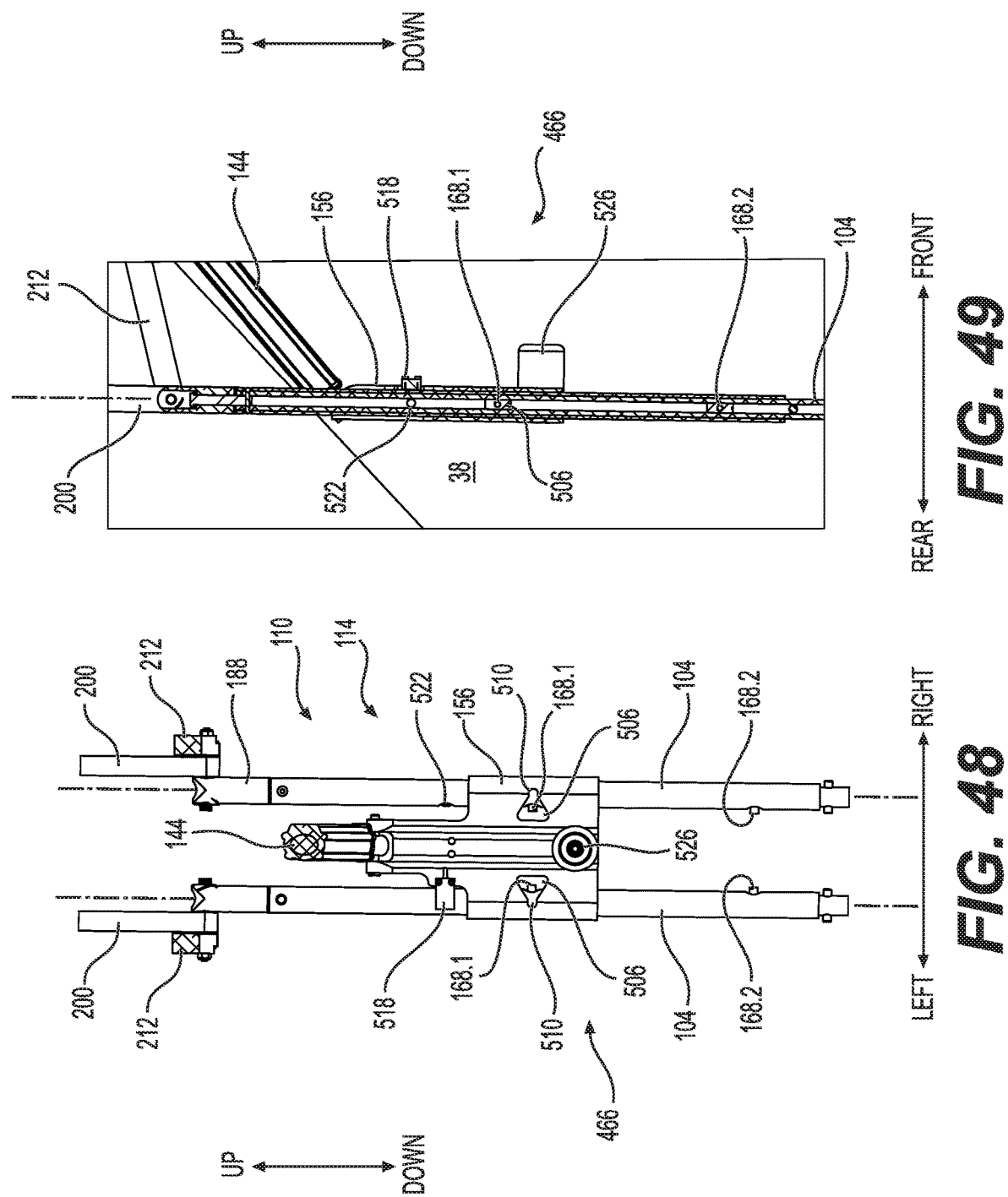

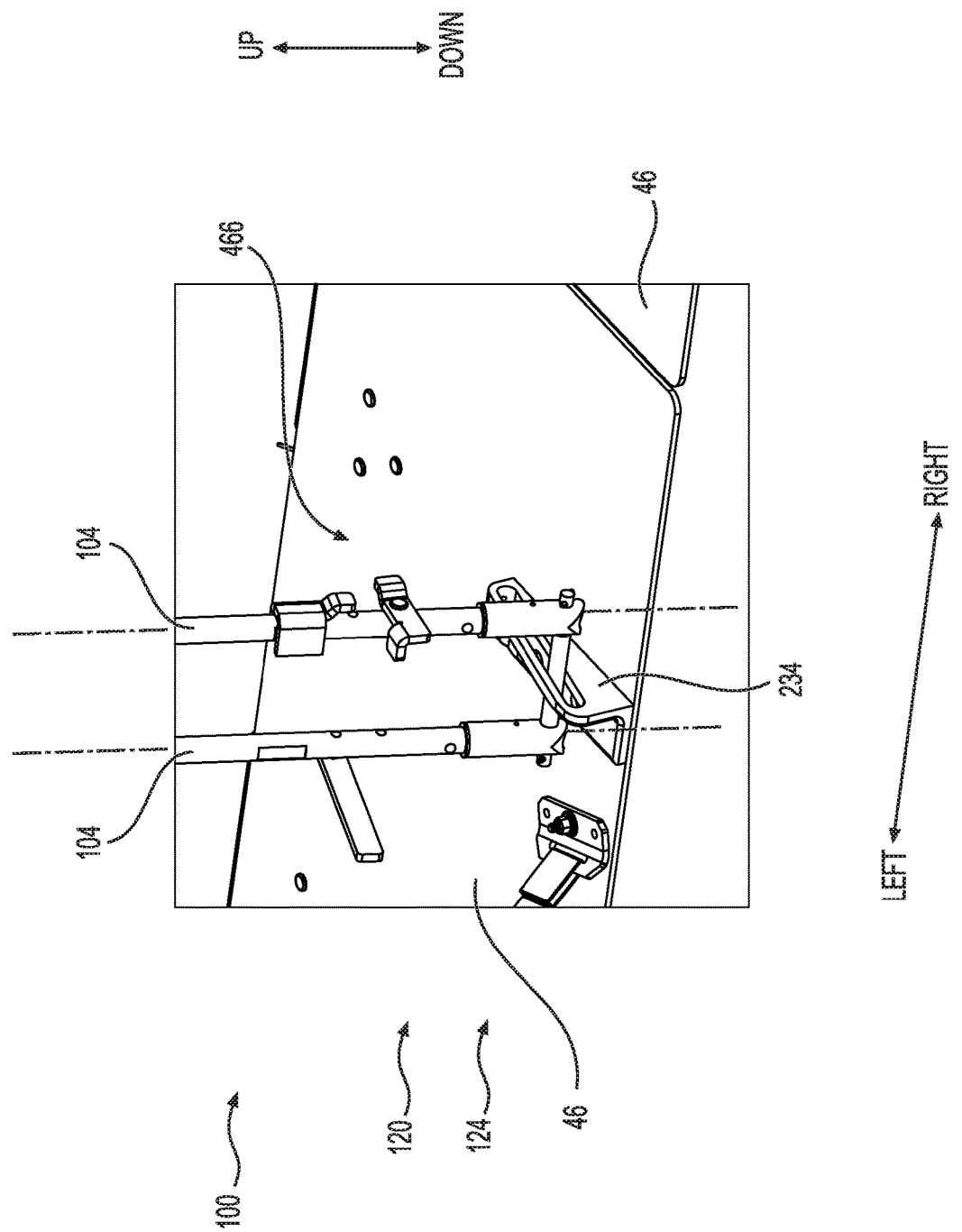

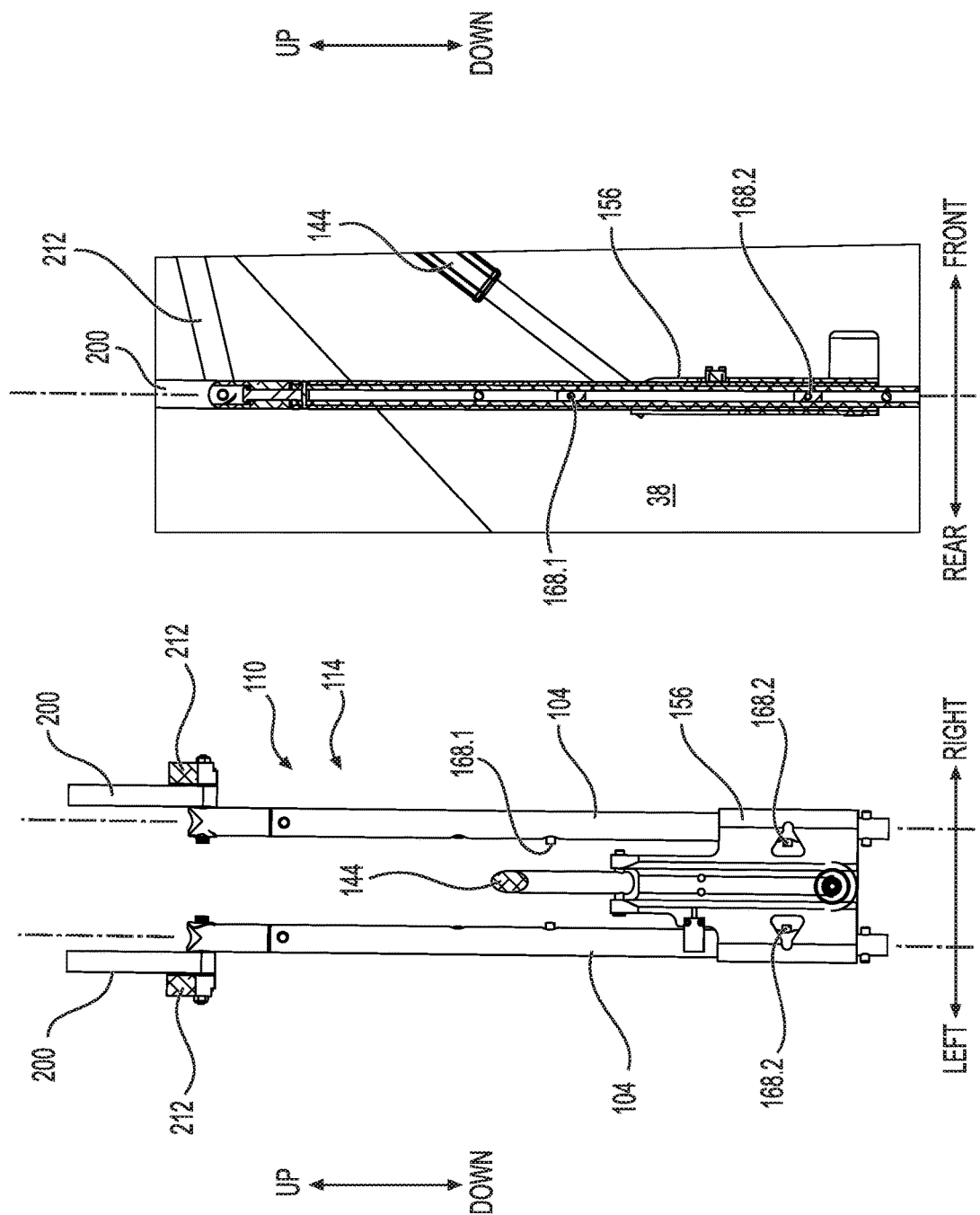

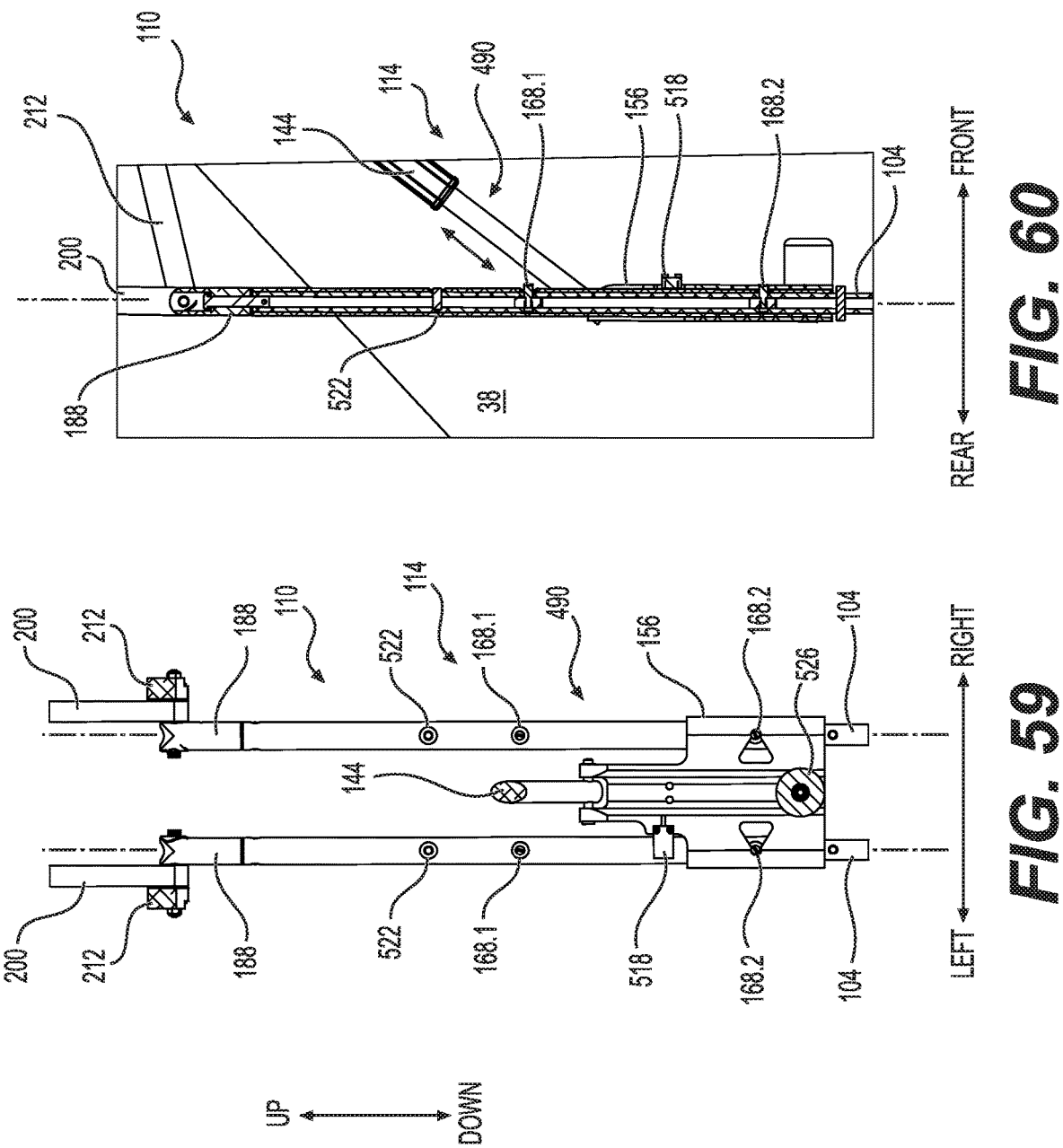

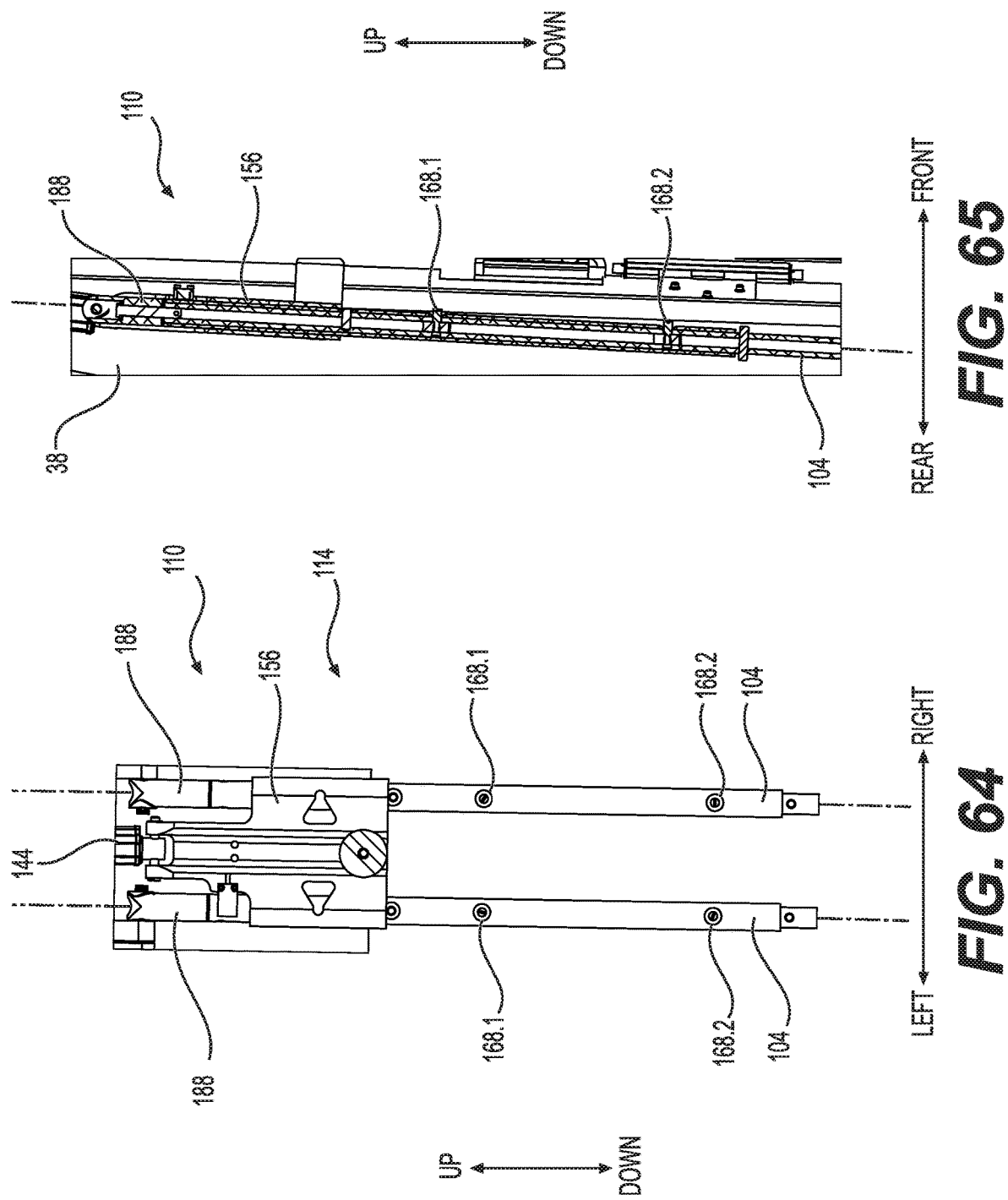

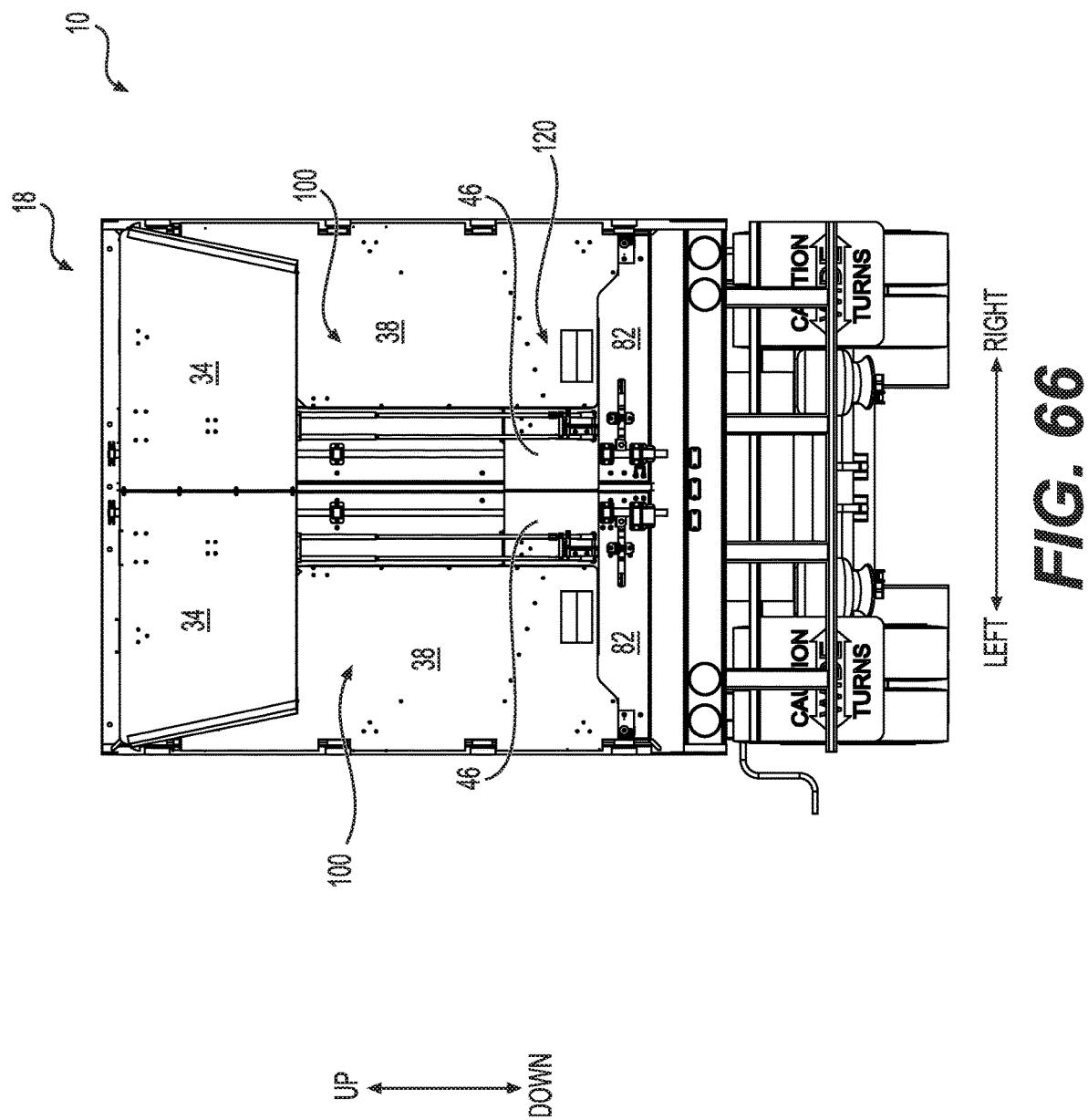

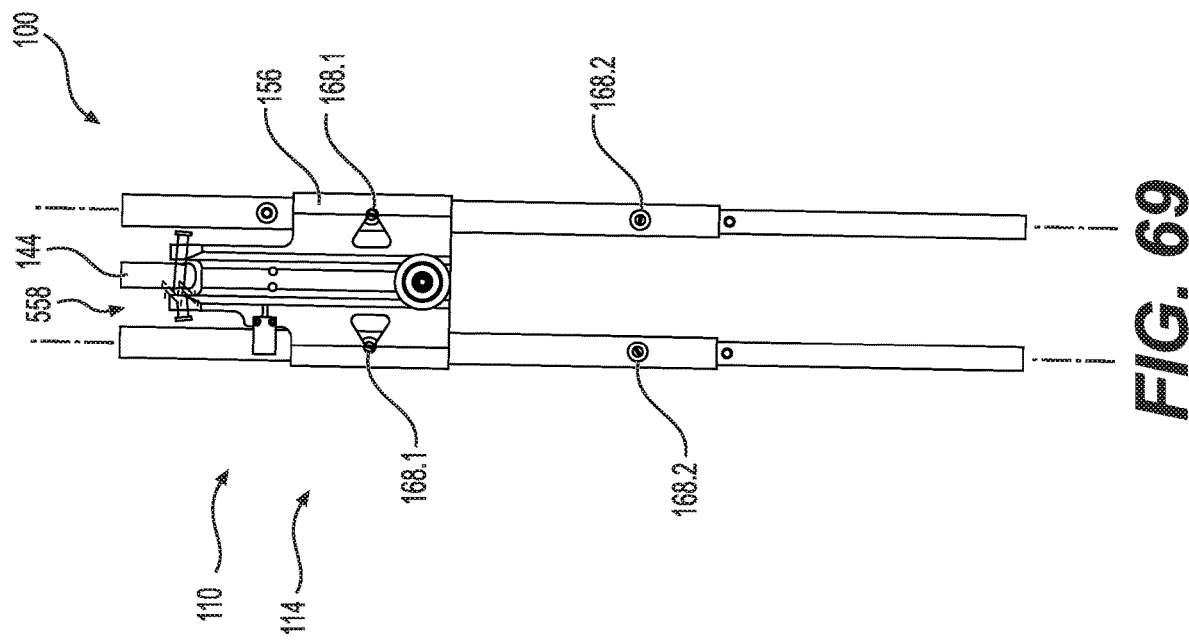

AUTOMATICALLY ACTUATED REAR AIR DRAG REDUCING SYSTEM AND METHOD OF USE THEREOF

CROSS-REFERENCE

The present application relates to, claims priority from and is a non-provisional application of U.S. provisional application No. 62/608,192 filed Dec. 20, 2017 entitled REAR AIR DRAG REDUCING SYSTEM AND METHOD OF USE THEREOF, this document is incorporated herein by reference in its entirety.

FIELD OF THE INVENTION

This invention relates to an aerodynamic drag reducing apparatus adapted to be mounted on a rear portion of a trailer to improve the aerodynamic efficiency of the trailer. The present invention more precisely relates to an automatic vehicle expandable and retractable drag-reducing apparatus.

BACKGROUND OF THE INVENTION

Road tractors are generally used to pull trailers on roads to transport cargo. Aerodynamic apparatuses can be installed on the road tractor and/or on the trailer in order to reduce the aerodynamic air drag and improve fuel efficiency.

Rear drag-reducing apparatuses are generally installed and secured to a rear portion of a trailer to help aerodynamically manage the flow of air behind the trailer. It is known that a significant amount of air drag is resulting when a vehicle travels on a road; this is due to an area of low pressure created at the rear end of the vehicle. For example, with a tractor-trailer type vehicle, the air makes a sharp bend around the squared-off back of the trailer, thus causing turbulence and drag on the vehicle. To overcome this problem, increased engine power is required and therefore undesired increased fuel consumption. Furthermore, the turbulence also causes poor visibility in rainy conditions around the vehicle and an accumulation of dirt on the back of trailers.

In the trucking industry, the aerodynamics of vehicles to reduce fuel consumption is a growing concern. Tests indicate that fuel savings from aerodynamic improvements are equivalent to fuel savings attained by a chassis weight reduction and require fewer services to maintain. The air resistance or aerodynamic drag of the vehicle increases the power needed by the engine as the speed increases. It is generally known that, for example, a tractor-trailer needs about 100 horsepower (HP) to overtake the air drag at a speed of 55 MPH. Approximately half the energy reaching the drive wheels is required to overcome air resistance at cruising speed. Recent tests reveal that the square back end contributes approximately to 30% of the air drag. Therefore, the addition of aerodynamic devices, such as a rear deflector, diminishes the air drag and results in lower fuel consumption.

Rear-deflectors are preferably expandable automatically when the vehicle cruising conditions are met to maximize fuel economy. However, the automatic system is detrimental to manual actuation of the rear-deflectors. Manual actuation of the rear-deflector can be desirable to bypass the automatic system in case of need.

Therefore, it exists a need in the art for an improved air drag reducing apparatus over the existing art. There is a need in the art for such an air drag reducing apparatus that can be easily expanded and retracted. There is also a need for an air drag reducing apparatus that can be automatically expanded and retracted depending of the vehicle's behaviors. There is also a need in the art for an improved air drag reducing apparatus of which automatic behaviors can be bypassed to manually expand and retract the air drag reducing apparatus. Moreover, there is also a need for an air drag reducing apparatus assembly that is using GPS data to automatically expand and retract the air drag reducing apparatus depending of the vehicle's behaviors.

SUMMARY OF THE INVENTION

It is one aspect of the present invention to alleviate one or more of the drawbacks of the background art by addressing one or more of the existing needs in the art.

Accordingly, an aspect of our work, in accordance with at least one embodiment thereof, provides an improved actuated aerodynamic rear air drag reducing apparatus over the prior art.

An aspect of our work, in accordance with at least one embodiment thereof, provides an automatically expandable and actuated aerodynamic air drag reducing apparatus adapted to be installed on a rear portion of the trailer to reduce the aerodynamic drag produced by the movement of the trailer when pulled by a vehicle.

An aspect of our work, in accordance with at least one embodiment thereof, provides an aerodynamic air drag reducing apparatus that is movable between a retracted configuration allowing access in the trailer through the rear doors of the trailer and an expanded configuration improving the aerodynamic quality of the trailer in movement.

An aspect of our work, in accordance with at least one embodiment thereof, provides an aerodynamic air drag reducing apparatus adapted to be installed on a trailer to reduce the aerodynamic drag produced by the movement of the trailer when pulled by a vehicle that has an optimized panels geometry and intervening angles thereof for improving the aerodynamic quality of the trailer.

An aspect of our work, in accordance with at least one embodiment thereof, provides an aerodynamic air drag reducing apparatus that is automatically expanded and retracted according to a signal based at least in part by the vehicle speed. Other external signals, such as global positioning system (GPS) or cellular phone tower triangulation, are also contemplated in the aspect of our work.

An aspect of our work, in accordance with at least one embodiment thereof, provides an actuated aerodynamic air drag reducing apparatus that is expanded in an aerodynamic configuration and retracted in a retracted configuration by an electric actuator operatively connected to the actuated aerodynamic air drag reducing apparatus.

An aspect of our work, in accordance with at least one embodiment thereof, provides an actuated aerodynamic air drag reducing apparatus that is designed to be only secured to the rear doors of a trailer.

An aspect of our work, in accordance with at least one embodiment thereof, provides an actuated aerodynamic air drag reducing apparatus that can be universally, easily installed and economically manufactured.

An aspect of our work, in accordance with at least one embodiment thereof, provides an automatically actuated aerodynamic air drag reducing apparatus adapted to be used in three different modes or operation: automatic mode, manual mode and safety mode.

An aspect of our work, in accordance with at least one embodiment thereof, provides an automatically actuated aerodynamic air drag reducing apparatus adapted to be used in three different modes or operation: automatic mode, manual mode and safety mode without effecting the geometry of the actuated aerodynamic air drag reducing apparatus.

An aspect of our work, in accordance with at least one embodiment thereof, provides a manually actuated aerodynamic air drag reducing apparatus that is not equipped with an electrical actuator but rather a rigid member and be used entirely manually. The rigid member could be replaced with an electrical actuator to provide automatic actuation functions.

An aspect of our work, in accordance with at least one embodiment thereof, provides an actuated aerodynamic air drag reducing apparatus that is using pivots and no ball joints to ease maintenance and be more tolerant to dirt.

An aspect of our work, in accordance with at least one embodiment thereof, provides an actuated aerodynamic air drag reducing apparatus that is interfering with the trailer with minimal elements, generally the panels pivots with restriction connectors are contacting the trailer.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure:

FIG. 9 is a right elevation view of the AAADRA of FIG. 1 in a semi-expanded configuration, in accordance with at least one embodiment thereof;

FIG. 12 is a magnified right elevation section view of a portion of the actuation mechanism, in accordance with at least one embodiment thereof;

FIG. 13 is a magnified right elevation section view of a portion of the actuation mechanism, in accordance with at least one embodiment thereof;

FIG. 16 is a magnified right elevation section view of a portion of the AAADRA, in accordance with at least one embodiment thereof;

FIG. 17 is a magnified right elevation section view of a portion of the AAADRA, in accordance with at least one embodiment thereof;

FIG. 23 is a rear-right perspective view of the AAADRA, in accordance with at least one embodiment thereof;

FIG. 24 is a magnified right elevation sectional view of a portion of the AAADRA, in accordance with at least one embodiment thereof;

FIG. 25 is a magnified right elevation sectional view of a portion of the AAADRA, in accordance with at least one embodiment thereof;

FIG. 33 is a rear-right perspective view of a portion of the AAADRA, in accordance with at least one embodiment thereof;

FIG. 34 is a rear-right perspective view of a portion of the AAADRA, in accordance with at least one embodiment thereof;

FIG. 35 is a rear elevational view of the AAADRA, in accordance with at least one embodiment thereof;

FIG. 36 is a right elevational section view of a portion of the AAADRA of FIG. 35, in accordance with at least one embodiment thereof;

FIG. 37 is a rear-right perspective view of a portion of the AAADRA, in accordance with at least one embodiment thereof;

FIG. 39 is a rear-right perspective view of a portion of the AAADRA, in accordance with at least one embodiment thereof;

FIG. 40 is a rear elevational view of a portion of the AAADRA, in accordance with at least one embodiment thereof;

FIG. 41 is a right elevational section view of a portion of the AAADRA of FIG. 40, in accordance with at least one embodiment thereof;

FIG. 42 is a right elevational section view of the AAADRA, in accordance with at least one embodiment thereof;

FIG. 43 is a rear-right perspective view of a portion of the AAADRA, in accordance with at least one embodiment thereof;

FIG. 44 is a rear elevational view of a portion of the AAADRA, in accordance with at least one embodiment thereof;

FIG. 45 is a right elevational section view of a portion of the AAADRA, in accordance with at least one embodiment thereof;

FIG. 46 is a rear elevational section view of the AAADRA, in accordance with at least one embodiment thereof;

FIG. 47 is a right elevational section view of a portion of the AAADRA of FIG. 46, in accordance with at least one embodiment thereof;

FIG. 48 is a rear elevational view of a portion of the AAADRA, in accordance with at least one embodiment thereof;

FIG. 49 is a right elevational section view of a portion of the AAADRA of FIG. 48, in accordance with at least one embodiment thereof;

FIG. 54 is a rear-right perspective view of a portion of the AAADRA, in accordance with at least one embodiment thereof;

FIG. 57 is a rear elevational view of a portion of the AAADRA, in accordance with at least one embodiment thereof;

FIG. 58 is a right elevational section view of a portion of the AAADRA of FIG. 57, in accordance with at least one embodiment thereof;

FIG. 59 is a rear elevational view of a portion of the AAADRA, in accordance with at least one embodiment thereof;

FIG. 60 is a right elevational section view of a portion of the AAADRA of FIG. 59, in accordance with at least one embodiment thereof;

FIG. 64 is a rear elevational view of a portion of the AAADRA, in accordance with at least one embodiment thereof;

FIG. 65 is a right elevational section view of a portion of the AAADRA of FIG. 64, in accordance with at least one embodiment thereof;

FIG. 66 is a rear elevational view of the trailer with the AAADRA, in accordance with at least one embodiment thereof;

FIG. 69 is a rear elevational view of a portion of the AAADRA, in accordance with at least one embodiment thereof;

DETAILED DESCRIPTION OF PREFERRED EMBODIMENTS

A preferred embodiment of the present invention is described below with reference to the drawings.

Figure 1:
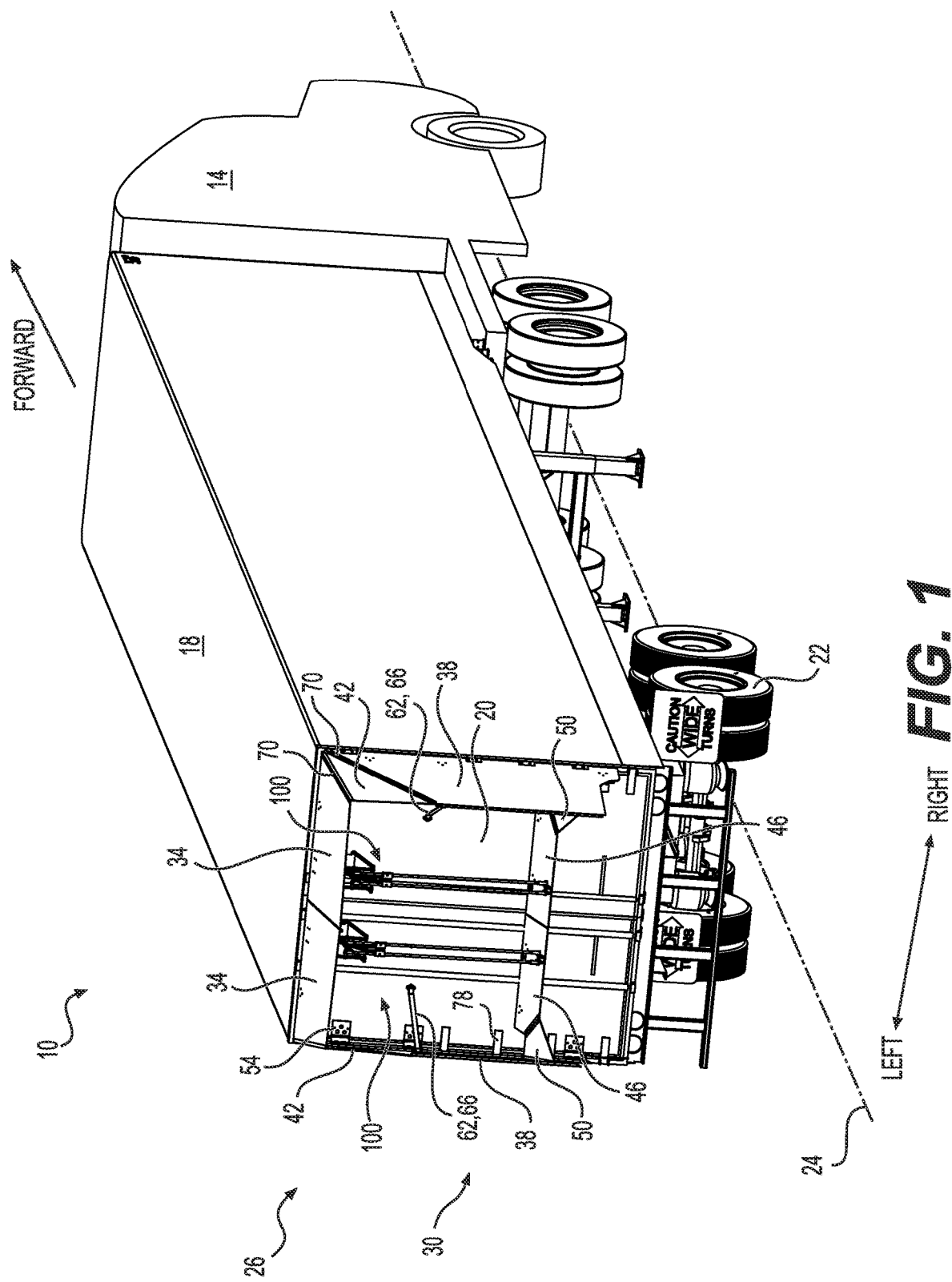
FIG. 1 is a rear-right perspective view of a road tractor operatively connected to a trailer including an actuated aerodynamic air drag reducing apparatus (hereinafter referred to as AAADRA) secured thereto in its expanded configuration, in accordance with at least one embodiment thereof.
Figure 2:
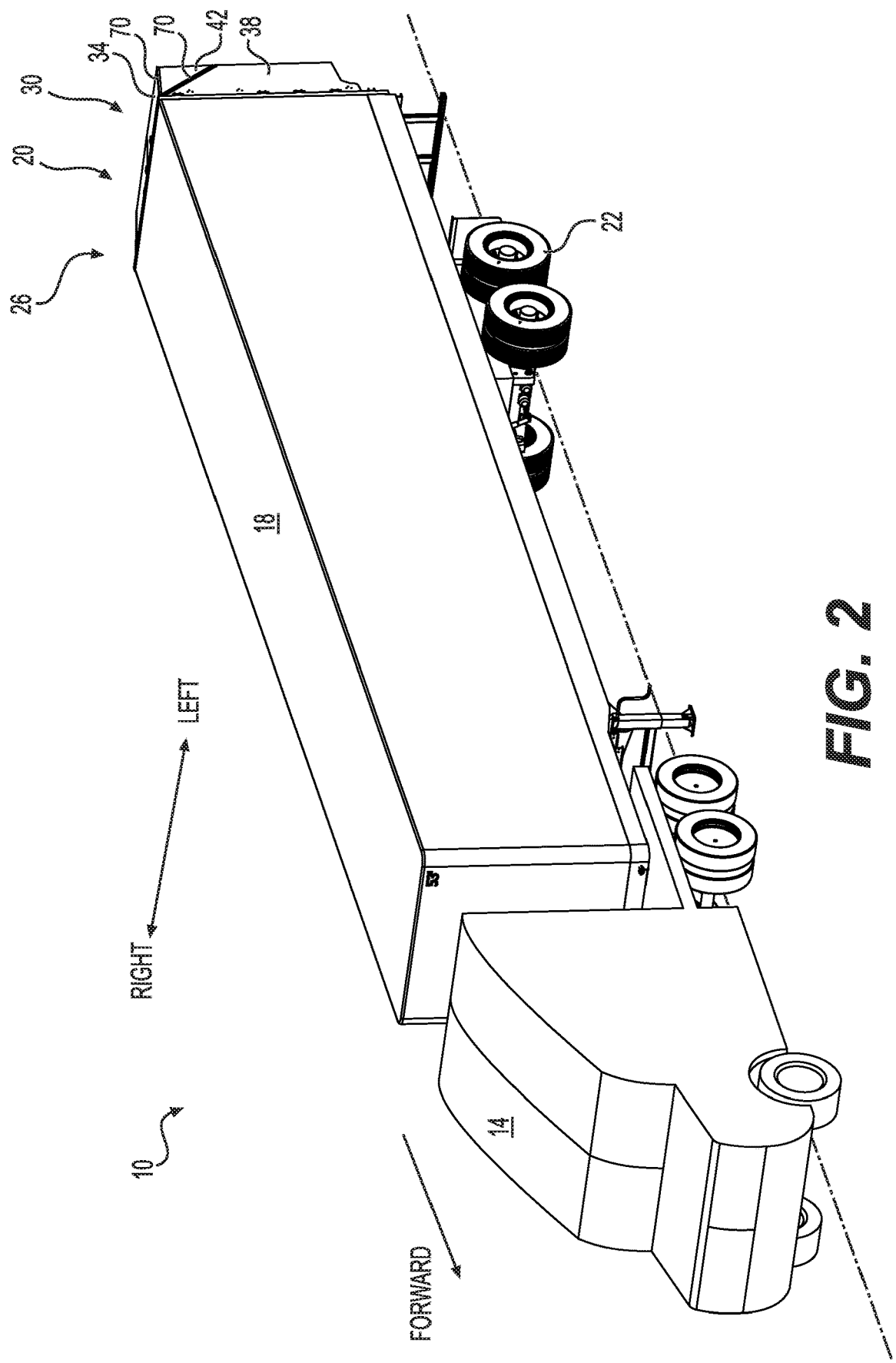
FIG. 2 is a front-left perspective view of the road tractor and the trailer of FIG. 1, showing the AAADRA in an expanded aerodynamic configuration, in accordance with at least one embodiment thereof.
Figure 3:
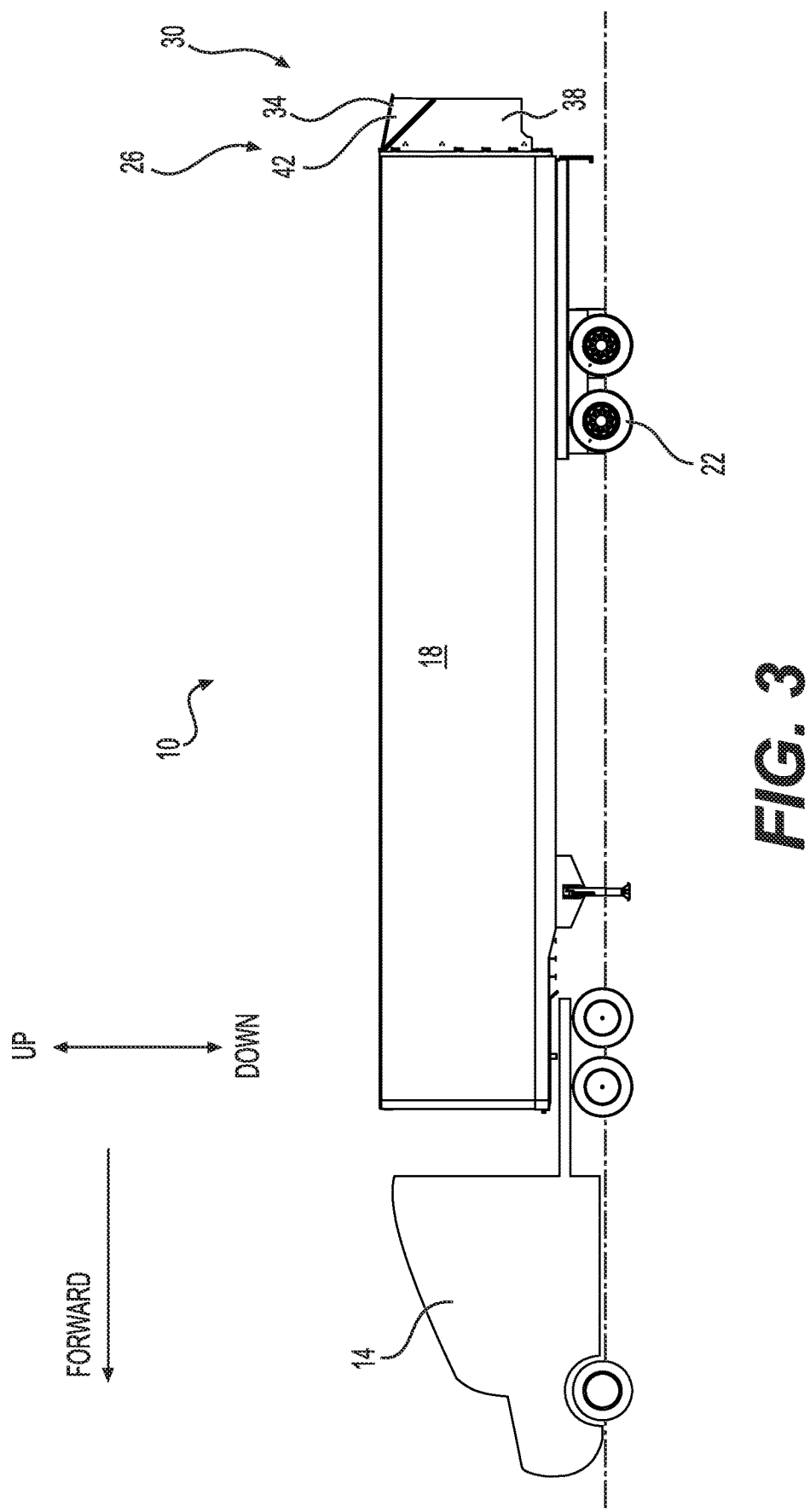
FIG. 3 is a left elevation view of the AAADRA of FIG. 1, in accordance with at least one embodiment thereof.
Figure 4:
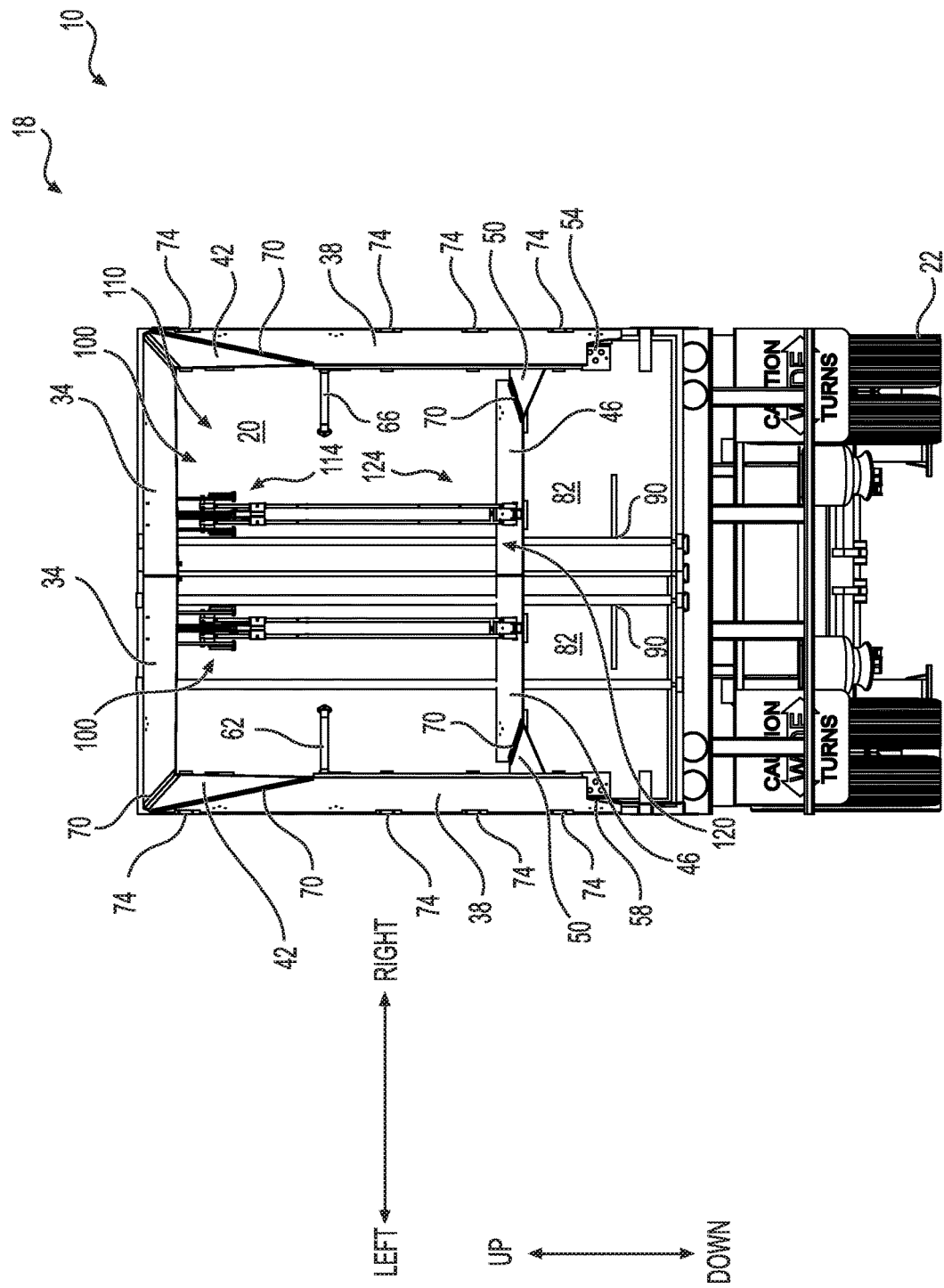
FIG. 4 is a rear elevation view of the AAADRA of FIG. 1, in accordance with at least one embodiment thereof.
Figure 6:
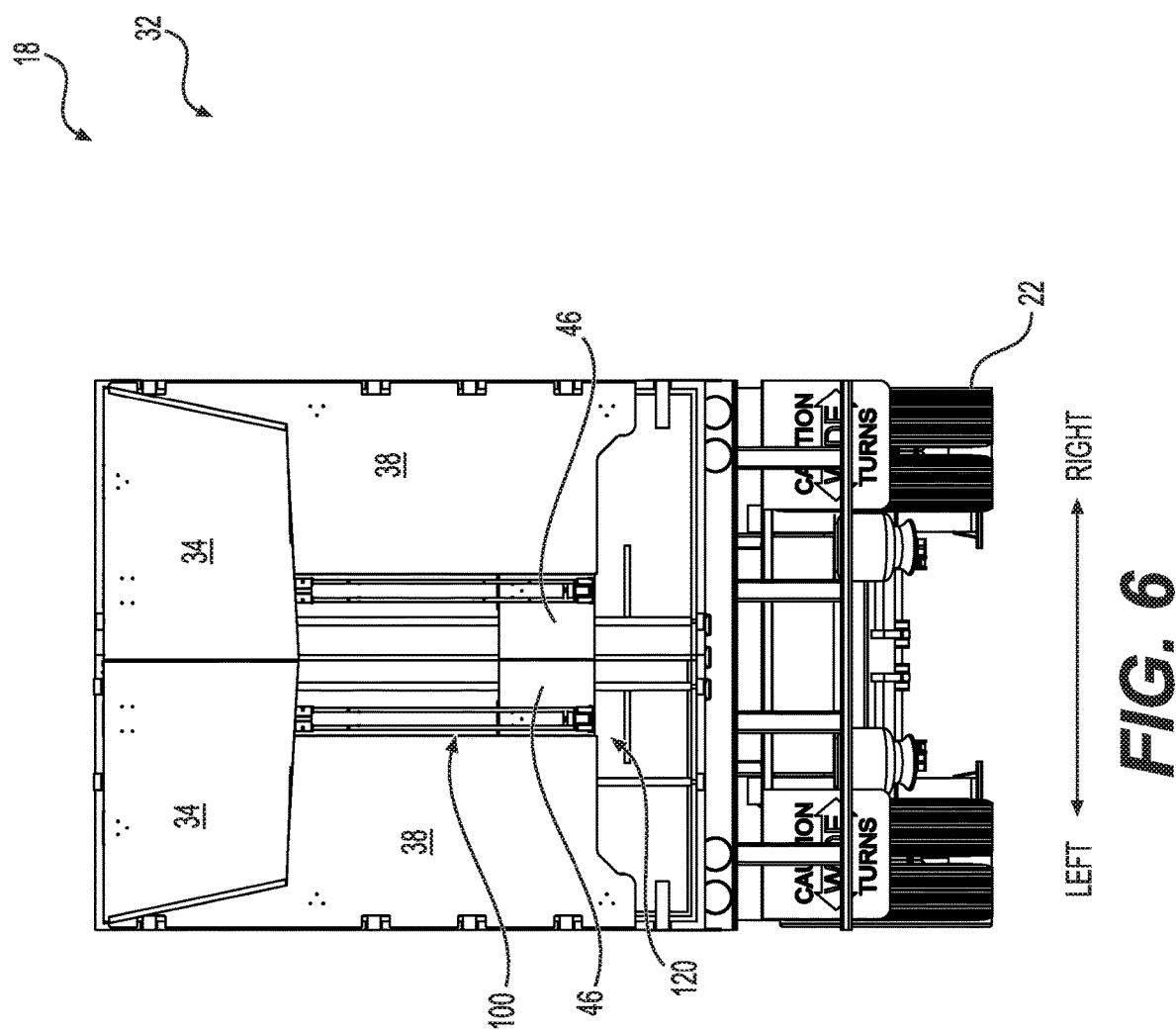
FIG. 6 is rear elevational view of the AAADRA of FIG. 1, in a retracted configuration, in accordance with at least one embodiment thereof.

A vehicle 10 including a tractor 14 and a trailer 18 is illustrated in FIG. 1. The tractor 14 is operatively connected to the trailer 18 to pull the trailer 18 in a forward direction. The tractor 14 and the trailer 18 are equipped with a series of wheels 22 to propel and support the vehicle 10 with optional cargo therein. A tractor-trailer axis 24 is identified along a forward-rearward direction 24. The trailer 18 is equipped with a actuated aerodynamic air drag reducing apparatus 26 (hereinafter AAADRA 26) over a rear surface 20 of the trailer 18, as illustrated in its expanded configuration 30 in FIG. 1 throughout FIG. 4. In an embodiment, the AAADRA 26 is adapted to be expanded in an expanded configuration 30 and retractable in a retracted configuration 32, as illustrated in FIG. 6, on a basis of specific vehicle 10 speeds. The AAADRA 26 adapted to be expanded in the expanded configuration 30 and retractable in the retracted configuration 32 manually, as it will be described in details below. The AAADRA 26 includes a pair of juxtaposed top panels 34, a pair of opposed side panels 38, with respective secondary side panels 42 thereof, and a pair of juxtaposed bottom panels 46, with respective secondary bottom panels 50. The pair of top panels 34, the pair of side panels 38 with secondary side panels 42 and the bottom panels 46, with secondary bottom panels 50, are operatively connected to the trailer 18 with a series of hinges 54 and fasteners 58 in a fashion allowing reciprocating between the expanded configuration 30 and the retracted configuration 32.

The side panels 38 are hingedly connected to associated secondary side panels 42 using a live hinge 70 that can illustratively be made of flexible fabric, strap portion or polymer material providing angular relative movements while, preferably, preventing air to pass between the parts. The secondary side panels 42 are hingedly connected to the top panel 34 using flexible fabric 70. The bottom panels 46 are similarly connected to associated bottom panels 50. And the secondary bottom panels 50 is also hingedly secured to the side panel 38 with such a flexible link. The AAADRA 26 is actuated with a pair of actuation mechanisms 100 between the expanded configuration 30 and the retracted configuration 32. The distal movement of the side panels 38, and associated secondary side panels 42, is limited by a restriction connector 62 interconnecting a hinge 54, or other elements associated with the rear surface 20 of the trailer 18, with the side panels 38 and associated secondary side panels 42. The restriction connector 62 is embodied in the illustrated embodiment with a belt 66 to ensure the side panels 42 are going to be maintained at a proper angle from the trailer 18 despite the vibrations, the pressure, vacuum and turbulences created by the aerodynamic effect while the vehicle 10 is moving forward on the road. The side panels 38 are equipped with openings 74 allowing the hinges 78 securing the rear doors 82 of the trailer 18 to extend therethrough to ensure close and tight fit on the vehicle 10. Still referring to FIG. 4, the trailer 18 includes a door-locking mechanism 90 operatively assembled to the doors 82 for selectively securing the doors 82. The pair of actuation mechanisms 100 is installed on the hinge 54 associated with the rear surface 20 of the trailer 18 for actuating the AAADRA 26 without interfering with the door-locking mechanism 90.

Figure 5:
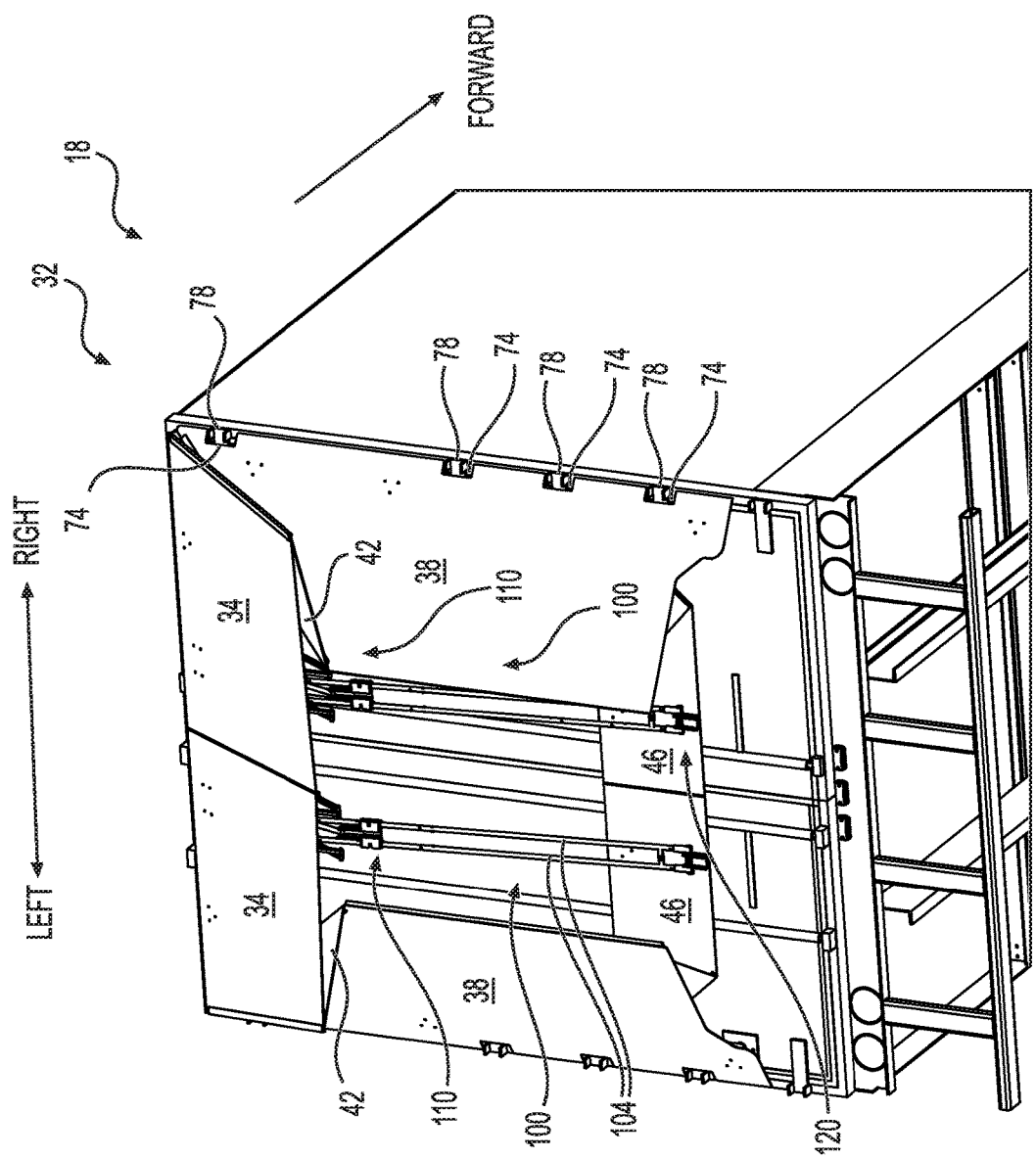
FIG. 5 is a rear-right-bottom perspective view of the AAADRA of FIG. 1, in a retracted configuration, in accordance with at least one embodiment thereof.
Figure 7:
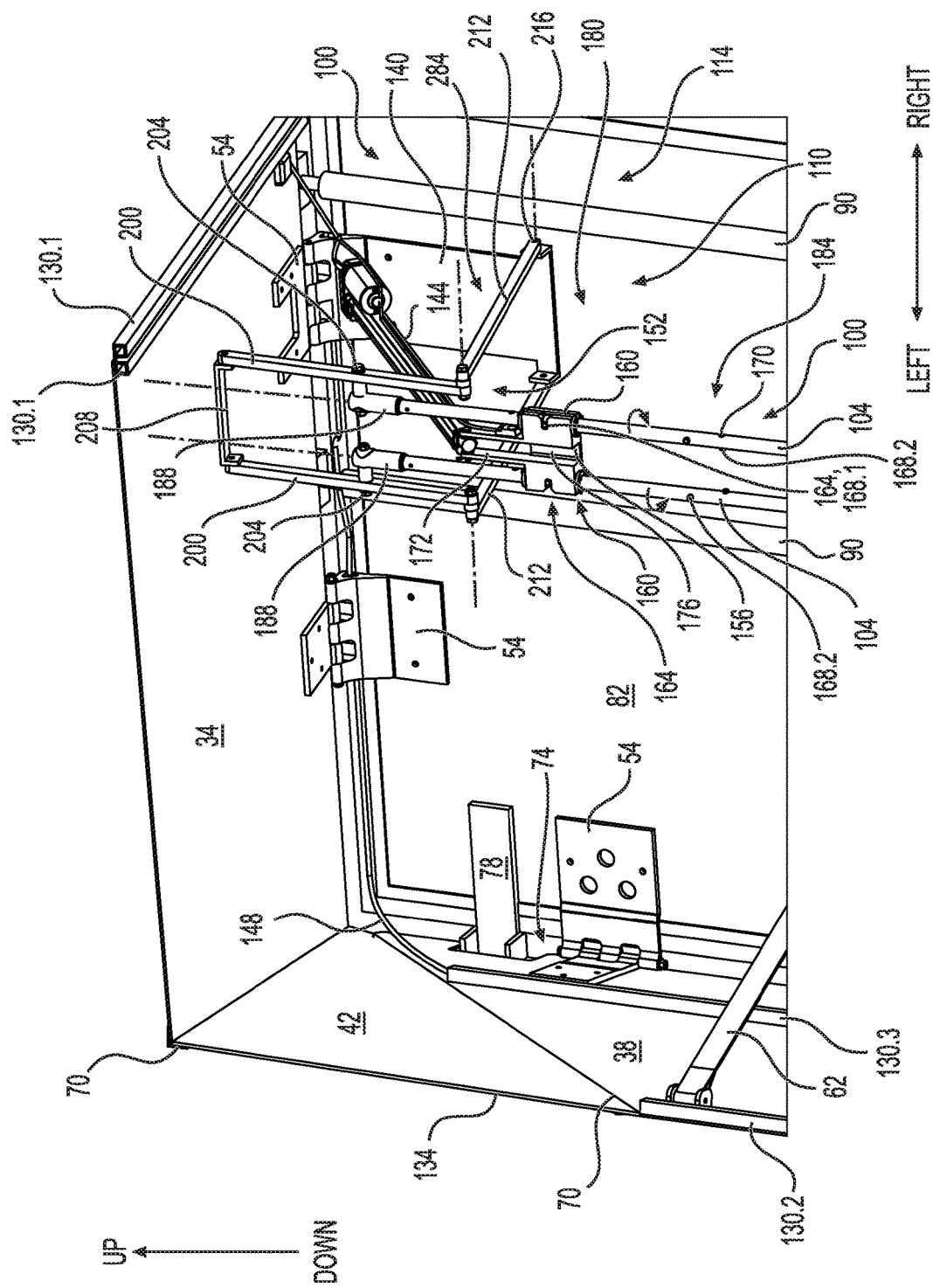
FIG. 7 is a magnified portion of a rear-right perspective view of the AAADRA of FIG. 1, in accordance with at least one embodiment thereof.
Figure 8:
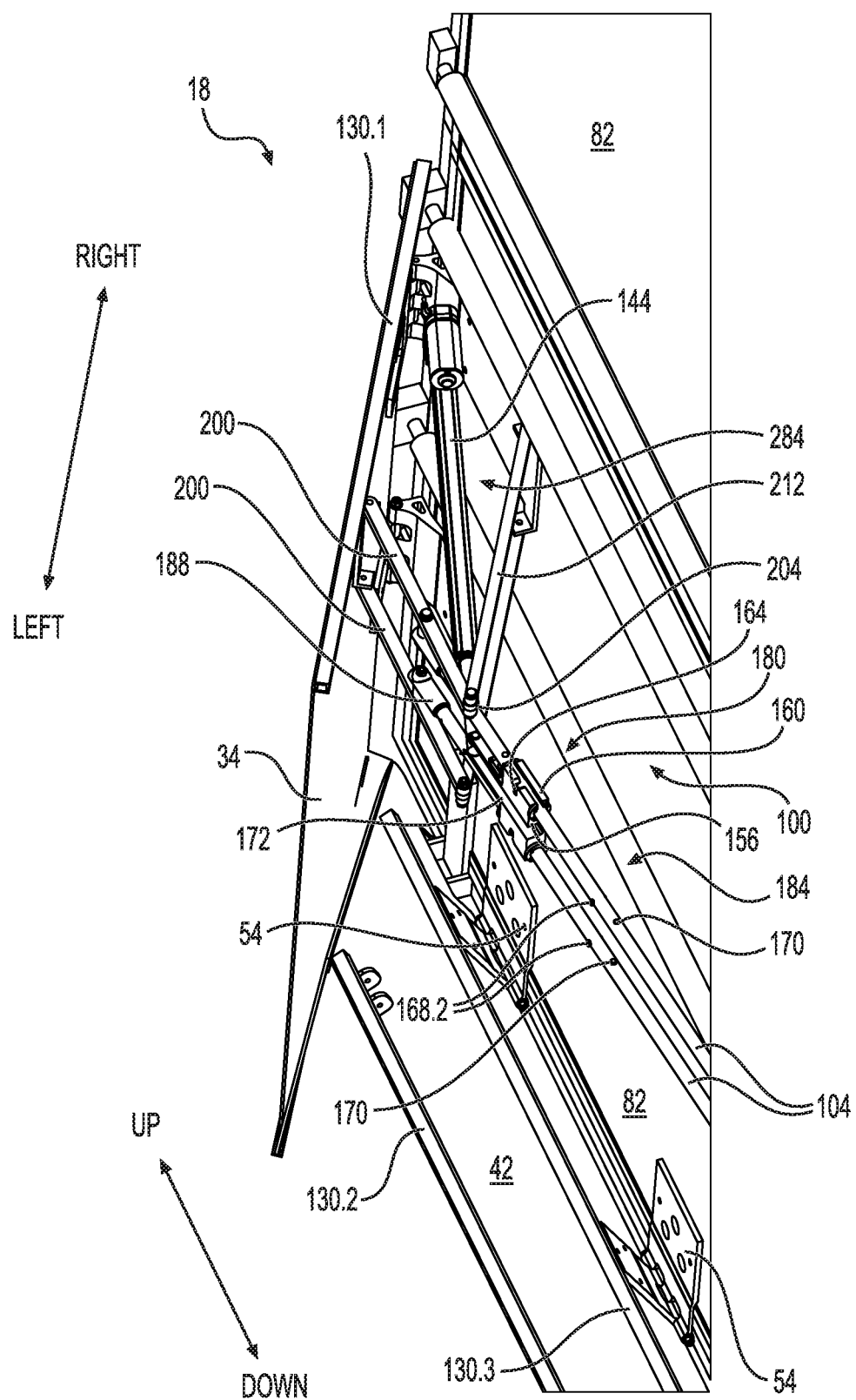
FIG. 8 is a magnified portion of a rear-right perspective view of the AAADRA of FIG. 1 in a semi-expanded configuration, in accordance with at least one embodiment thereof.

FIG. 5 illustrates the AAADRA 26 in an almost retracted configuration 32 while FIG. 6 depicts the AAADRA 26 in the retracted configuration 32. The AAADRA 26 is actuated with the pair of actuation mechanisms 100 interconnecting the hinges 54 secured to the rear surface 20 of the trailer 18 with the bottom panel 46 with a pair of elongated members 104. The elongated members 104 are connected to a first mechanism 110 on its upper side 114 thereof and connected to a second mechanism 120 on its lower side 124 thereof. FIG. 7 shows a magnified portion of the upper left corner of the AAADRA 26 revealing one of the first mechanisms 110.

One can appreciate from FIG. 7 that the top panel 34 is reinforced with a rigidifying member 130.1 next to its edge located parallel to the-trailer axis 24 of the trailer 18 to provide sufficient stiffness at the edge of the top panel 34. The side panel 38 also includes an optional rigidifying member 130.2 on its rearmost edge 134 while the side panel 38 also includes an optional rigidifying member 130.3 closer to the trailer 18. The restriction connector 62 is secured to the side panel 38 in the illustrated embodiment for added strength. The restriction connectors 62 are also material to maintain the shape of the AAADRA 26 to ensure optimal aerodynamic geometry. It is also possible to diminish the thickness of the panels' material and use the restriction connectors 62 to prevent undesirable bending or deformation. A series of hinges 54 are pivotally securing the top panel 34 and the side panel 38. Another series of hinges 78 are pivotally securing the door 82 to the trailer 18.

Figure 11:
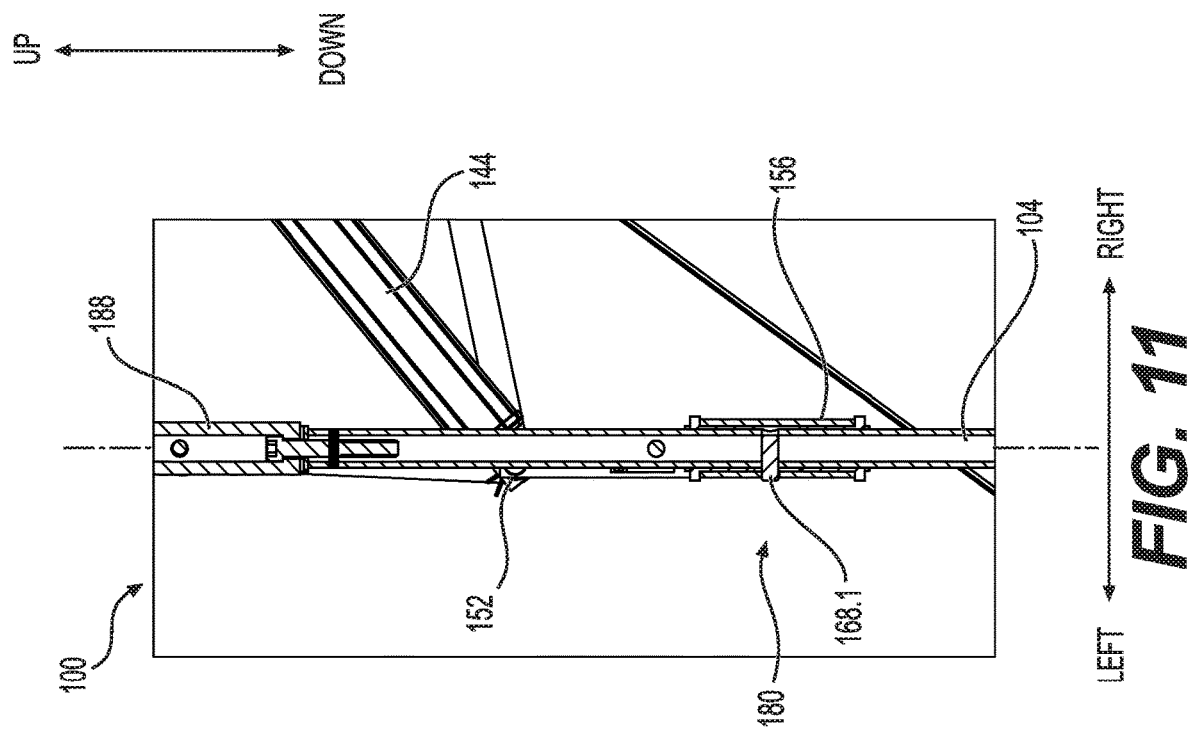
FIG. 11 is a magnified right elevation section view of the actuation mechanism, in accordance with at least one embodiment thereof.
Figure 10:
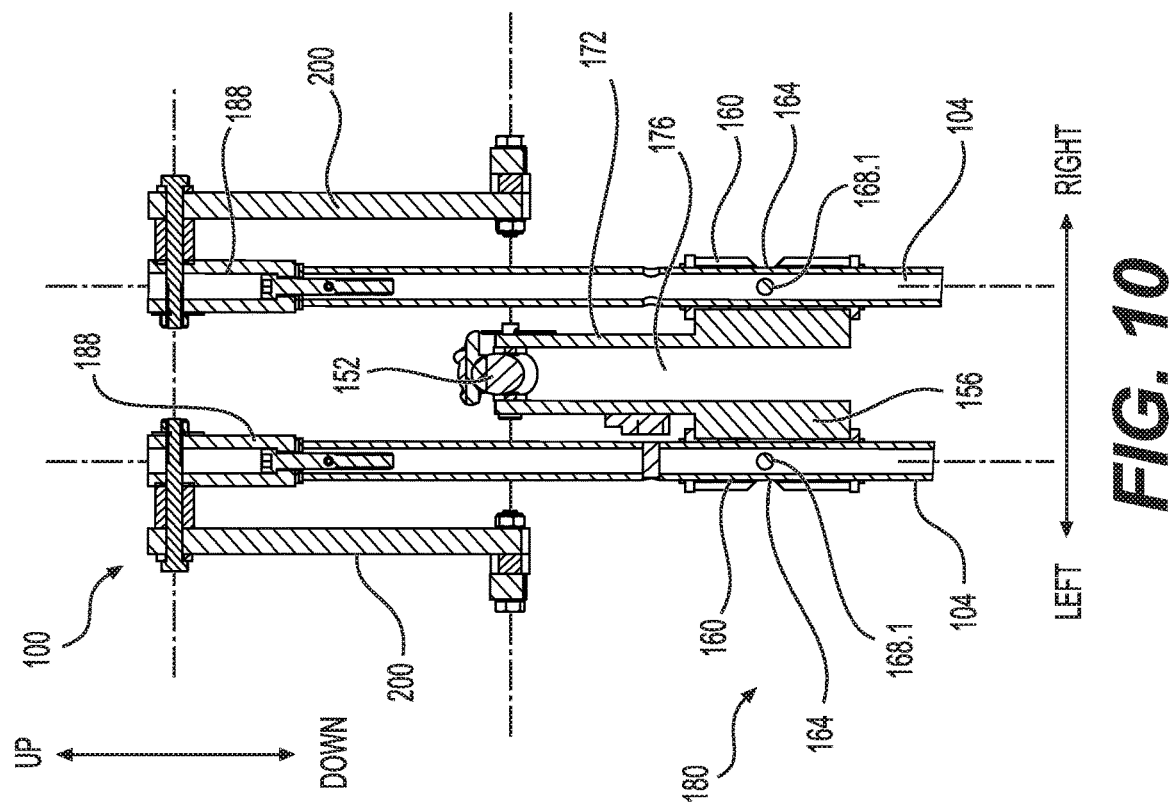
FIG. 10 is a magnified rear elevation section view of the actuation mechanism, in accordance with at least one embodiment thereof.
Figure 15:
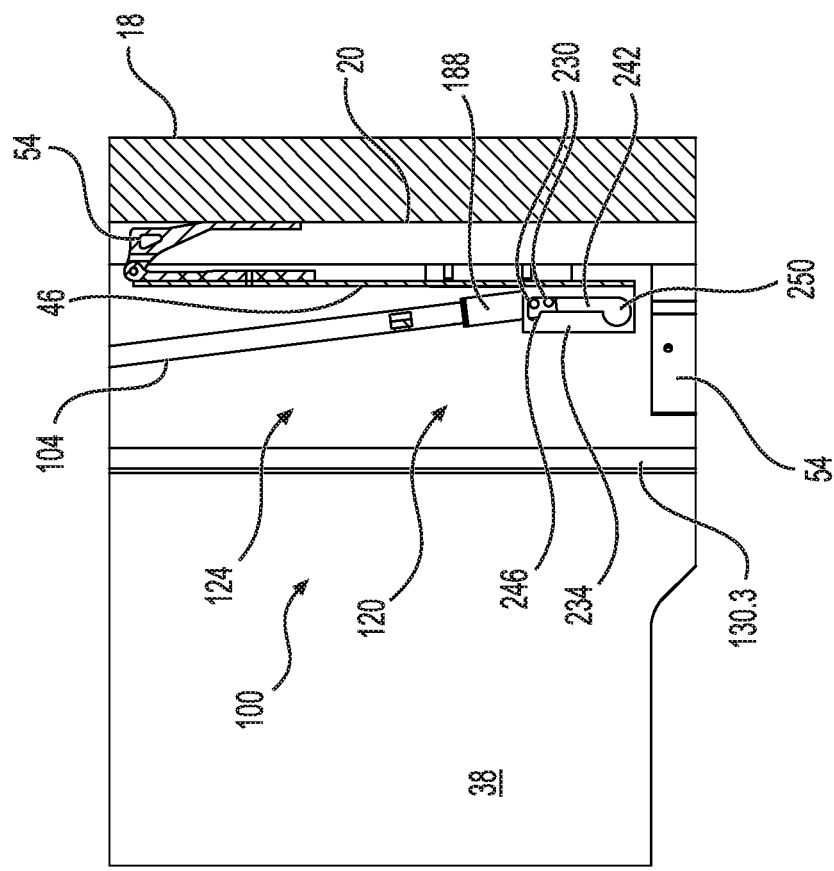
FIG. 15 is a magnified right elevation section view of a portion of the AAADRA, in accordance with at least one embodiment thereof.
Figure 14:
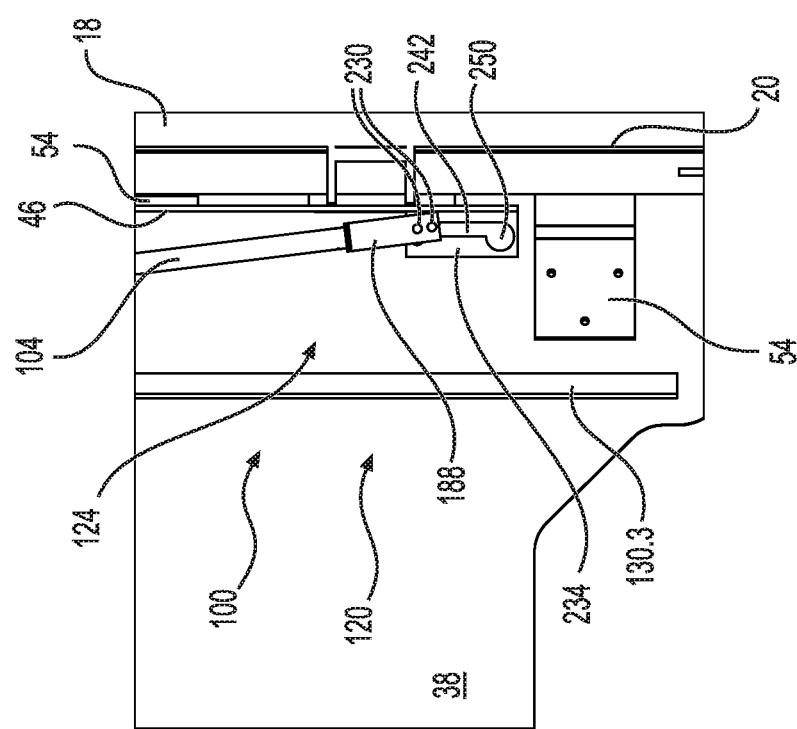
FIG. 14 is a magnified right elevation section view of a portion of the AAADRA, in accordance with at least one embodiment thereof.

In reference with FIG. 7 throughout FIG. 11, the first mechanism 110 of the actuation mechanism 100 is generally secured to an extended hinge portion 140, to which is pivotably connected an actuator 144 at a first end thereof. The extended hinge portion 140 is provided to avoid securing an additional hinge to the trailer 18 although a distinct support is contemplated by the present invention in another embodiment. The actuator 144 is hence secured to the extended hinge portion 140 for added strength, compact packaging and reduced installation time. The actuator 144 is located under the top panel 34 that is protecting the actuator 144 against rain and snow, especially when the actuator 144 is in the expanded configuration 30. The actuator 144 is also much protected by the retracted top panel 34 when the AAADRA 26 in the retracted configuration 32. The actuator 144 is connected, for power and control, via connection wires 148 channeled through the rigidifying member 130.3 and opening in the hinge 54. Alternatively, the connection wires 148 can pass in the trailer 18 door frame. The actuator 144 is pivotally secured to the hinge 54 with an extending end 152 of the actuator 144 located downward in the present embodiment. The actuator 144 could be secured at a different location, or in a different direction, suitable for proper operation without departing from the scope of the present application. The extending end 152 of the actuator 144 is operatively connected to a slider 156 adapted to allow selectable slidable movements of the elongated members 104 therein. The extending end 152 of the actuator 144 is pivotally secured to an actuator connector 172 axially aligned with a recessed portion 176 in the slider 156. The slider 156 includes a pair of axial grooves 160 communicating with an orthogonal engaging notch 164 provided on each lateral side for selectively interacting with the elongated members 104. The axial groove 160 and the orthogonal engaging notch 164 are collectively interacting with protrusions 168 fixedly disposed along each of the elongated members 104 at a to define a first engagement position 180 and a second engagement position 184, lower than the first engagement position 180, along the elongated members 104. These engagement positions 180 have different roles in the functioning of the actuation mechanism 100. These roles are going to be described in further details below.

The first mechanism 110 further includes a pair of pivot members 188 ending respective upper ends of the elongated members 104 hence allowing rotation of the elongated member 104 therein while axially fixedly securing the upper ends of the elongated members 104 to a pair of vertical arms 200 via pivots 204. A bracket 208 pivotally secures the pair of vertical arms 200 to the top panel 34, on a first end thereof, while a pair of stabilizer arms 212 are pivotally secured to a second end of the pair of vertical arms 200. In turn, the stabilizer arms 212 are pivotally connected to a receiver portion 216 provided by the extended hinge portion 140. The stabilizer arms 212 are disposed substantially parallel to the top panel 34 to add strength to the assembly for preventing or diminishing vibrations while providing a geometry compatible to the movements of the actuation mechanism 100. The stabilizer arms 212 are providing an hyperstatic arrangement of parts.

The protrusions 168 are sized and designed to be pivotable to be axially aligned slide in the axial groove 160 and orthogonally rotate to engage the orthogonal engaging notch 164 to axially lock the elongated members 104 to the slider 156 in a desired configuration. In the present embodiment, pivotal of the elongated members 104 of the actuation mechanism in opposed directions are selectively engaging or disengaging the protrusions 168 from their respective notch 164 to allow axial movements of the elongated members 104 in respect to the slider 156. The fit between the protrusions 168 and the engaging notch 164 are sized and designed to ensure a tight fit and a connection strong enough to prevent undesired disconnect of the assembly. Once the protrusions 168 are disengaged from the notch 164, the permitted axial movements of the elongated members 104 in respect to the slider 156 is allowing for translation between the first engagement position 180 and the second engagement position 184 giving access to different positions of the actuation mechanism 100 to move the AAADRA 26 in different configurations. Engagement of the protrusion 168.1 of the first engagement position 180 in the orthogonal engaging notch 164 of the slider 156 is going to secure the slider in an automatic mode 192 to be used for automatic actuation of the AAADRA 26 by the actuation mechanism 100. In contrast, engagement of the protrusion 168.2 of the second engagement position 184 in the orthogonal engaging notch 164 of the slider 156 is going to secure the slider 156 in a manual mode 194 that is going to be used for manual actuation of the AAADRA 26, which is going to be discussed in detail later in the description. A protruding stopper 170 is located lower along the elongated members 104 to prevent the slider 156 to slide lower than the second engagement position 184.

FIG. 7 and FIG. 9 illustrate embodiments of the AAADRA's automatic mode 192. The actuator 144 is connected to the slider 156 via the actuator connector 172. The slider 156 is selectively engaging the protrusions 168.1 of the first engagement position 180 to place the AAADRA 26 in the automatic mode 192. Extension of the actuator 144 in the automatic mode 192 is moving the AAADRA 26 in the retracted configuration 32. Conversely, the actuator 144 in the automatic mode 192 is moving the AAADRA 26 in the expanded configuration 30 by contraction of the length of the actuator 144. The actuator 144 is operatively connected to a control system for management thereof through a harness containing wires 148 therein. The actuator 144 that is used in the embodiments is an electrically actuated actuator 144. The actuator 144 is powered by the electrical system of the vehicle 10 leaving other systems of the vehicle 10, like the air pressured system, untouched.

The second mechanism 120 of the actuation mechanism 100 is shown in various configurations in FIG. 12 throughout FIG. 17. The second mechanism 120 is located on a lower side 124 of the actuation mechanism 100. The pair of elongated members 104 are respectively connected at their lowermost portions to associated pivot members 188. As indicated above, the pivot members 188 are allowing pivotal motion of each elongated member 104 while providing no longitudinal relative axial displacement in respect with the elongated members 104. These pivot members 188, in the illustrated embodiment, are equipped with a pair of dowel members 230 for engaging a slotted support member 234 secured to the pivotable side of the bottom panel 46. Alternatively, a single part could be used instead of the dowel members 230 to simplify the assembly. The support member 234 includes a receiving portion 238 containing a slot opening 242 therein ending on respective ends with a first pivot area 246 and a second pivot area 250. The slot opening 242 is allowing translation of the pair of dowel members 230 that can only pivot in respect with the support member 234 when the dowel members 230 are engaging one of the first pivot area 246 and the second pivot area 250. The slot opening 242 in the support member 234 associated with the second mechanism 120 is used to momentarily decouple the translation movement of the elongated member 104 with the bottom panel 46. The elongated member 104 can hence axially move vertically while the bottom panel 46 remains in its retracted configuration position for a portion of the displacement of the elongated member 104 before being actuated by the elongated member 104. This assembly is allowing movement of the top panel 34 first for moving the operatively interconnected side panel 38 that is covering the bottom panel 46. In other words, the bottom panel 46 is covered by the side panel 38 when the AAADRA 26 is in the retracted configuration 32 and the side panel 38 should expand first to give the required space for the bottom panel 46 to expand. The slot opening 242 allows a vertical translational movement of the pivot member 188, secured thereto via the pair of dowel members 230, of sufficient proportional displacement to allow the top panel 34, with interconnected side panel 38, to begin to expand and, when there is sufficient room to freely expand the bottom panel 46, allow expansion of the bottom panel 46 from its retracted configuration 32. The required decoupled displacement of the elongated member 104 is determined by a length of the slot opening 242. Once the pair of dowel members 230 are moving upward and reaching the opposite end of the slot opening 242 and the first pivot area 246, the bottom panel 46 begins to pivot and expand under the upward pulling action of the elongated members 104. Similar principles apply when moving the AAADRA 26 back from the expanded configuration 30 to the retracted configuration 32; the bottom panel 46 is reaching its retraced configuration before the remaining of the assembly.

Figure 18:
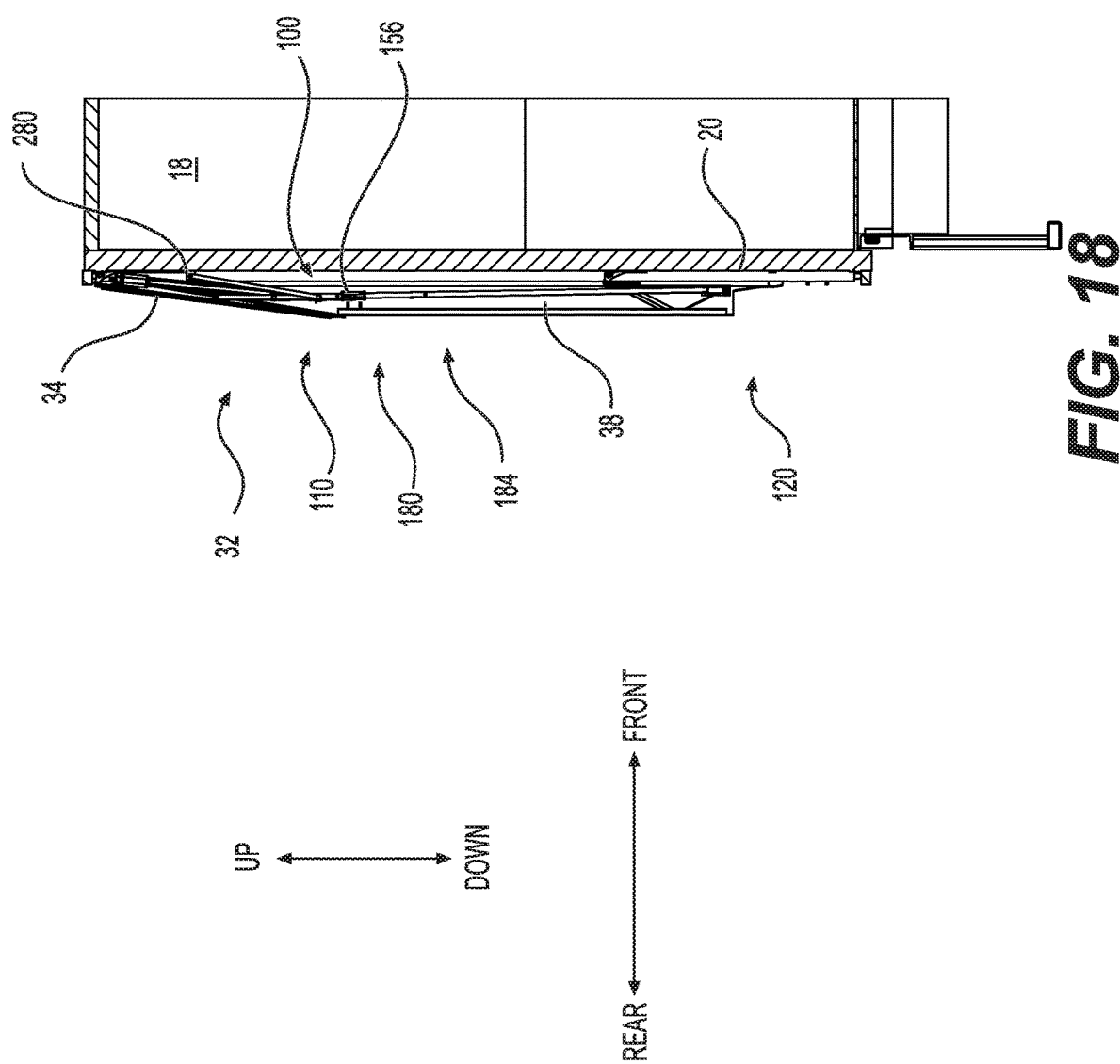
FIG. 18 is a right elevation side section view of the AAADRA, in accordance with at least one embodiment thereof.
Figure 19:
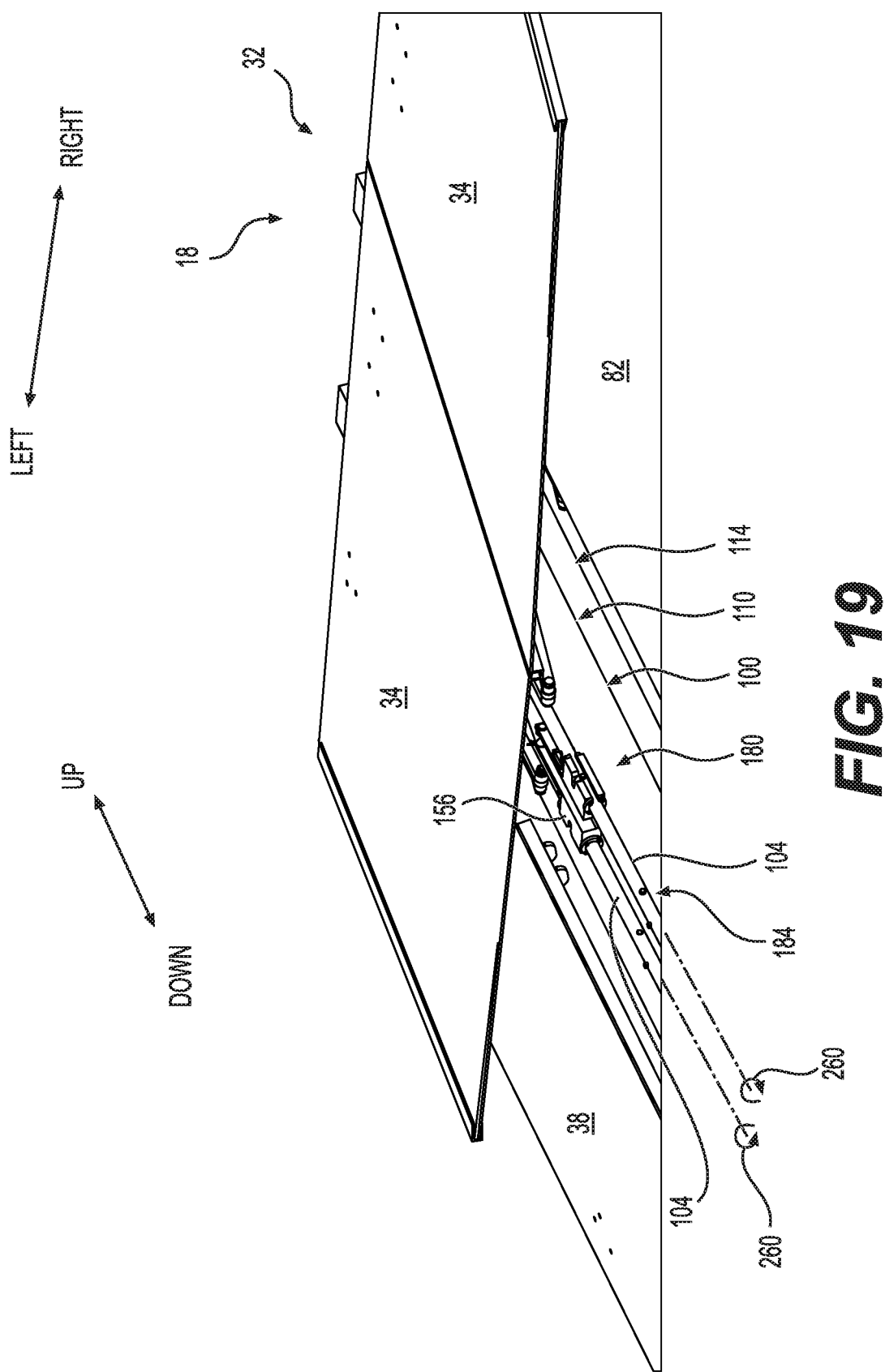
FIG. 19 is a rear bottom perspective view of the AAADRA, in accordance with at least one embodiment thereof.
Figure 20:
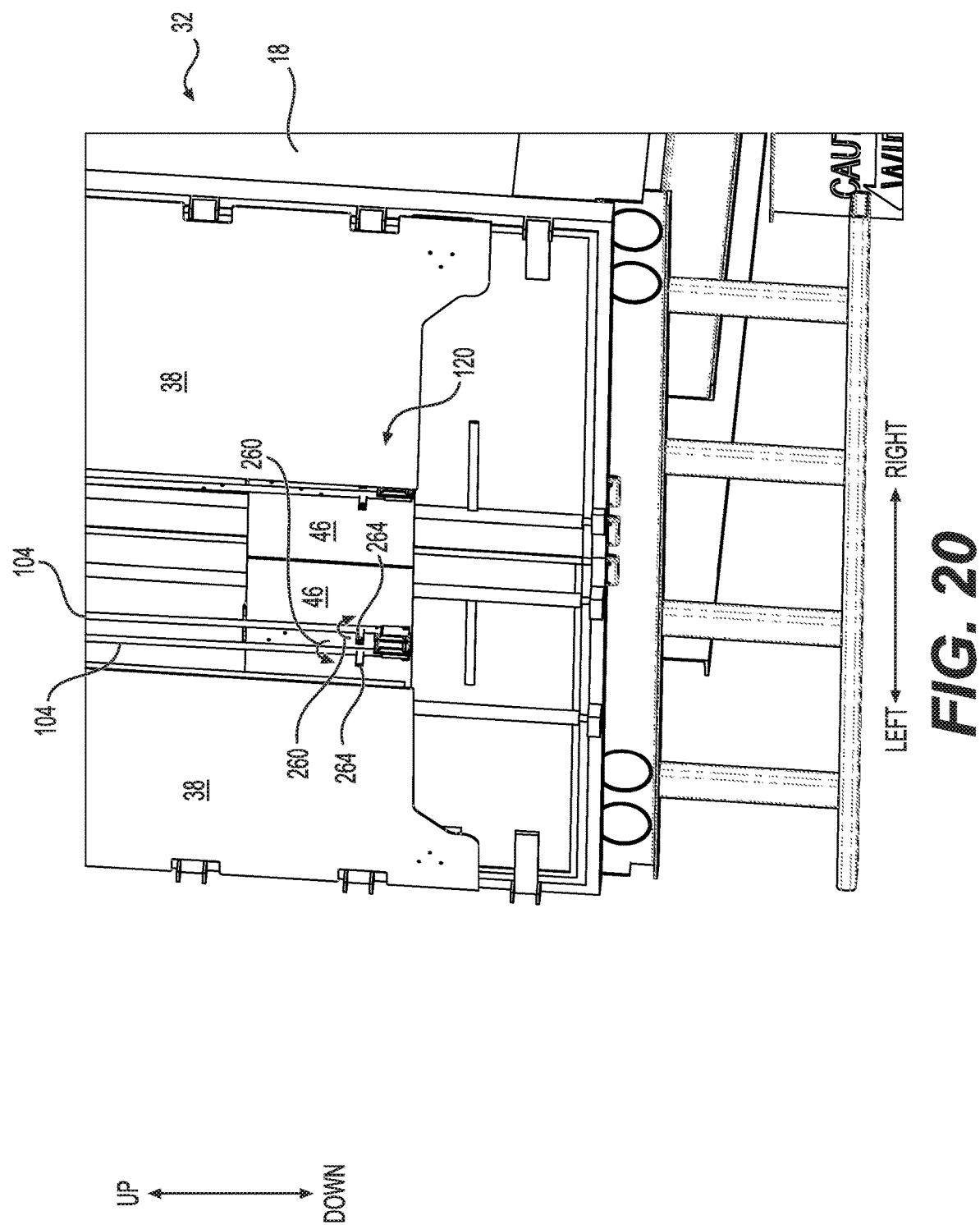
FIG. 20 is a rear-right perspective view of the AAADRA, in accordance with at least one embodiment thereof.
Figure 21:
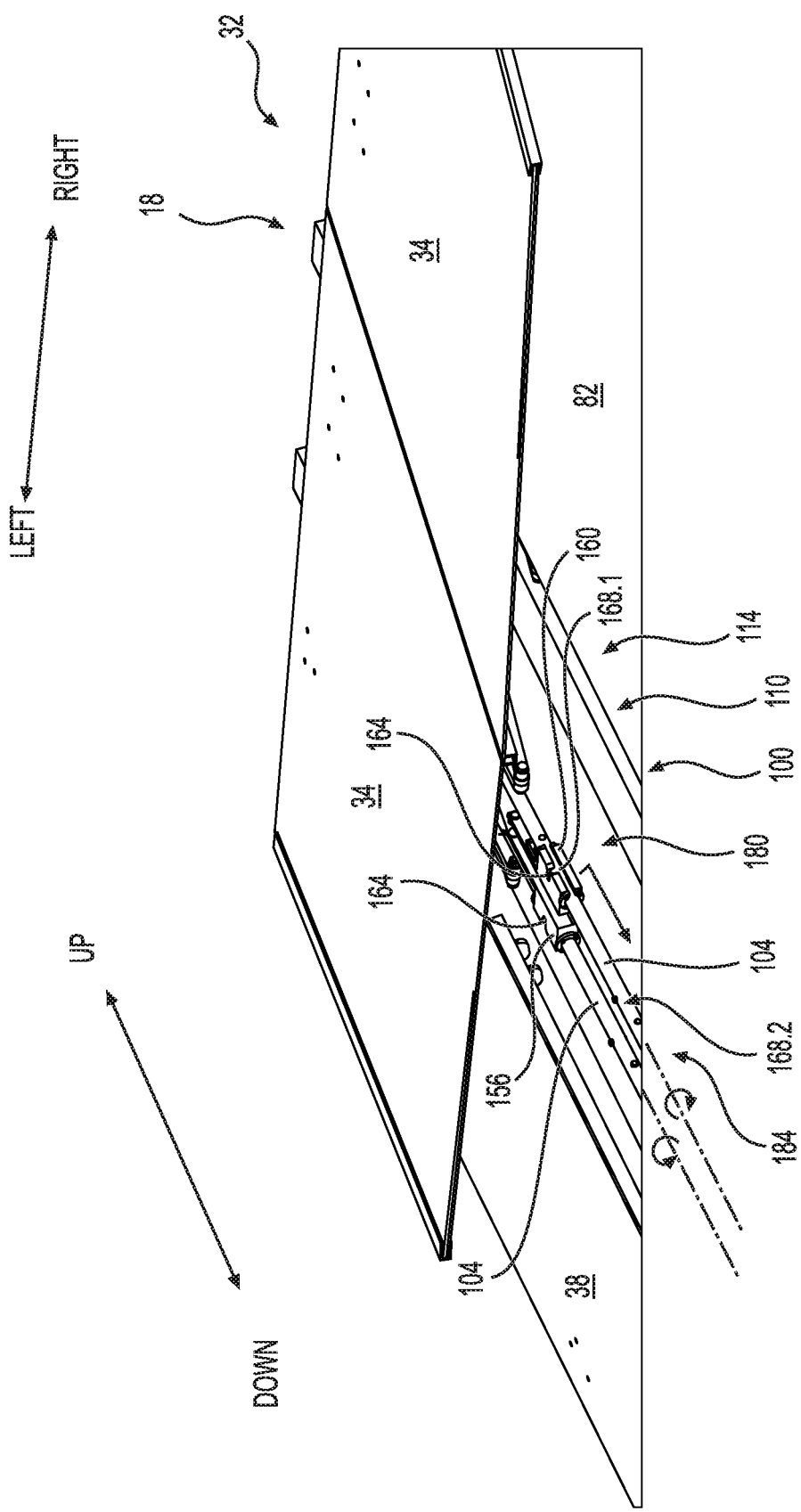
FIG. 21 is a rear bottom perspective view of the AAADRA, in accordance with at least one embodiment thereof.
Figure 22:
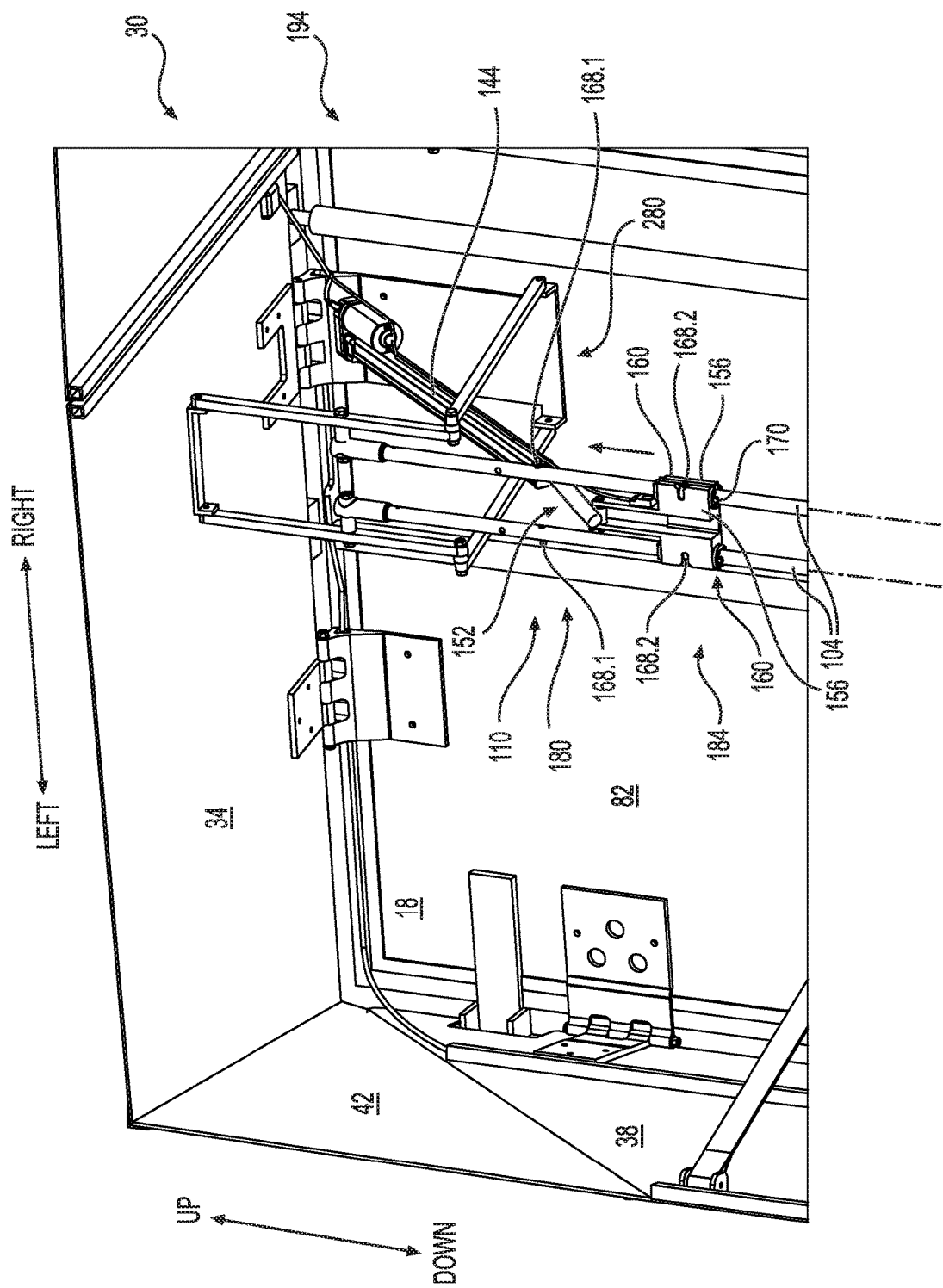
FIG. 22 is a rear-right perspective view of the AAADRA, in accordance with at least one embodiment thereof.
Figure 27:
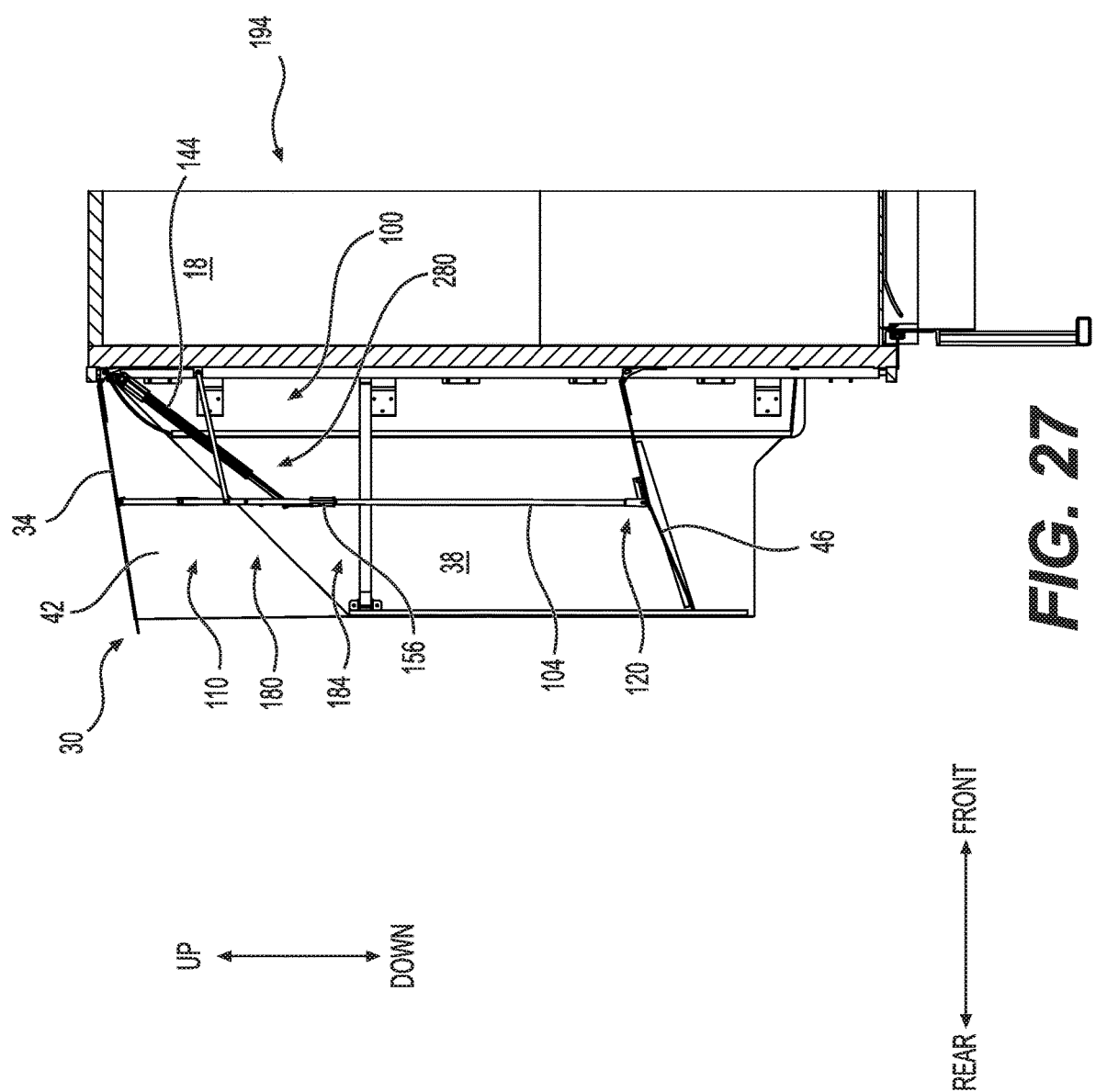
FIG. 27 is a right elevation side view of the AAADRA, in accordance with at least one embodiment thereof.

Moving now to FIG. 18 throughout FIG. 27 illustrating the steps for changing the AAADRA 26 from the automatic mode 192, illustrated in FIG. 18, to the manual mode 194. The manual mode 194 provides the same AAADRA 26 geometry as obtained in the automatic mode 194 and is used, inter alia, for maintenance purposes when the trailer 18 is not in usage or if there are special needs to put the AAADRA 26 in the expanded configuration 30 from the retracted configuration 32 when the AAADRA 26 is not powered. To put the AAADRA 26 in the manual configuration, an operator manually pivots both elongated members 104, with opposed supination movements 260 of the lockable handles 264 in the illustrated embodiment, to disengage the protrusion 168 from their respective engaging notches 164 built in the slider 156, as illustrated in FIG. 19 and FIG. 20. The protrusions 168, once disengaged from their respective engaging notches 164, are free to move along the axial grooves 160 in the slider 156. The operator has to push upward the two longitudinal members 104, preferably with the lockable handles 264, to slide the two elongated members 104 in the slider 156 from the first engagement position 180 to the second engagement position 184 lower on the two elongated members 104. As shown in FIG. 21 and FIG. 22, the manual translational movement of the bottom panel and the longitudinal members 104 toward the second engagement position 184 for engaging protrusions 168.2 expand the interconnected panels of the AAADRA 26 in the expanded configuration 30 despite there is no actuation of the actuator 144 that remains in its extended configuration. A pronation movement 272 of lockable handles 264 of the elongated members 104 engages the protrusion 168.2 of the second engagement position 184 in their respective engaging notches 164 in the slider 156, as illustrated in FIG. 23. This way, the second engagement position 184, lower than the first engagement position 180, is engaged and the AAADRA 26 is manually secured in the expanded configuration 30. The manual translational movement of the elongated members 104 is compensating for the length difference between the actuator 144 in its elongated length 280, which is the length of the actuator 144 when the AAADRA 26 is in its retracted configuration 32 and the actuator 144 is in its contracted length 284 when the AAADRA 26 is in its expanded configuration 30.

Figure 26:
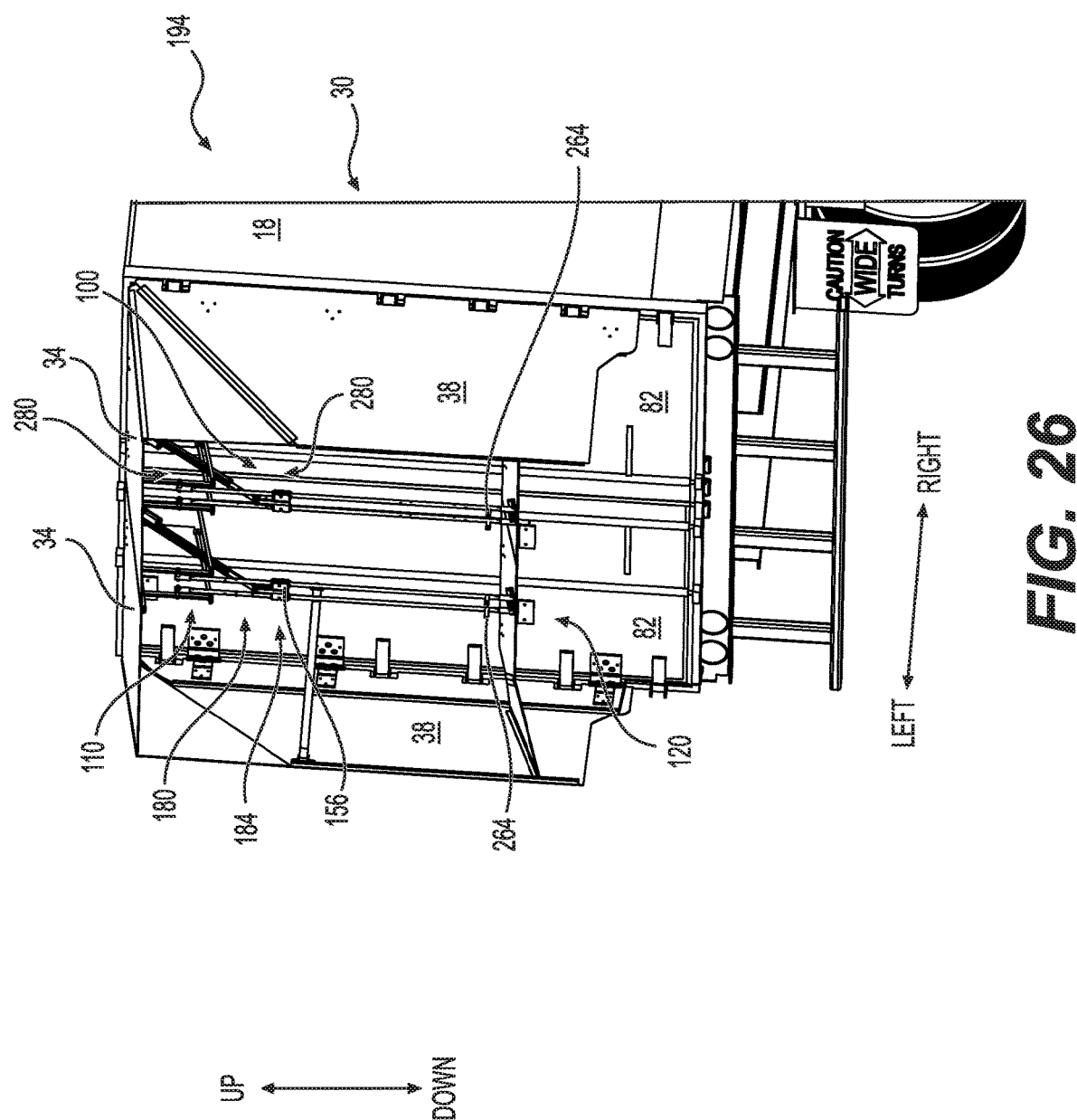
FIG. 26 is a rear-right perspective view of the AAADRA, in accordance with at least one embodiment thereof.

FIG. 24 and FIG. 25 are illustrating the positions of the dowel members 230, which could be embodied differently with a single part, in the receiving portion 238 of the support member 234 when the elongated members 104 have been moved downward to engage the protrusions 168.2 of the second engagement position 184 with their respective engaging notches 164 in the slider 156. The dowel members 230 are now located in the second pivot area 250 when the AAADRA 26 is in near the expanded configuration 30 and in retracted configuration 32 are pivoting in the second pivot area 250 when the AAADRA 26 is moved manually near its expanded configuration 30. Manually pivoting the bottom panel 46 requires sufficient strength to substantially simultaneously expand all the panels 34, 38, 42, 46, 50 of the AAADRA 26 despite the additional effort required by the panels overlap when initiating the movement with a pivotal of the bottom panel 46. In contrast, expanding simultaneously all the panels 34 of the AAADRA 26 automatically with the actuator 144, without the second mechanism 120 slot opening 242 behavior explained above, would result in an increased restriction that would demand more strength from the actuator 144 that could reduce life expectancy of the actuator 144. FIG. 26 and FIG. 27 illustrate the AAADRA 26 in its entirety when manually moved with the manual mode 194 in the expanded configuration 30.

The AAADRA 26 could alternatively be used completely manually by using a rigid member, not illustrated in the figures, instead of an actuator 144. The retraction and expansion of the AAADRA 26 would be made by manipulation of the pair of elongated members 104. The rigid member could be replaced with an electrical actuator 144 to provide automatic actuation functions.

Figure 28:
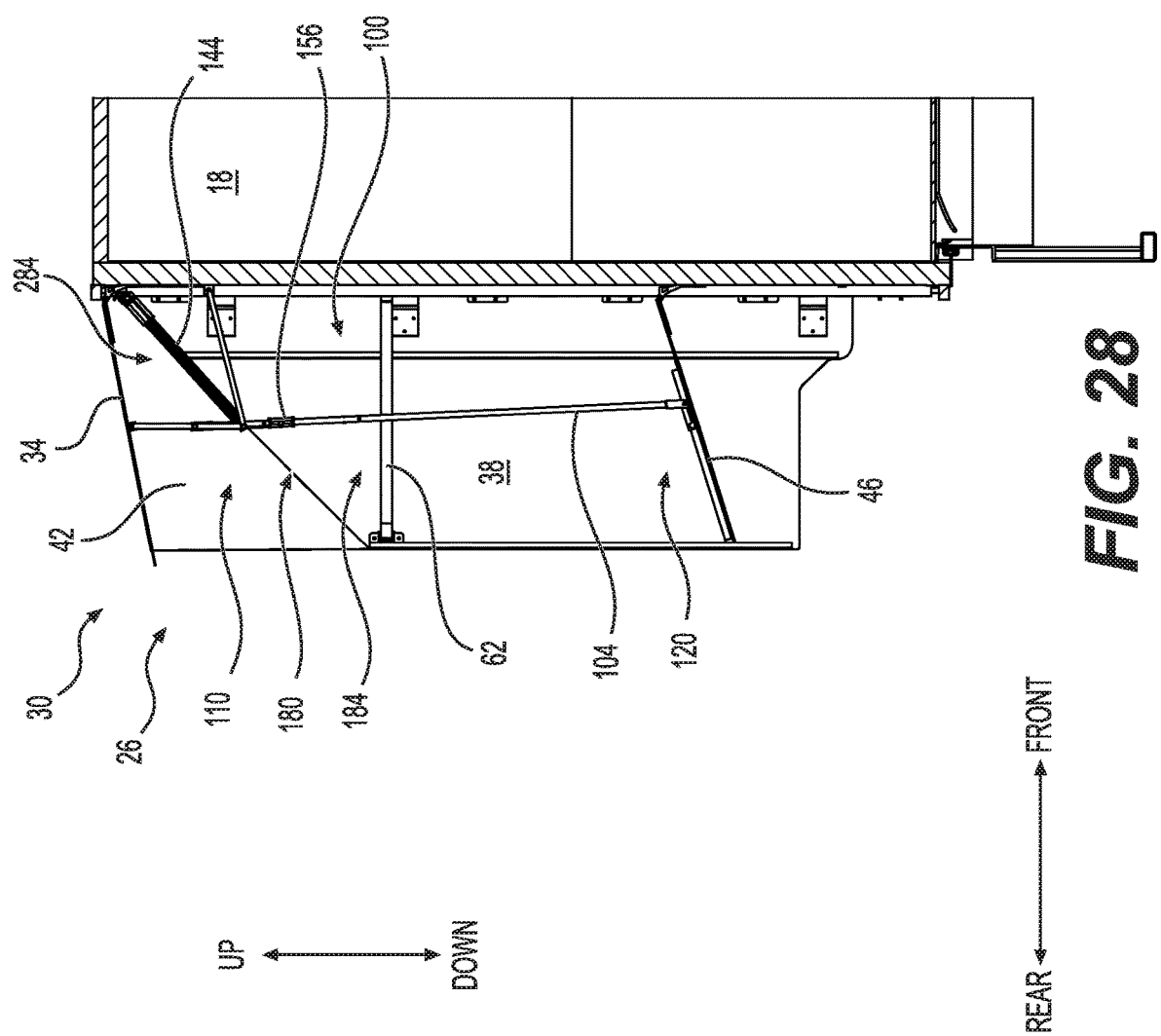
FIG. 28 is a right elevation side view of the AAADRA, in accordance with at least one embodiment thereof.
Figure 29:
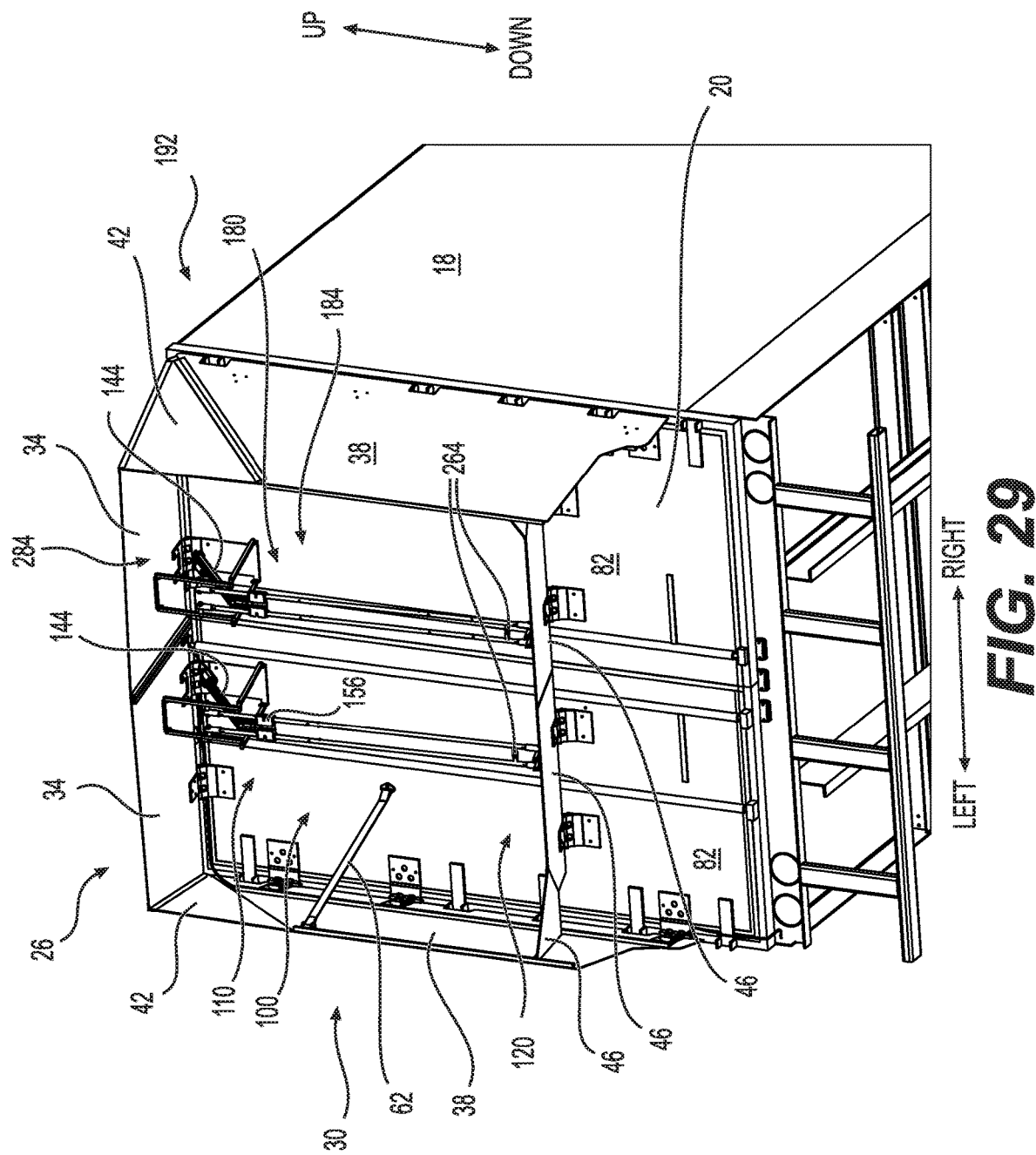
FIG. 29 is a rear-right-bottom perspective view of the AAADRA, in accordance with at least one embodiment thereof.
Figure 30:
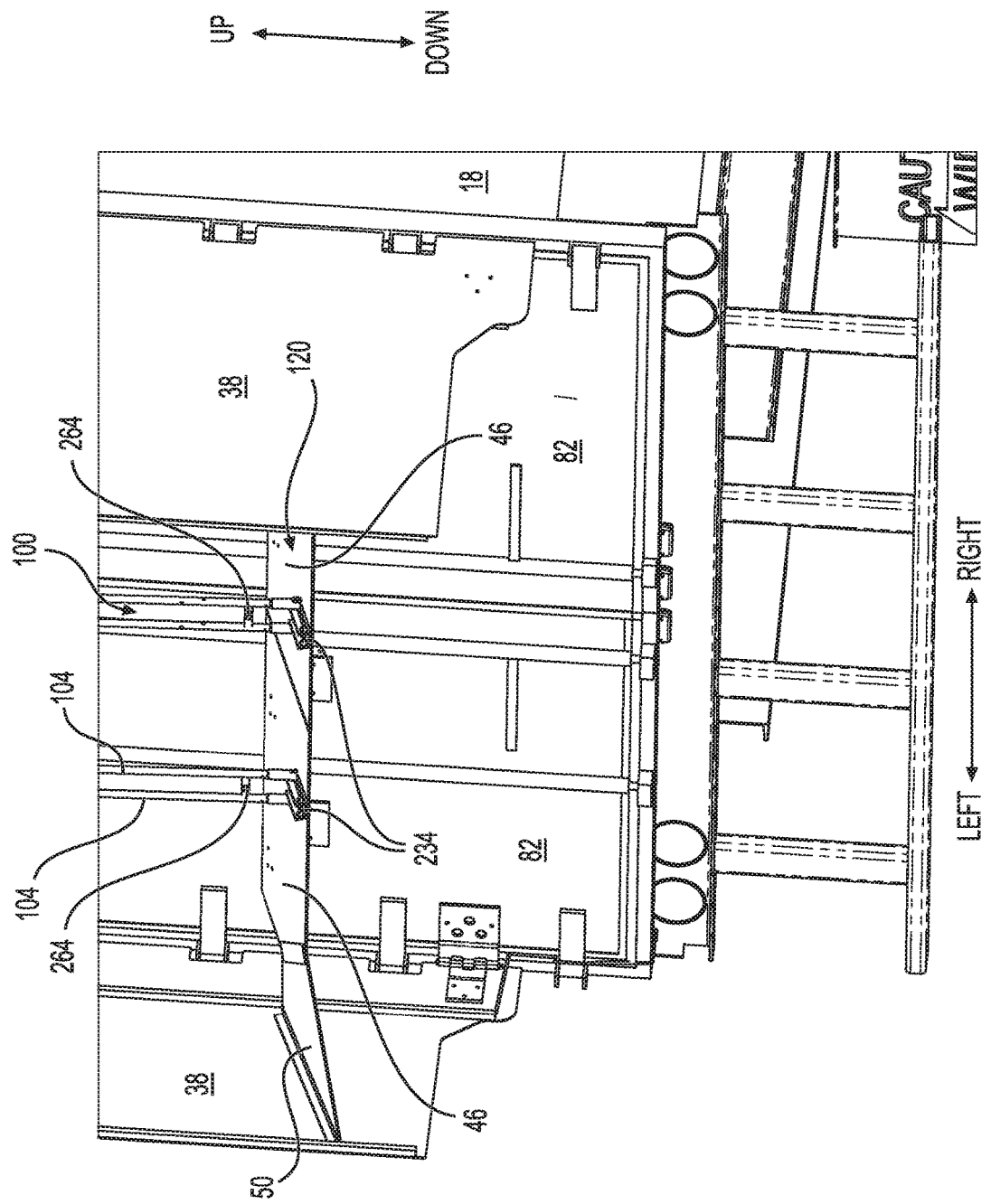
FIG. 30 is a rear-right perspective view of a portion of the AAADRA, in accordance with at least one embodiment thereof.
Figure 31:
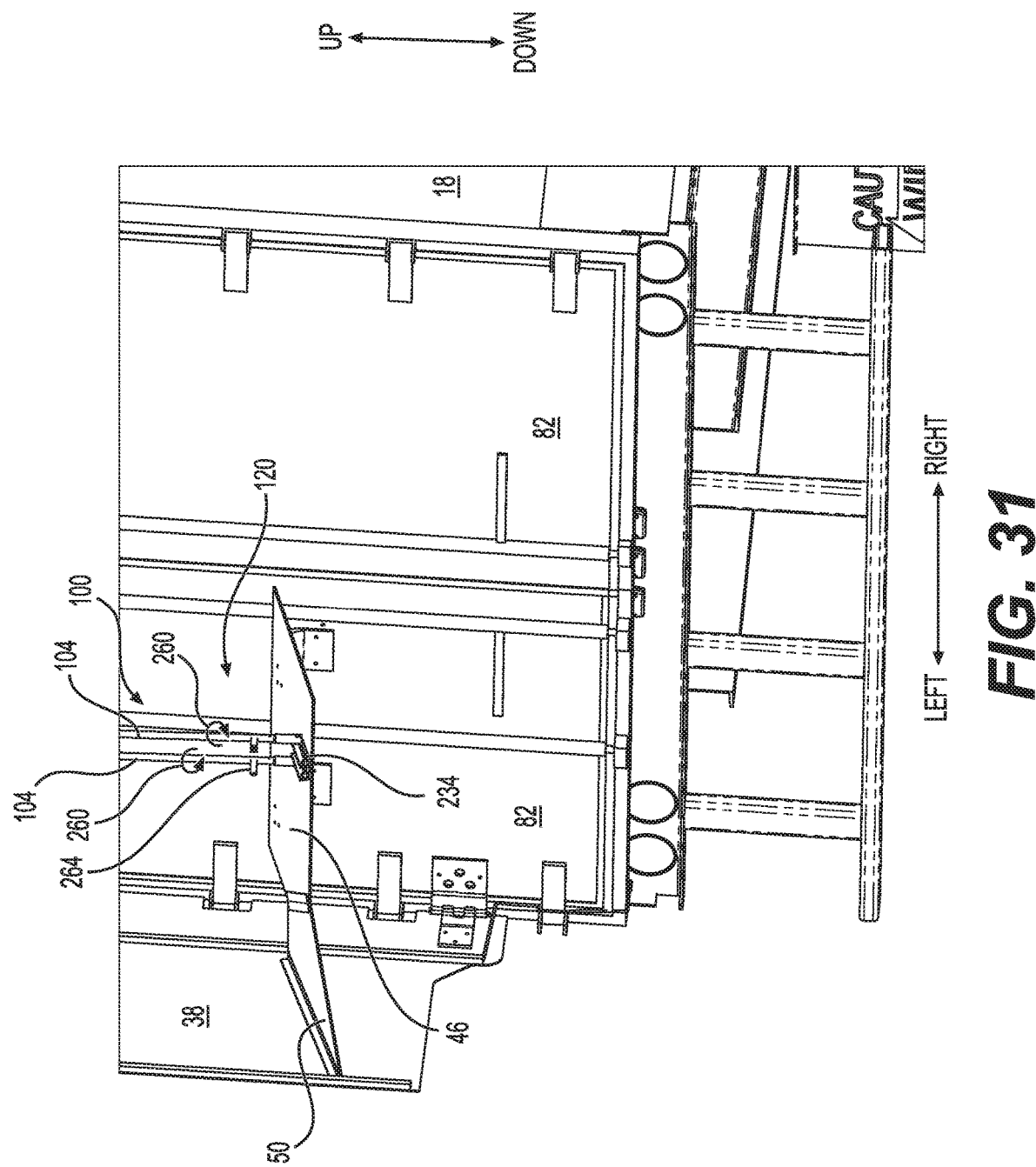
FIG. 31 is a rear-right perspective view of a portion of the AAADRA, in accordance with at least one embodiment thereof.
Figure 32:
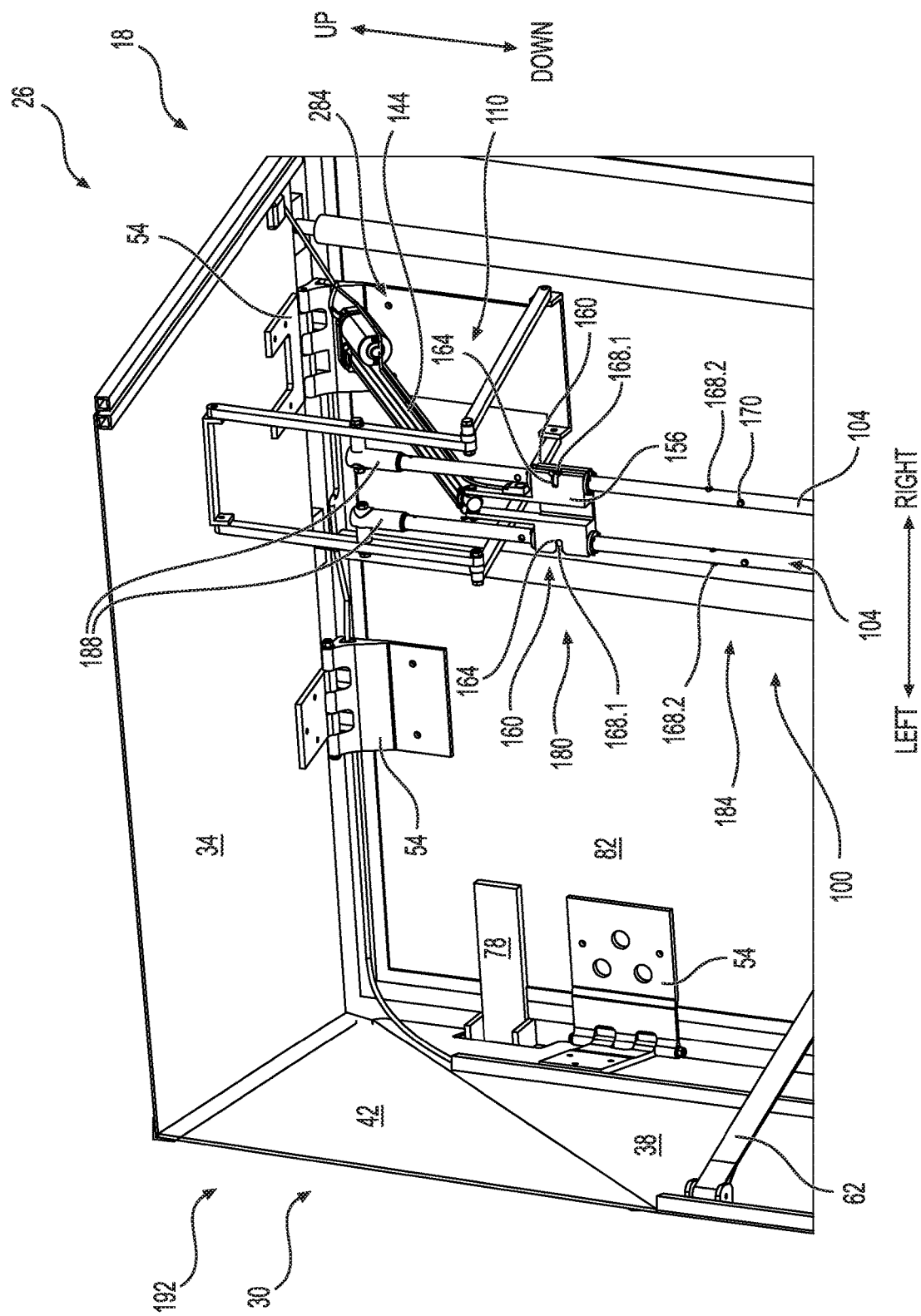
FIG. 32 is a rear-right perspective view of a portion of the AAADRA, in accordance with at least one embodiment thereof.

A mechanical failure, an electrical or electronical failure of some kind remain possible because the AAADRA 26 is used in many adverse environments like extreme cold, ice, dirt, salt . . . . The expanded configuration 30 in the automatic mode 192 is illustrated in FIG. 28, FIG. 29 and FIG. 30 from which the AAADRA 26 is moved in a safety mode 300 progressively illustrated in FIG. 31, FIG. 32 and FIG. 33. The safety mode 300 is used to retract the AAADRA 26 if it happens the AAADRA 26 gets stuck in the expanded configuration 30 when the actuator 144 is retracted in its contracted length 284. It is a possibility the AAADRA 26 cannot be brought back automatically in the retracted configuration 32. The safety mode 300 can be reached by manually supinating the elongated members 104 with the lockable handles 264, as seen in FIG. 31, to disengage the protrusions 168 from their associated engaging notches 164 in the slider 156, as seen in FIG. 32. The pair of elongated members 104 are then freely sliding downward 304 from the slider 156 with the displacement of the protrusions 168 through the axial groove 160 as depicted in FIG. 33. The slider 156 is getting closer to the pivot members 188 disposed on the upper side 114 of the pair of elongated members 104. Consequently, the top panel 34 folds down with all the other interconnected panels 38, 42, 46 and 50 to move the AAADRA 26 in the retracted configuration 32. The actuator 144 remains in the retracted state that it normally holds in the automatic expanded configuration 30. It is possible to bring back manually the AAADRA 26 in the expanded configuration 30 by pushing upward the pair of elongated members 104 until the slider 156 is properly aligned with the protrusions 168 of the first engagement position 180. Then, applying a pronation pivotal movement of the elongated members 104 to engage the protrusions 168 into the engaging notches 164 in the slider 156 will lock the assembly in place. This manipulation is bringing back manually the AAADRA 26 in its expanded configuration 30 that can become aerodynamically functional again waiting for the technical issue be fixed.

FIG. 34 throughout FIG. 69 are illustrating other embodiments of the AAADRA 26. Indeed, an automatic mode 440, a manual mode 444 and a safety mode 448 are going to be described in respect with this another embodiment. In another embodiment, the AAADRA 26 comprises an actuation mechanism 100 functioning differently. For instance, in reference with FIG. 34 illustrating the second mechanism 120, in the automatic mode, that is operatively connected to the first mechanism 110 described below. The elongated members 104 are provided with an interlocking mechanism 450 capable of preventing pivotal of the elongated members 104. The interlocking mechanism 450 includes a lock member 454 designed to prevent pivotal of a main lever 458, which is pivotably secured to one pivotable member 104. The main lever 458 works between a locked position 462, preventing pivotal of both pivotable members 104, and an unlocked position 466 allowing pivotal of both pivotable members 104. The locked position 462 is, in the present embodiment of the interlocking mechanism 450, enabled by the main lever 458 engaging the lock member 454. The interlocking mechanism 450 is further equipped with a safety lock 470 for further securing the main lever 458 in the locked position 462.

Still referring to FIG. 34, the support member 234 includes a slot 474 in which a connecting member 478 is engaged transversally therein, joining at the same time both pivot members 188, which are not restricting pivotal of the elongated members 104. The slot 474 could be parallel with the collapsed bottom panel 46 but it is preferably disposed at an angle β with respected with the bottom panel 46 in the support member 234. The angle β creates a progressive distance between the elongated members 104 and the bottom panel 46 hence preventing contact therebetween. The support member 234 is manufactured with a door-contacting portion 482, for securing the support member 234 to the trailer 18, and a protruding portion 486, extending from the support member 234, in which is positioned the slot 474. Supination of the elongated members 104 is going to pivot the elongated members 104 in an open position 486 (not illustrated in FIG. 34 but depicted in FIG. 39) when the interlocking mechanism 450 is unlocked.

FIG. 35 and FIG. 36 are illustrating the first mechanism 110 in a locked position 462 in the automatic mode 440. In that configuration, the actuator 144 is in the elongated configuration 490 and is pivotally connected to the slider 156, which is designed to slide along the elongated members 104. The pair of elongated members 104 are adapted to engage and disengage the slider 156 in a way allowing sliding movements of the slider 156 along the elongated members 104. The engagement 498 and disengagement 502 (not illustrated in FIG. 35 but can be appreciated in FIG. 40) of the slider 156 with the elongated members 104 is achieved by pronation and supination of the pair of elongated members 104. The locked position 462 is obtained when the protrusions 168.1 are first aligned and engaged in protrusions-receiving openings 506 of the slider 156 and the protrusions 168.1 are further pivoted in corresponding protrusions-locking portion 510 formed into distalmost portions of the protrusions-receiving openings 506. The protrusions-receiving openings 506 are wider on their proximal portion to guide the protrusions 168.1 into their corresponding protrusions-locking portion 510 despite some possible transversal misalignment between the protrusions 168.1 and their respectively corresponding protrusions-locking portion 510. The slider 156 is including a pair of channels 514 therein for allowing the protrusions 168 to slide through the slider 156 when the assembly is in the unlocked position 466. The slider 156 is equipped with a sensor 518 secured in a position for sensing a corresponding marker 522 disposed on the elongated members 104 at a predetermined location on each of the elongated members 104. The sensor 518 can be an inductive sensor to limit the number of moving parts in a dirty environment. The axial and radial location of an elongated member 104 can be acknowledges by the AAADRA 26 with the sensor 518 sensing or not the marker 522 and used for verification purposes ensuring, inter alia, the locked position 462 is properly engaged. Additionally, a bumper 526 is further secured to the front side of the slider 156 to prevent direct contact of the slider 156 with the door 82 of the trailer 18 and also ensure proper vertical alignment of the assembly.

Figure 38:
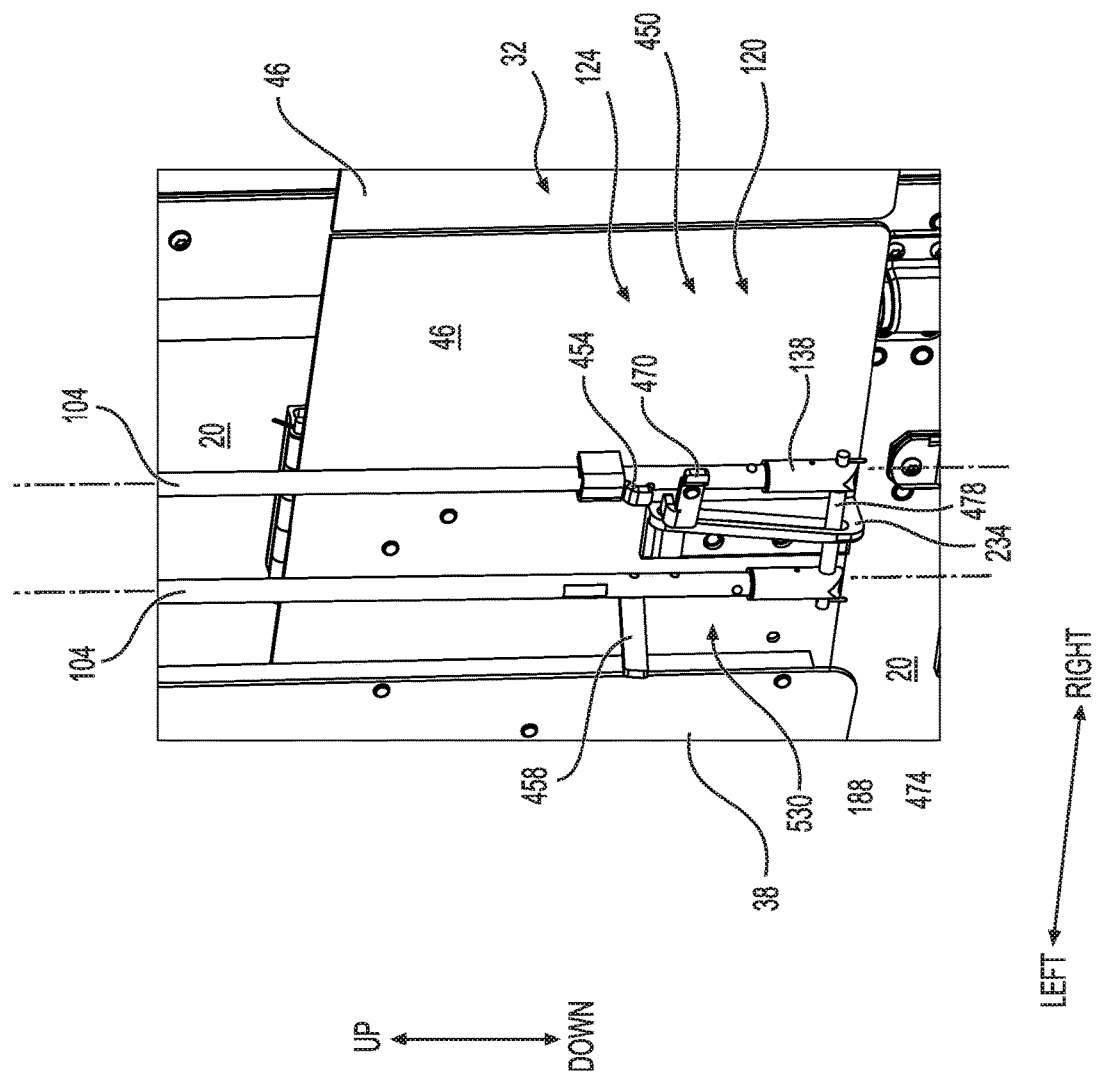
FIG. 38 is a rear-right perspective view of a portion of the AAADRA, in accordance with at least one embodiment thereof.

Hence, FIG. 35 and FIG. 36 are illustrating the first mechanism 110, on the upper side 114 of the actuation mechanism 100 in the locked position 462, and the AAADRA 26 in the retracted configuration 32. Note the sensor 518, in FIG. 35 and FIG. 36, is in a position for sensing the corresponding marker 522 to indicate the elongated member 104 is in the automatic mode 440 and in the locked position 462 with protrusions 168.1 engaging the protrusion-locking portion 510. FIG. 37 illustrates the second mechanism 120 on the lower side 124 of the actuation mechanism 100 in the locked position 462 where the safety lock 470 is disengaged and the AAADRA 26 in the retracted configuration 32. FIG. 38 depicts the main lever 458 disengaged from the lock member 454 and the left elongated member 104 in a supinated position 530 while the AAADRA 26 is in the retracted configuration 32. FIG. 39 is showing both supinated elongated members 104 in the unlocked position 466 on the lower side 124 of the actuation mechanism 100. FIG. 40 and FIG. 41 are illustrating the first mechanism 110 on the upper side 114 of the actuation mechanism 100 in the unlocked position 466 and the AAADRA 26 in the retracted configuration 32. Note the sensor 518 is not sensing the corresponding marker 522 in FIG. 40 and FIG. 41 to indicate the elongated member 104 is in the unlocked position 466 and a corresponding warning could be sent to the driver. Both elongated members 104 in the unlocked position 466 are axially disconnected from the slider 156. FIG. 42 is illustrating the AAADRA 26 in a transitional state between the retracted configuration 32 and the expanded configuration 30 where one can appreciate the upper panel 34 has begun its upward pivotal movement toward expansion while the bottom panel 46 is still in its retracted configuration. As it can be more easily appreciated from FIG. 43, the connecting member 478 has moved upward in corresponding slot 474 to allow relative translation of the elongated members 104 in respect with the bottom panels 46 to begin expanding the upper panels 34. Expanding the upper panels 34 is going to expand the side panels 38 that, in turn, will free some space for the bottom panels 46 to pivot and expand without being overlapped and blocked by the side panels 38. Once the connecting member 478 has traveled the length of the slot 474 and is stopped by the upper end 534 of the slot 474, the elongated members 104 are going to begin moving the bottom panels 46 from their retracted configuration 32 to their expanded configuration 30 (not illustrated in FIG. 43).

Figure 50:
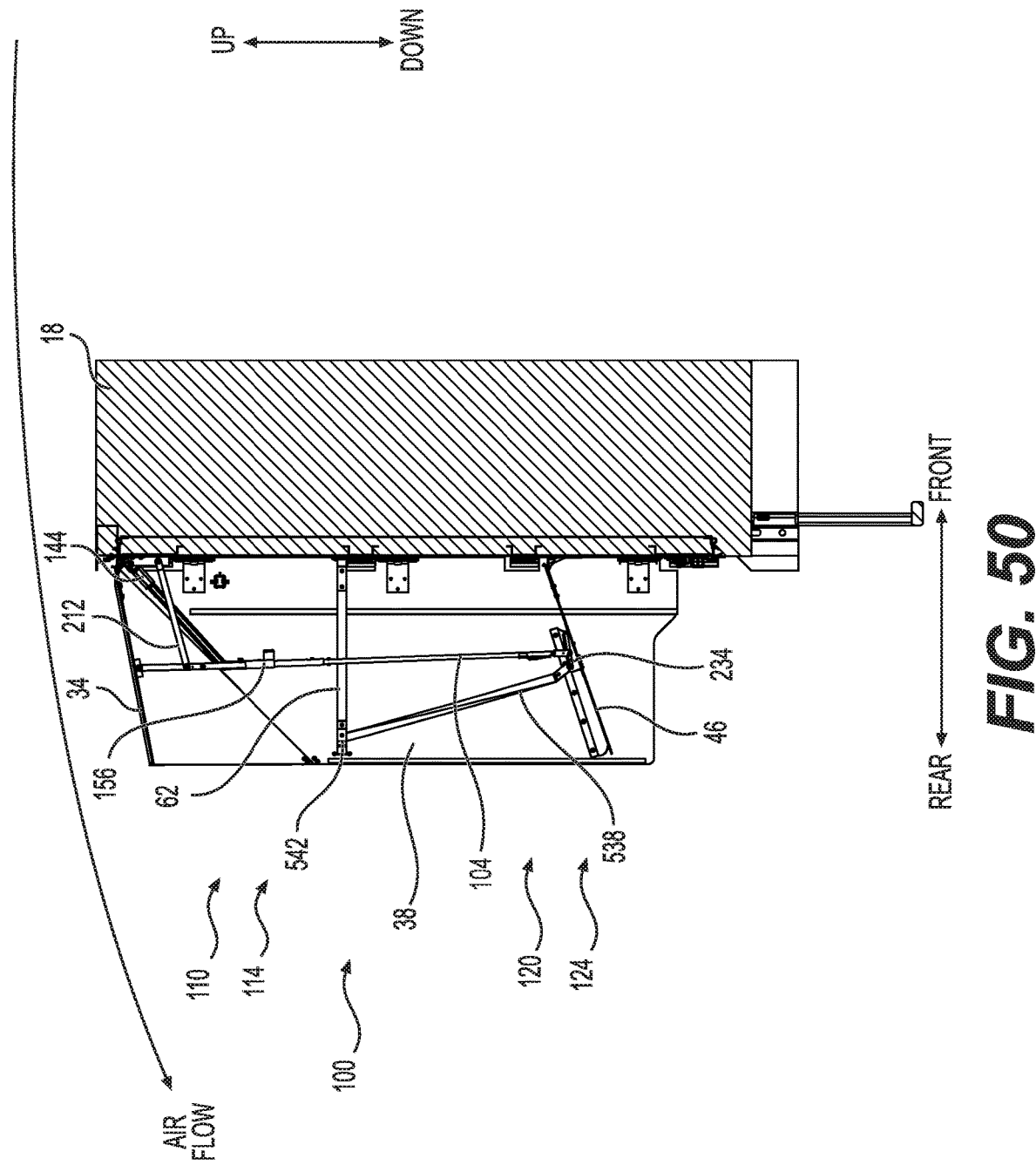
FIG. 50 is a right elevational section view of the AAADRA, in accordance with at least one embodiment thereof.
Figure 51:
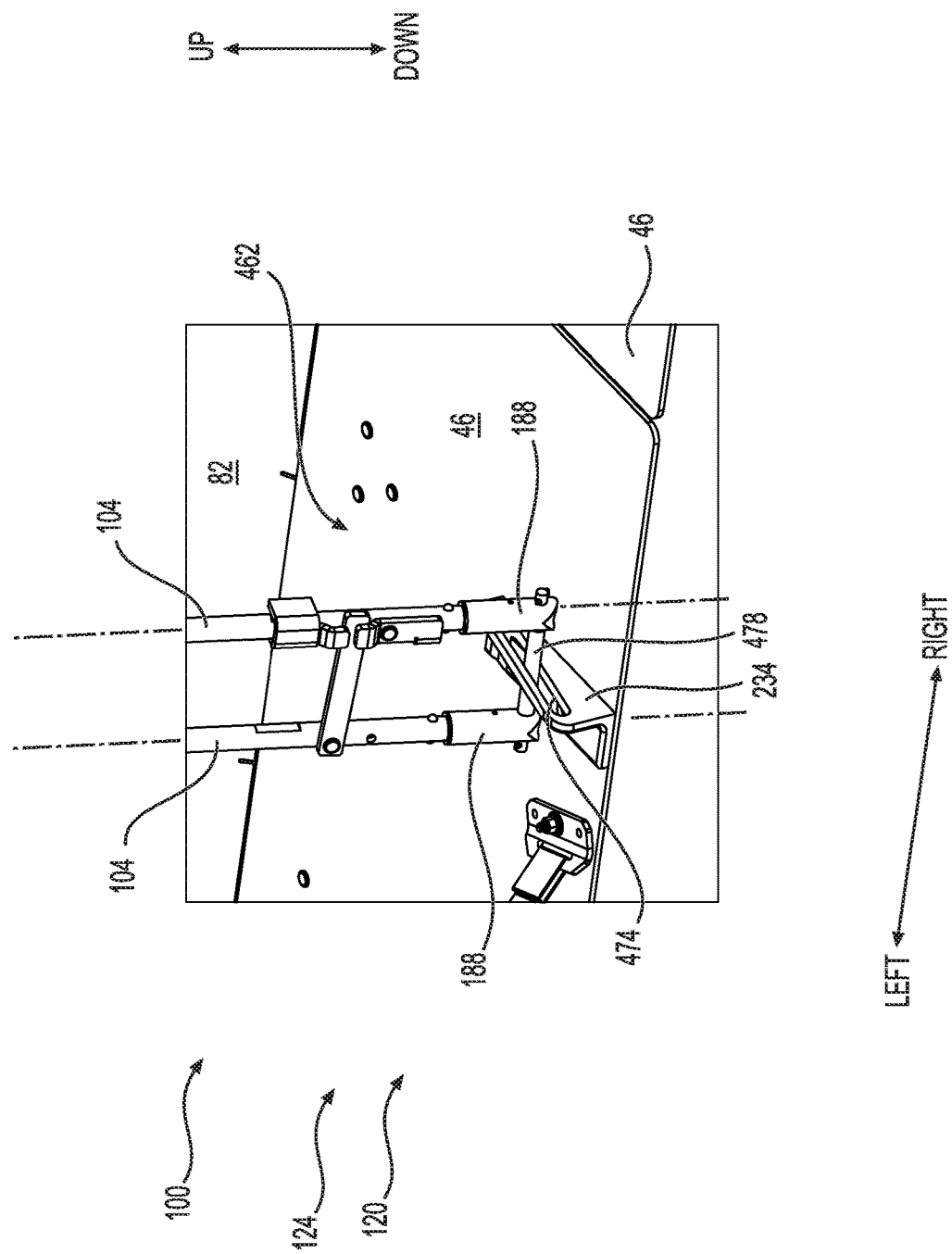
FIG. 51 is a rear-right perspective view of a portion of the AAADRA, in accordance with at least one embodiment thereof.
Figure 52:
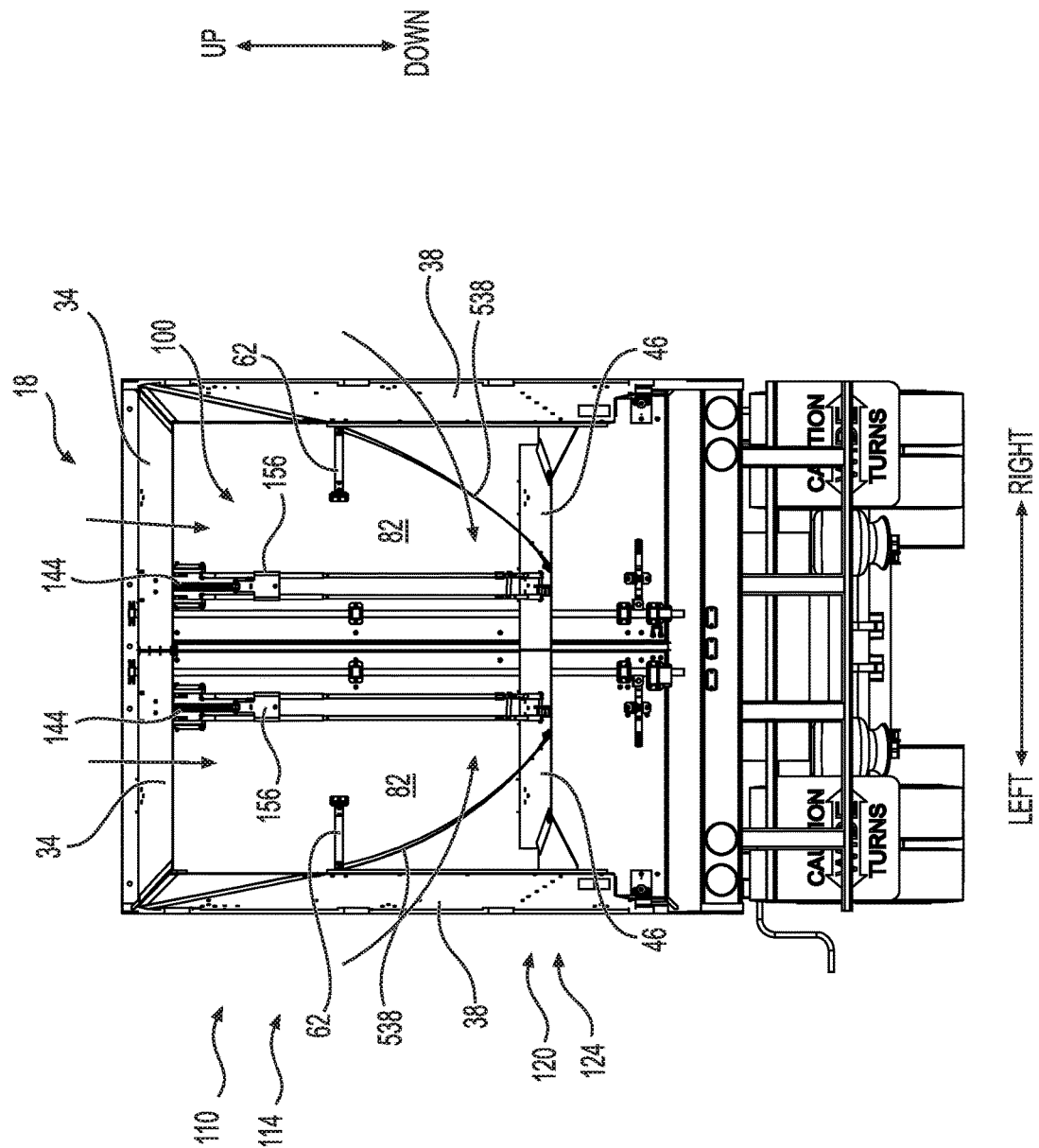
FIG. 52 is a rear elevational view of the AAADRA, in accordance with at least one embodiment thereof.
Figure 53:
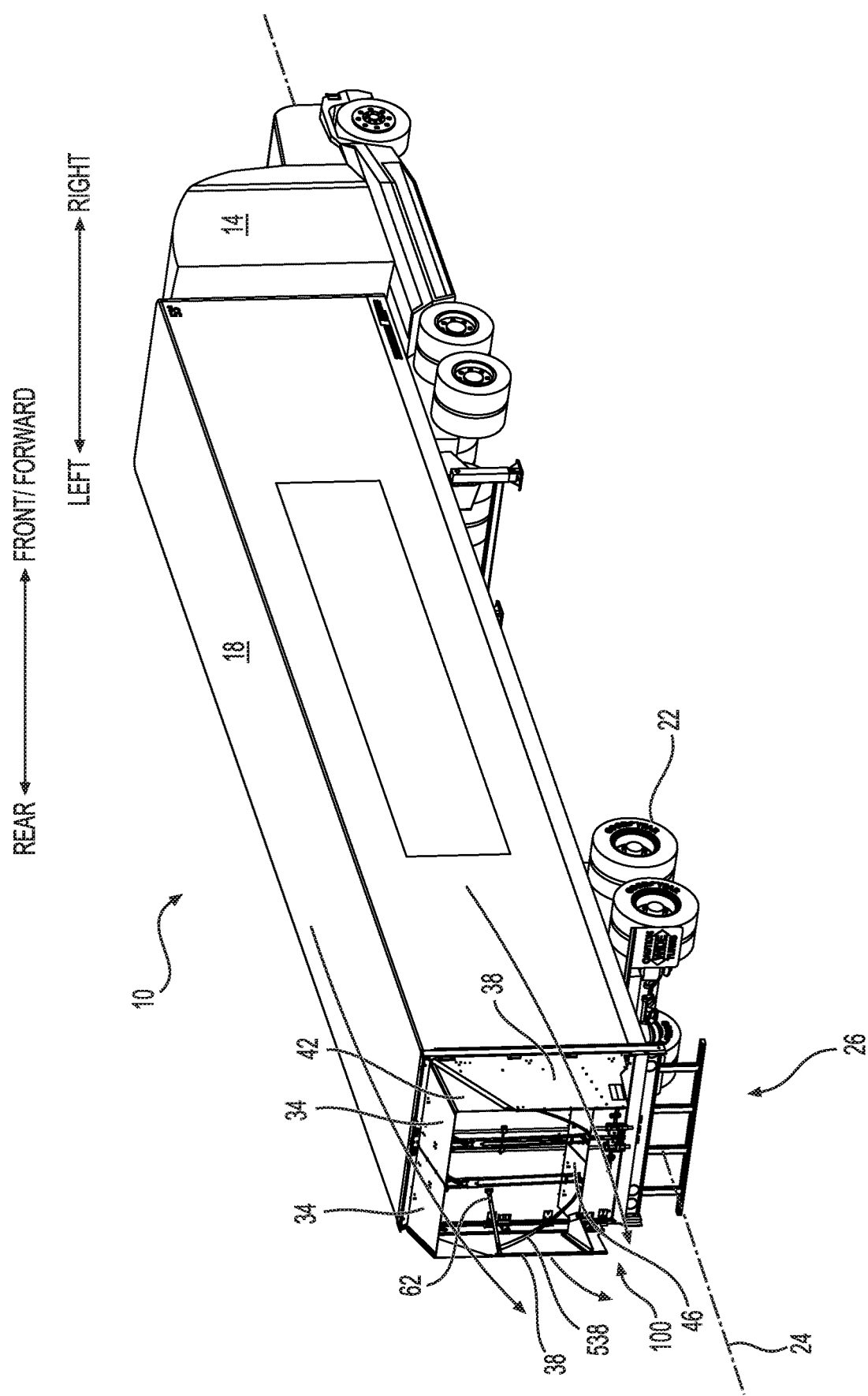
FIG. 53 is a rear-right perspective view of the trailer with the AAADRA, in accordance with at least one embodiment thereof.

FIG. 44 throughout FIG. 47 are showing additional images of the first mechanism 110 in the automatic mode 440, the locked position 462 and the expanded configuration 30. In turn, FIG. 48 and FIG. 49 are illustrating the first mechanism 110 in the automatic mode 440, the unlocked position 466 and the expanded configuration 30. The first mechanism 110 in the automatic mode 440, the locked position 462 and the expanded configuration 30 is illustrated in FIG. 50 throughout FIG. 53. This is the AAADRA 26 in a fully functional aerodynamic expanded configuration 30. The variety of AAADRA 26 arrangements is summarized in Table 1 below. It can additionally be appreciated from FIG. 50 that the side panels 38 are connected with the bottom panel 46 with a restrictor link 538 to further stiffen the assembly when the AAADRA 26 is in the fully functional aerodynamic expanded configuration 30. The restrictor link 538 can be embodied as a belt material and can be connected to a restrictor connector bracket 542, at an upper side thereof, and to the support member 234 at a lower side thereof. This optional linkage of parts is limiting the added weight to the panels 38, 46 with an increasing number of brackets secured thereto. A skilled reader in the art can also appreciate the stabilizer arm 212 is creating an hyperstatic configuration of parts with the trailer 18, the upper panel 34, the elongated members 104 and the bottom panel 46. This hyperstatic configuration of parts is further increasing the rigidity of the assembly, hence preventing panels' flexion and possible vibrations when the AAADRA 26 is in operation. The connecting member 478 is also preferably located away from the ends of the slot 474 to prevent rattles when in operation as illustrated in FIG. 51.

Figure 56:
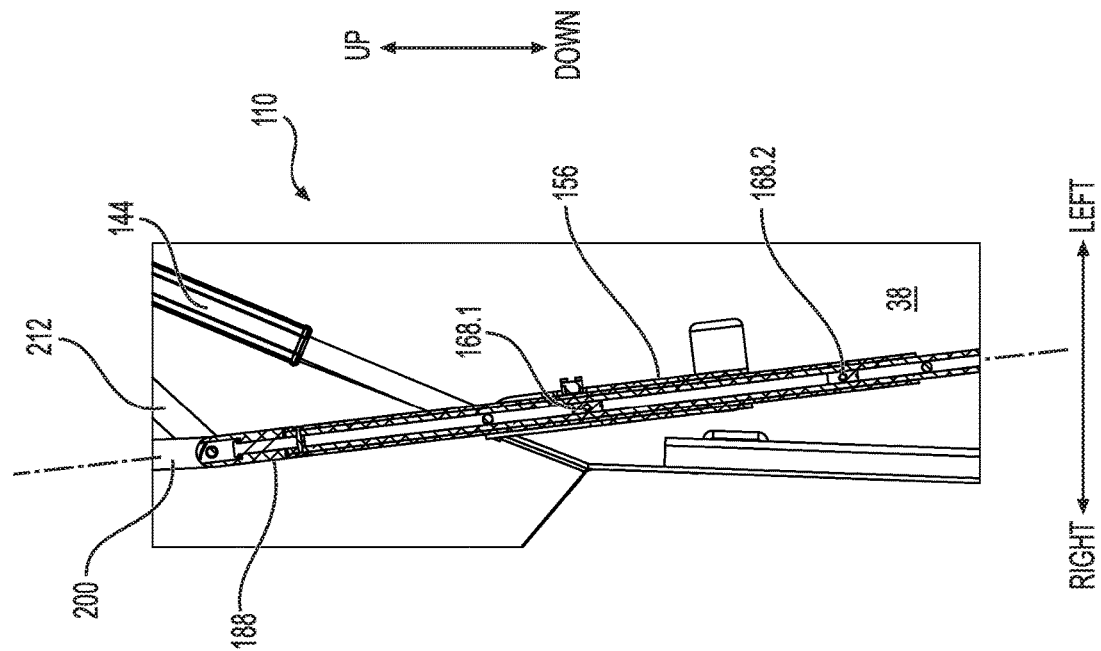
FIG. 56 is a right elevational section view of a portion of the AAADRA of FIG. 55, in accordance with at least one embodiment thereof.
Figure 55:
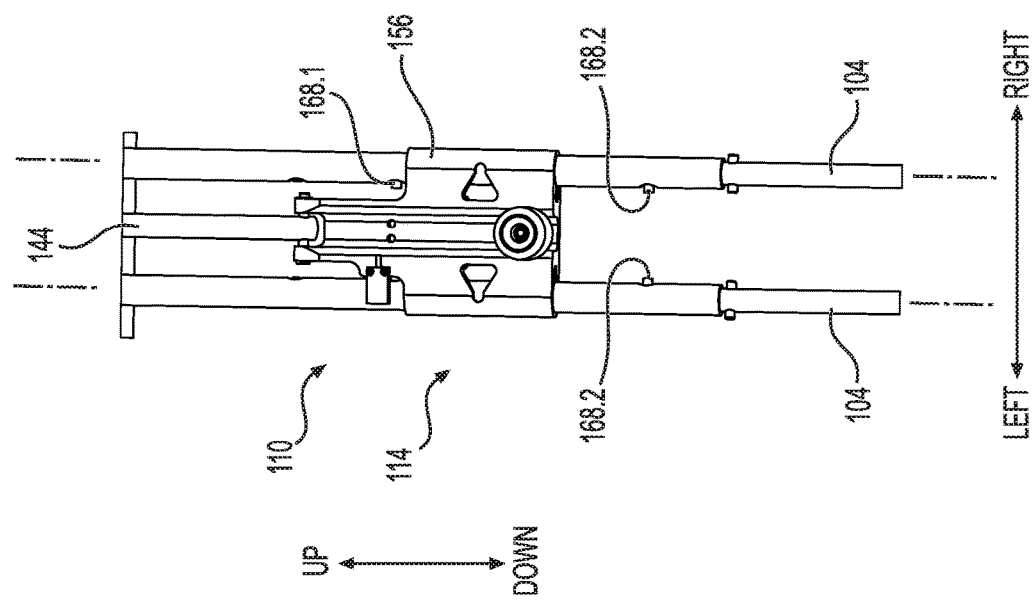
FIG. 55 is a rear elevational view of a portion of the AAADRA, in accordance with at least one embodiment thereof.
Figure 61:
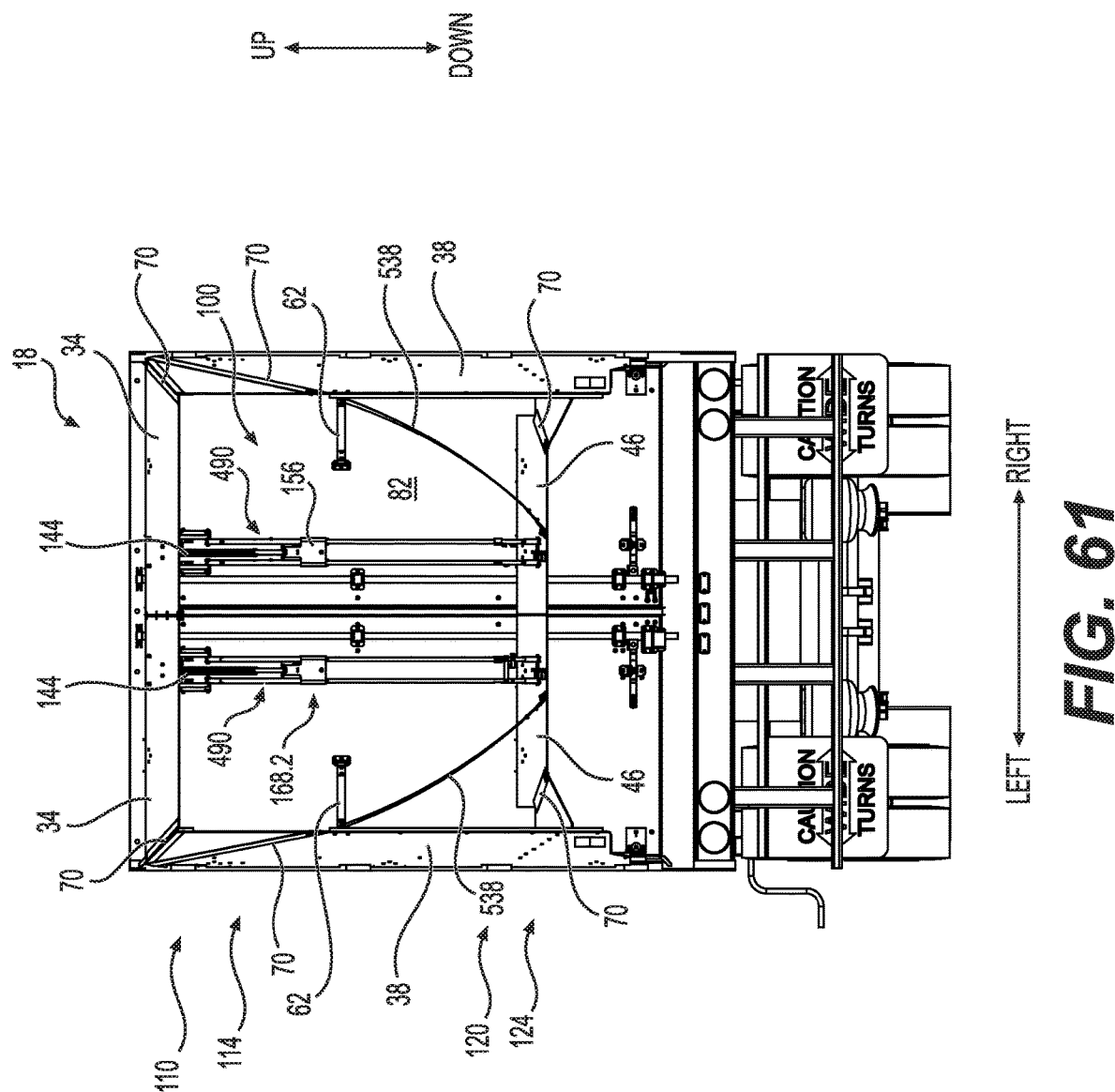
FIG. 61 is a rear elevational view of the trailer with the AAADRA, in accordance with at least one embodiment thereof.

The trailer 18 might be parked and no power is available to the AAADRA 26 to actuate the actuator 144 that is in the elongated configuration 490. Moving the AAADRA 26 between the retracted configuration 32 and the expanded configuration 30 could be desirable in these circumstances. The manual mode 444 can be used when manual manipulation of the AAADRA 26 is desirable and is described in reference with FIG. 54 throughout FIG. 60. The elongated members 104 are placed in the unlocked 466 position as illustrated in FIG. 54 to disengage the protrusions 168 from the slider 156 as depicted in FIG. 55 and FIG. 56. Then the elongated members 104 can be translated upward through the slider 156 as illustrated in FIG. 57 and FIG. 58 to be locked in place by engagement of the protrusions 168.2 with the slider 156 in the expanded configuration 30 as illustrated in FIG. 59 and FIG. 60. The lower pair of protrusions 168.2 are used, as opposed to the first pair of protrusions 168.1, to compensate with the elongated configuration 490 of the actuator 144 (because the AAADRA 26 was in default automatic mode 440 and in the retracted configuration 494). The AAADRA 26 in the expanded configuration 30 in the manual mode 444 is shown in FIG. 61.

Figures 62, 63:
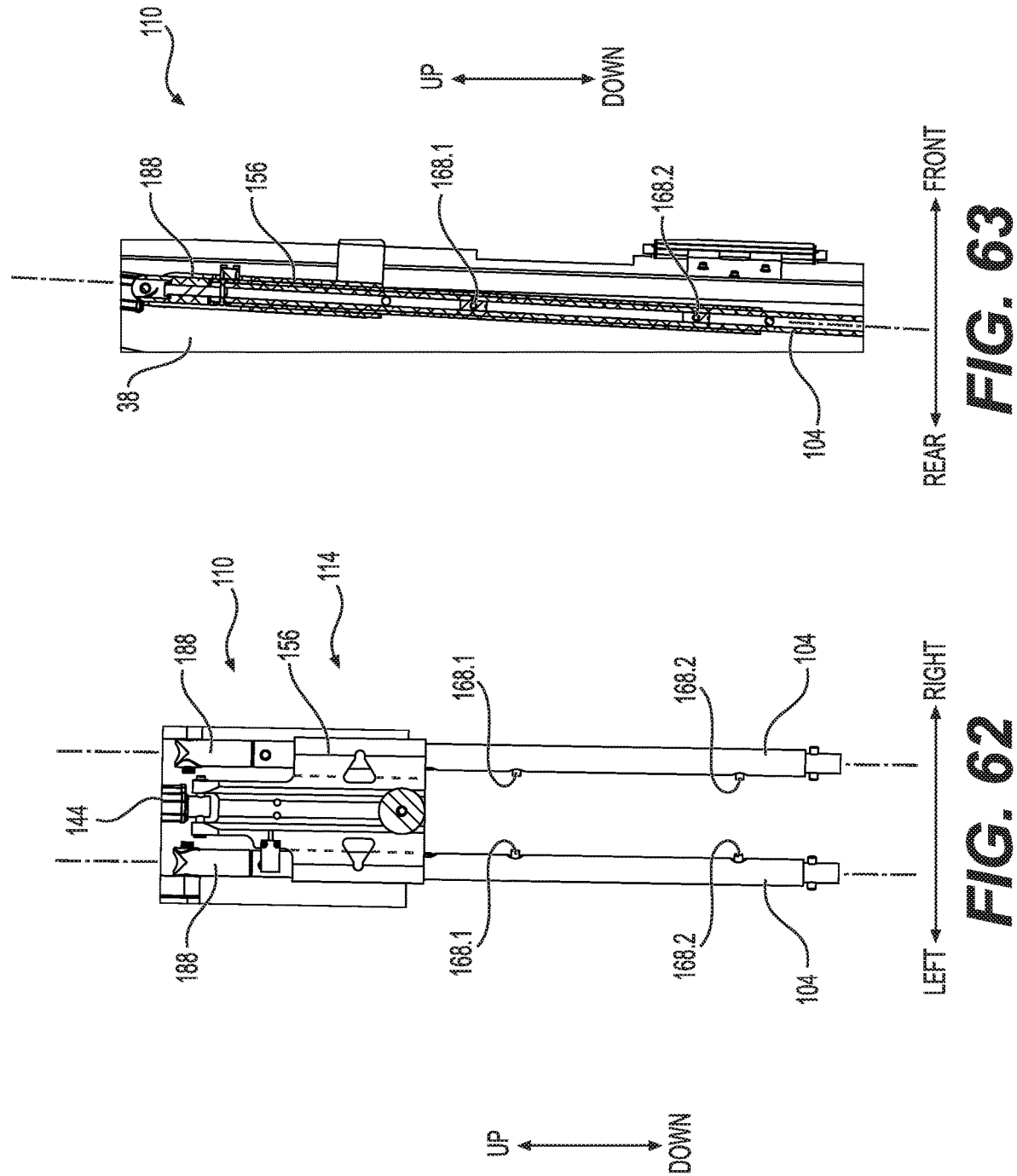
FIG. 62 is a rear elevational view of a portion of a portion of the AAADRA, in accordance with at least one embodiment thereof.
FIG. 63 is a right elevational section view of a portion of the AAADRA of FIG. 62, in accordance with at least one embodiment thereof.

In the unlikely event the AAADRA 26 is in the automatic mode 440 and, for instance, the actuator 144 stops functioning properly. It might be desirable to use the safety mode 448 to retract the AAADRA 26. The safety mode 448 is described in reference with FIG. 62 throughout FIG. 66. The pair of elongated members 104 are disengaged from the slider 156 to let drop the top panels 45 despite the actuator 144 is in the retracted configuration 494. The slider 156 is moved upward toward the upper ends of the elongated members 104. This way the AAADRA 26 is back in the retracted position 32 for docking the trailer 18, for example. The slider 156 can be locked toward the upper ends of the elongated members 104 with a pronation of the elongated members 104 so the protrusions 168.1 are used as slider's stoppers as shown in FIG. 64 and FIG. 65. The AAADRA 26 in the retracted configuration 30 is illustrated in FIG. 66.

cannot be normally expanded 30 or retracted 32. One way to limit the strength provided by the actuator 144 is to limit the electric current to a certain threshold, like, for example 4 amperes, before cutting the power of the actuator 144. The AAADRA 26 can attempt to power again the actuator 144 a number of times to try to move the AAADRA 26 without exceeding the electric current (amperes) threshold. If the attempts are not successful, the AAADRA 26 is going to move or remain in the retracted configuration 32. The AAADRA 26 is giving priority to other electrical systems of the vehicle 10 since the AAADRA 26 is electrically connected to the vehicle 10. This electrical priority to the vehicle 10 can be made if the electric potential is getting lower than, for example, 9 volts. Another way to protect the assembly is to use a sacrificial member 558 can be located between the actuator 144 and the slider 156 to be sacrificed in case of mechanical overload. The sacrificial member 558 is embodied as a shear pin in the present example as depicted in FIG. 69. The sacrificial member 558 could be located at another location suitable to perform the same role and remain within the scope of the present invention.

TABLE 1

| Mode (440, 444, 448) | AAADRA 26 configuration (30, 32) | Actuator 144 configuration | Position (462, 466) | Protrusions (168.1) | Protrusions (168.2) | Sensor (518) |
|---|---|---|---|---|---|---|
| Automatic 440 | Retracted 32 | Retracted 494 | Locked 462 | Engaged | Disengaged | Sensing |
| Automatic 440 | Expanded 30 | Elongated 490 | Locked 462 | Engaged | Disengaged | Sensing |
| Manual 444 | Expanded 30 | Retracted 494 | Locked 462 | Engaged | Disengaged | Sensing |
| Manual 444 | Retracted 32 | Elongated 490 | Unlocked 466 | Disengaged | Disengaged | Not sensing |
| Manual 444 | Expanded 30 | Retracted 494 | Locked 462 | Engaged | Disengaged | Sensing |
| Manual 444 | Expanded 30 | Elongated 490 | Locked 462 | Disengaged | Engaged | Not sensing |
| Safety 448 | Retracted 32 | From retracted 494 to almost elongated 490 | Unlocked 466 | Disengaged | Disengaged | Not sensing |

Figure 68:
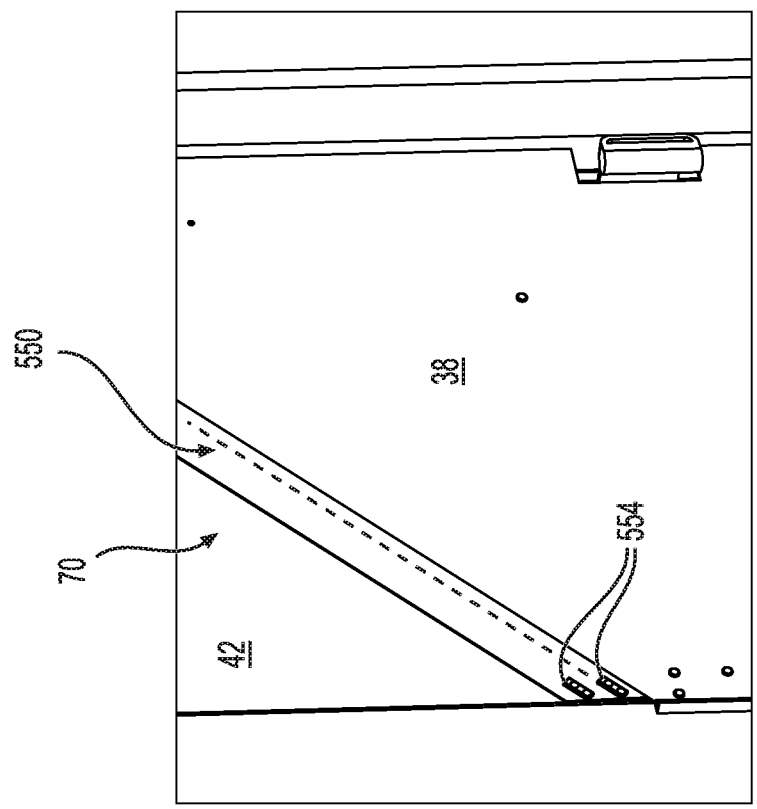
FIG. 68 is a rear-right perspective view of a portion of the AAADRA, in accordance with at least one embodiment thereof.
Figure 67:
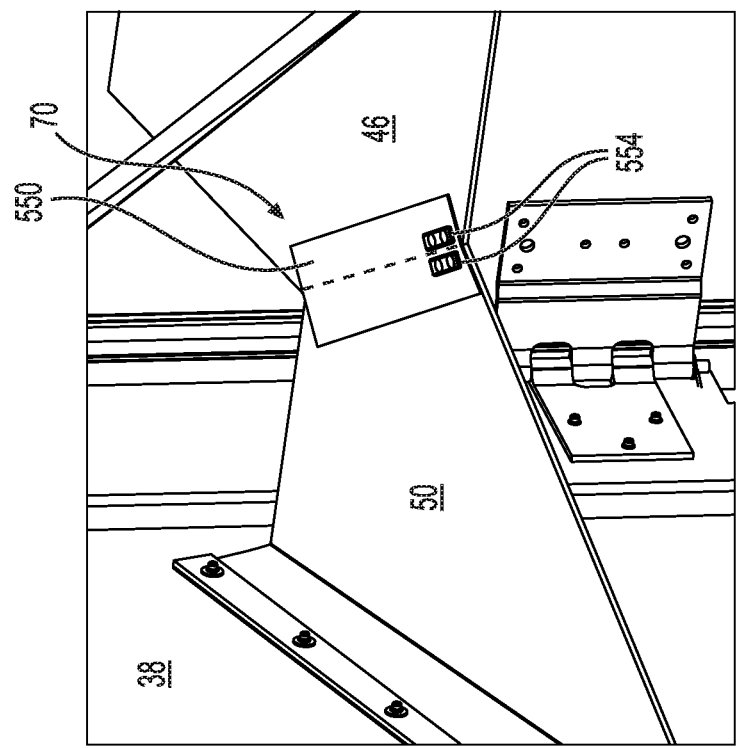
FIG. 67 is a rear-right perspective view of a portion of the AAADRA, in accordance with at least one embodiment thereof.

Moving now to another aspect of the AAADRA 26, the live hinges 70 used to interconnect panels together. Indeed, and as illustrated in FIG. 67 and FIG. 68, the live hinge 70 is used to interconnect the bottom panel 46 with the secondary bottom panel 50 as shown in FIG. 67. A live hinge 70 is also used to interconnect the side panel 38 with the secondary side panel 42. The live hinge 70 can be embodied as a flexible piece of material 550 that is mechanically strong enough to sustain the loads applied on the AAADRA 26 while substantially preventing air to go through the live hinge 70 to ensure proper aerodynamic behaviors. A coating is generally applied on the live hinge 70 to seal the live hinge 70 prevent dirt, small rocks or ice to get into the flexible piece of material 550 if there are porosity therein. A pair of spacers 554 can optionally be secured on the edges of the panels joined by the live hinge 70, on the interior of the joint, to maintain a distance between the panels when they are folded. This distance is helping to limit the bending radius of the live hinge 70 and prevent the collection of dirt and gravel hence increasing the life of the flexible piece of material 550. The location, size, and thickness of the spacers 554 can vary without departing from the scope of the present description.

The actuator 144 could possibly apply greater force than necessary to the moving parts of the AAADRA 26. This could occur if the panels are blocked and the AAADRA 26

Figure 70:
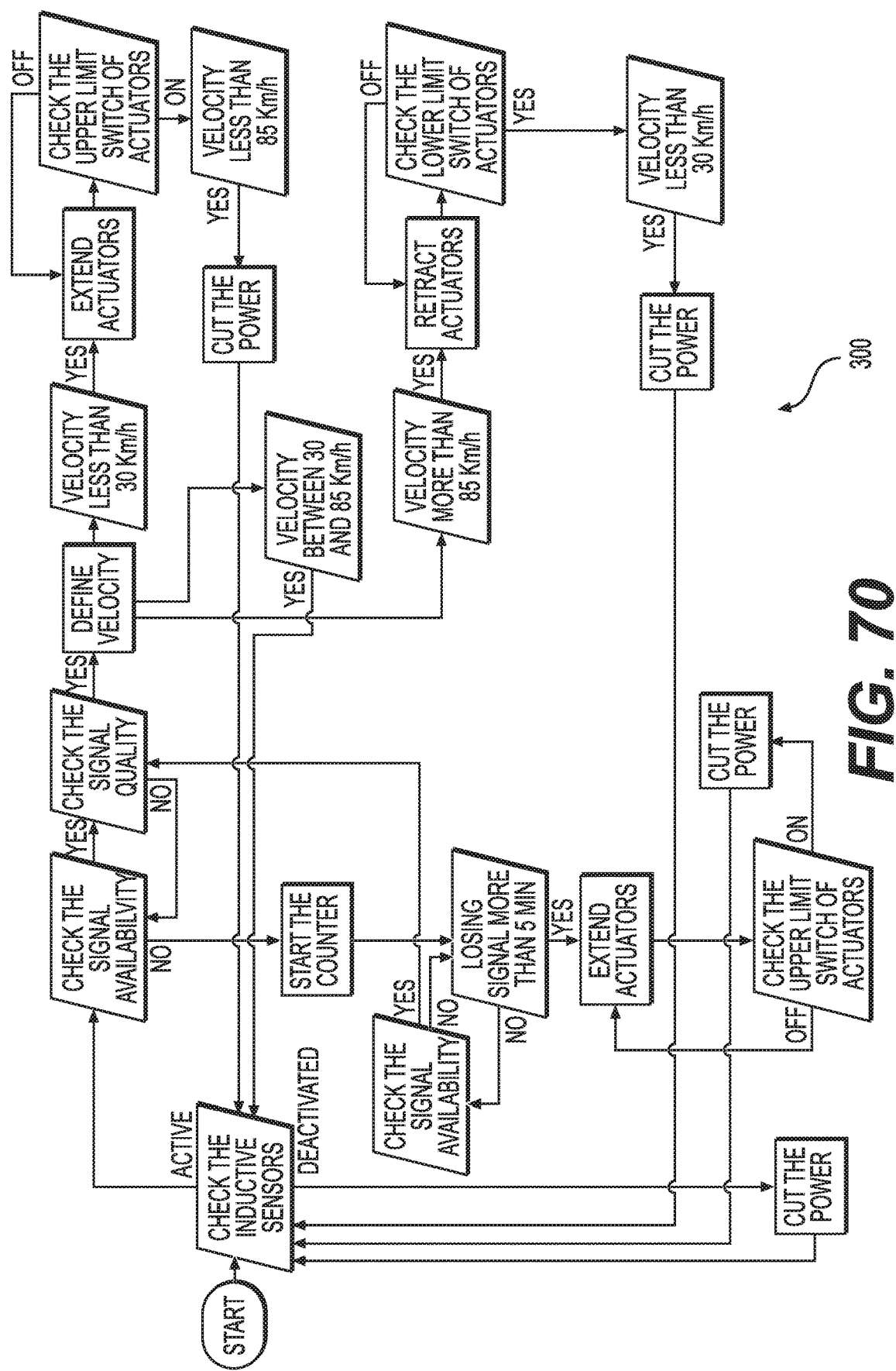
FIG. 70 is an illustrative flowchart of a control system logic for the AAADRA, in accordance with at least one embodiment thereof.
Figure 71:
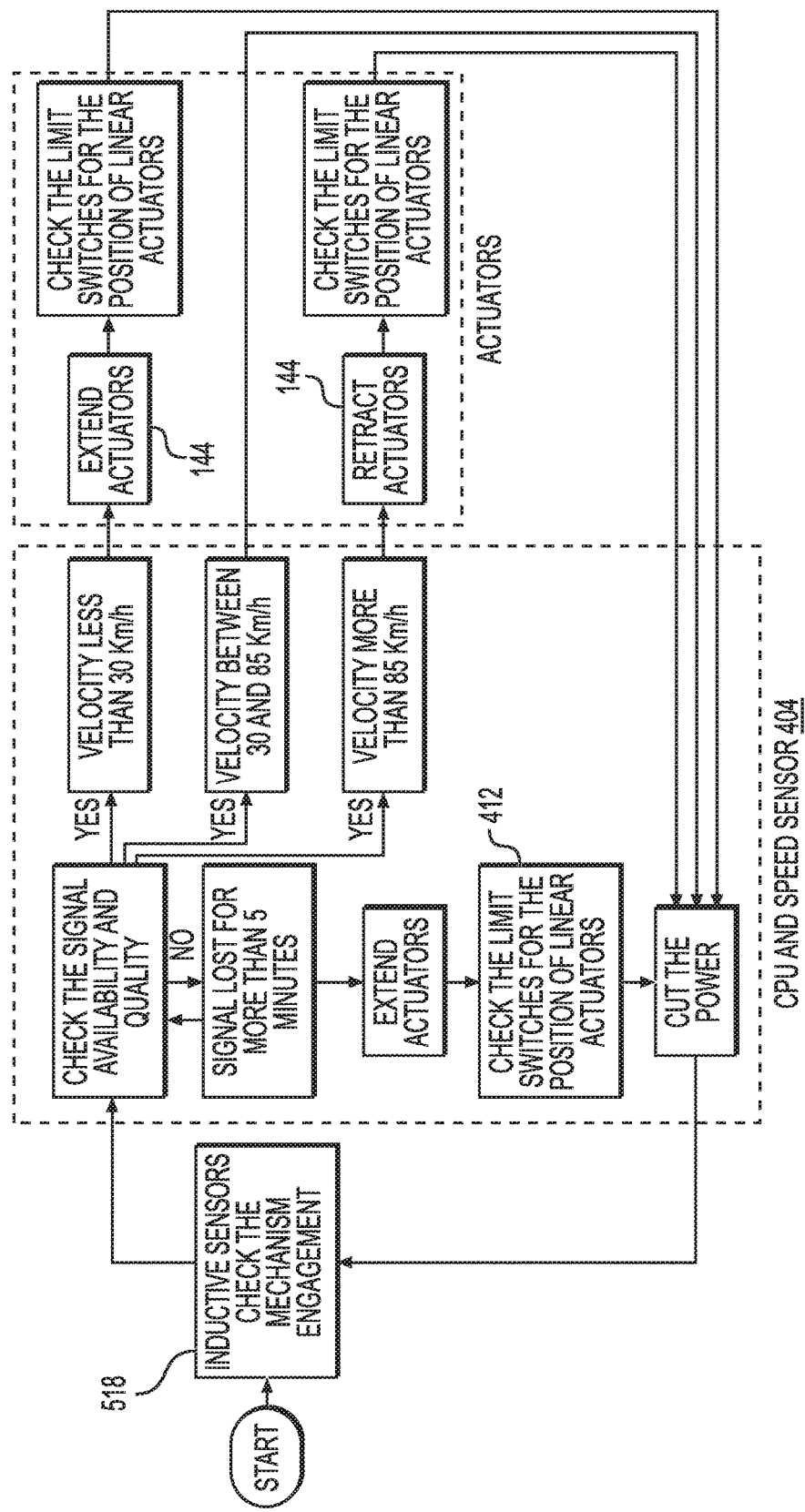
FIG. 71 is an illustrative flowchart of a control system logic for the AAADRA, in accordance with at least one embodiment thereof.

FIG. 70 and FIG. 71 are illustrating exemplary embodiments of the AAADRA 26 control system 350. One can appreciate the AAADRA 26 is illustratively expanded when the speed of the vehicle 10 is more than 85 km/h. The speed of 85 km/h is for example only and other speeds, or thresholds, could be used without departing from the scope of the invention. For instance, the AAADRA 26 can move in the expanded configuration 30 when the vehicle reaches 85 km/h and move back in the retracted configuration 32 when the vehicle 10 reaches a lower speed, like, for instance, 30 km/h. The speed of the vehicle 10 can alternatively be determined by cellular triangulation or by GPS signal. Other parameters can be used to identify the speed of the vehicle 10. Using the ABS (anti-blocking system) data; using a ground speed sensing capturing the speed of the vehicle from the movement of the road or the ground; using the vehicle's data like the speed gage or reading rotational speed of a transmission drive portion and, inter alia, using an arrangement of accelerometers and a compass.

Control loops are used throughout the control system 350 to validate each status of the control system 350 to make sure all variations of the conditions are taken into account for providing the appropriate signals to the AAADRA 26. The AAADRA 26 can be automatically moved to the retracted configuration 32 when the GPS signal is lost. As an example, if the AAADRA 26 lose the GPS signal for five minutes, the control system 350 can automatically move the AAADRA 26 in the retracted configuration 32. Another embodiment of the invention considers the voltage (electrical potential difference) provided by the vehicle 10 to the AAADRA 26 to identify voltage drop. When a voltage drop is occurring, the AAADRA 26 is automatically put in standby to allow the primary vehicle's electrical systems to recover and further prevent lowering the voltage of the vehicle with the AAADRA 26 electrical needs. Putting the AAADRA 26 in standby is also protecting the AAADRA 26 from electrical damages that could be caused by non-optimal power provided by the vehicle 10.

Figure 72:
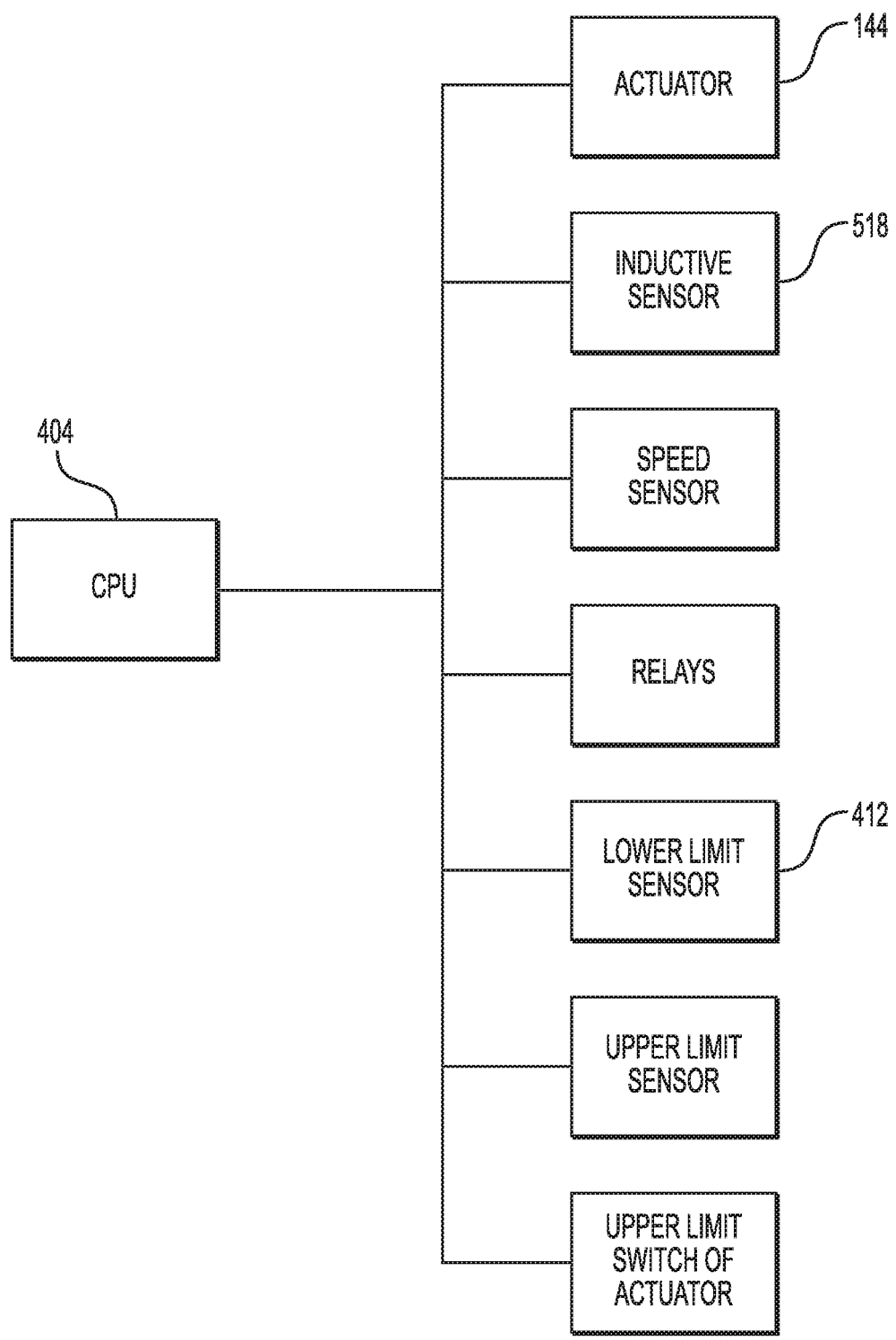
FIG. 72 is an illustrative bloc diagram of the control system of the AAADRA, in accordance with at least one embodiment thereof.
Figure 73:
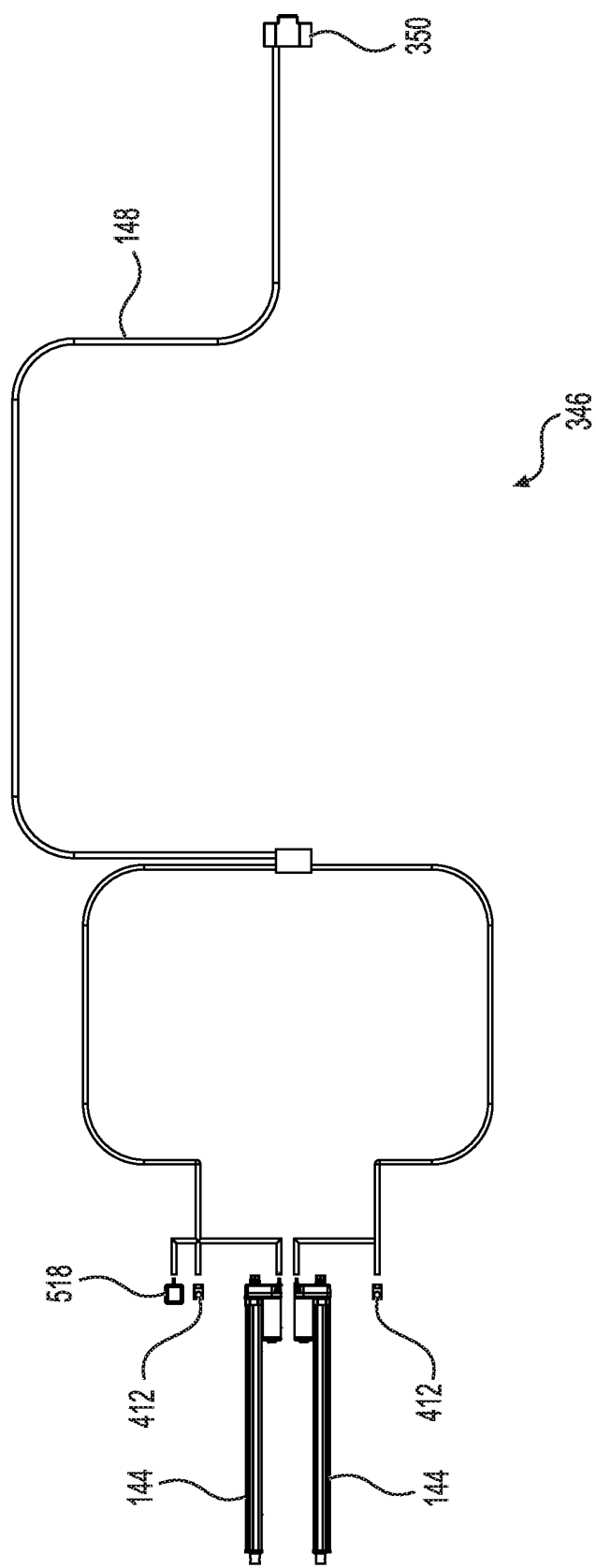
FIG. 73 is a schematic illustration of a harness connecting various components of the AAADRA, in accordance with at least one embodiment thereof.
Figure 74:
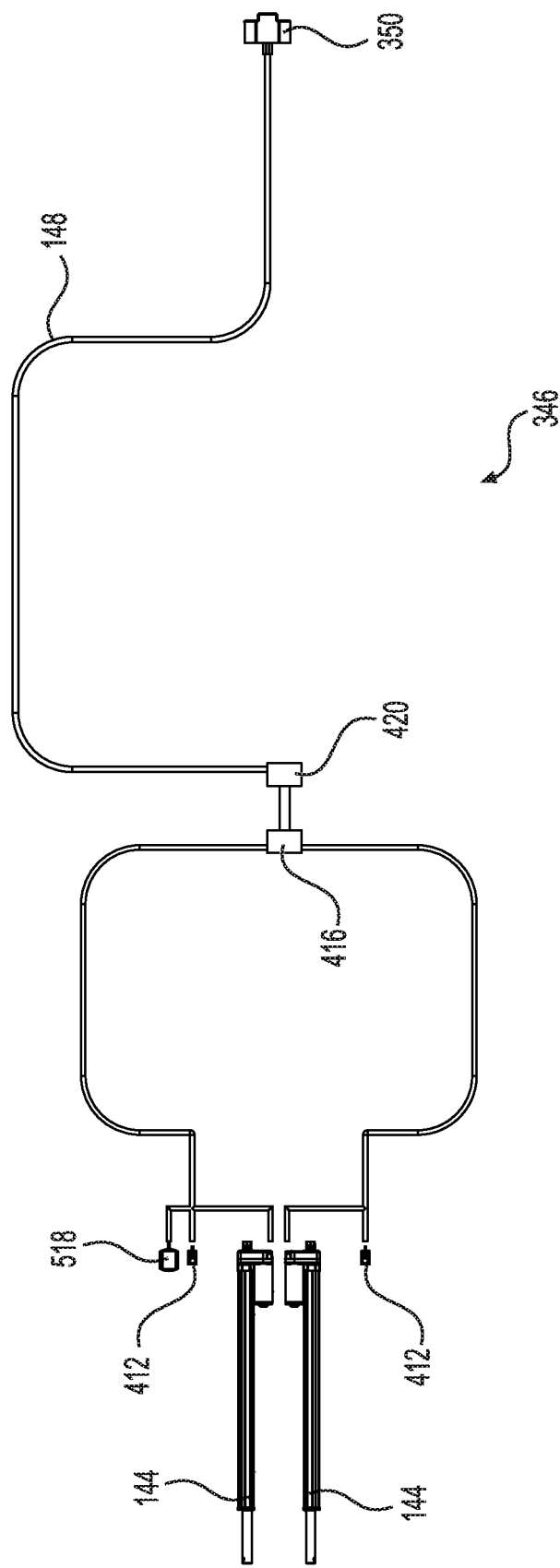
FIG. 74 is a schematic illustration of a harness connecting various components of the AAADRA, in accordance with at least one embodiment thereof.

A block diagram is illustrated in FIG. 72 describing the primary elements of the control system 350. Finally, FIG. 73 and FIG. 74 illustrate two embodiments of a harness 346 of the AAADRA 26 with components interconnected thereto. The inductive sensor 518 and the lower limit sensor 412 are connected to the CPU 404, inter alia. A control box 416 and a data logger 420 are disposed along the harness 346.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. An automatically actuated aerodynamic air drag reducing apparatus for reducing the air drag from a rear portion of a trailer, the automatically actuated aerodynamic air drag reducing apparatus comprising:
    a first half disposed on a left rear portion of the trailer and a second half disposed on a right rear portion of the vehicle, each half comprising
        a top panel pivotably secured to an upper portion of the rear portion of the trailer adapted to move between an expanded configuration and a retracted configuration;
        a side panel pivotably secured on a lateral side portion of the rear portion of the trailer adapted to move between the expanded configuration and the retracted configuration;
        a bottom panel pivotably disposed on a lower portion of the rear portion of the trailer adapted to move between the expanded configuration and the retracted configuration;
        an actuation mechanism for respectively actuating each half of the actuated aerodynamic air drag reducing apparatus between the expanded configuration and the retracted configuration, the actuation mechanism comprising
            a pair of elongated members adapted to pivot about their axis, the pair of elongated members interconnecting the top panel and the bottom panel;
            a slider secured to the pair of elongated members;
            an actuator operatively connected to the slider to move the slider and the pair of elongated members for actuating the top panel, the bottom panel and the side panel between the expanded configuration and the retracted configuration.

2. The automatically actuated aerodynamic air drag reducing apparatus of claim 1, wherein the actuator is electrically actuated.

3. The automatically actuated aerodynamic air drag reducing apparatus of claim 2, wherein the automatically actuated aerodynamic air drag reducing apparatus is connectable to a power source external to a vehicle.

4. The automatically actuated aerodynamic air drag reducing apparatus of claim 1, wherein the actuator is actuated on a basis of a signal corresponding to a speed of the trailer.

5. The automatically actuated aerodynamic air drag reducing apparatus of claim 1, wherein the actuator is elongated when the automatically actuated aerodynamic air drag reducing apparatus is in the retracted configuration.

6. The automatically actuated aerodynamic air drag reducing apparatus of claim 1, wherein the automatically actuated aerodynamic air drag reducing apparatus comprises an automatic mode, a manual mode and a safety mode.

7. The automatically actuated aerodynamic air drag reducing apparatus of claim 1, wherein the top panel and the bottom panel are operatively connected to the side panel, the actuation of the top panel and the bottom panel communicating the actuation to the side panel.

8. The automatically actuated aerodynamic air drag reducing apparatus of claim 1, wherein, in the retracted configuration, the bottom panel is overlapping over a rear panel of the trailer, the side panel is overlapping the bottom portion and the top portion panel the side panel.

9. The automatically actuated aerodynamic air drag reducing apparatus of claim 1, wherein the bottom panel is secured to the trailer at a first edge thereof and adapted to pivot thereabout between the expanded configuration, with a second edge thereof pointing rearwardly, and the retracted configuration, with the second edge pointing downwardly.

10. The automatically actuated aerodynamic air drag reducing apparatus of claim 1, wherein the automatically actuated aerodynamic air drag reducing apparatus comprises a stabilizer substantially parallel to the top panel and connected to the pair of elongated members, at a first end thereof, and to the trailer, at a second end thereof.

11. An aerodynamic air drag reducing apparatus kit for reducing the air drag from a rear portion of a trailer, the aerodynamic air drag reducing apparatus comprising:
    a first half adapted to be disposed on a left rear portion of the trailer and a second half adapted to on a right rear portion of the vehicle, each half comprising
        a top panel adapted to be pivotably secured to an upper portion of the rear portion of the trailer adapted to move between an expanded configuration and a retracted configuration;
        a side panel adapted to be pivotably secured on a lateral side portion of the rear portion of the trailer adapted to move between the expanded configuration and the retracted configuration;
        a bottom panel adapted to be pivotably disposed on a lower portion of the rear portion of the trailer adapted to move between the expanded configuration and the retracted configuration;
        a pair of actuation mechanisms for respectively actuating, when assembled, each half of the aerodynamic air drag reducing apparatus between the expanded configuration and the retracted configuration, the actuation mechanism comprising a pair of elongated members adapted to pivot about their axis, the pair of elongated members being adapted to interconnect the top panel and the bottom panel;

a slider adapted to be secured to the pair of elongated members;

an actuator adapted to be operatively connected to the slider to move the slider and the pair of elongated members for actuating the top panel, the bottom panel and the side panel between the expanded configuration and the retracted configuration.

12. The aerodynamic air drag reducing apparatus kit of claim 11, wherein the actuator is adapted to be electrically connected.

13. The aerodynamic air drag reducing apparatus kit of claim 12, wherein the aerodynamic air drag reducing apparatus is adapted to be connected to a power source external to a vehicle.

14. The aerodynamic air drag reducing apparatus kit of claim 11, wherein the actuator is adapted to be assembled in an elongated configuration when the aerodynamic air drag reducing apparatus is in the retracted configuration.

15. The aerodynamic air drag reducing apparatus kit of claim 11, wherein the top panel and the bottom panel are adapted to be operatively connected to the side panel, the actuation of the top panel and the bottom panel being adapted to communicate the actuation to the side panel.

16. The aerodynamic air drag reducing apparatus kit of claim 11, wherein, when assembled in the retracted configuration, the bottom panel is overlapping over a rear panel of the trailer, the side panel is overlapping the bottom portion and the top portion panel the side panel.

17. The aerodynamic air drag reducing apparatus kit of claim 11, wherein the bottom panel is adapted to be secured to the trailer at a first edge thereof and adapted to pivot thereabout between the expanded configuration, with a second edge thereof pointing rearwardly, and the retracted configuration, with the second edge pointing downwardly.

18. The aerodynamic air drag reducing apparatus kit of claim 11, further comprising a stabilizer adapted to be connected to the pair of elongated members, at a first end thereof, and adapted to be connected to the trailer, at a second end thereof, to be assembled substantially parallel to the top panel.

* * * * *